United States Patent
Hensley et al.

(10) Patent No.: US 10,611,502 B2
(45) Date of Patent: Apr. 7, 2020

(54) PRECISION DEPLOYMENT DEVICES, SYSTEMS, AND METHODS

(71) Applicant: Roccor, LLC, Longmont, CO (US)

(72) Inventors: William Brad Hensley, Longmont, CO (US); Philip Keller, Berthoud, CO (US); William H. Francis, Lyons, CO (US); Bruce L. Davis, Boulder, CO (US); Kellie A. Craven, Lyons, CO (US); Thomas J. Rose, Erie, CO (US); Mark S. Lake, Erie, CO (US)

(73) Assignee: Roccor, LLC, Longmont, CO (US)

( * ) Notice: Subject to any disclaimer, the term of this patent is extended or adjusted under 35 U.S.C. 154(b) by 0 days.

(21) Appl. No.: 15/789,792

(22) Filed: Oct. 20, 2017

(65) Prior Publication Data

US 2018/0111703 A1    Apr. 26, 2018

Related U.S. Application Data

(60) Provisional application No. 62/410,451, filed on Oct. 20, 2016.

(51) Int. Cl.
*E04C 3/00* (2006.01)
*H01Q 3/08* (2006.01)
(Continued)

(52) U.S. Cl.
CPC .............. *B64G 1/222* (2013.01); *E04C 3/005* (2013.01); *H01Q 1/087* (2013.01)

(58) Field of Classification Search
CPC .......... E02B 15/0842; B63G 2008/008; B65H 18/10; B65H 18/026; B65H 19/028;
(Continued)

(56) References Cited

U.S. PATENT DOCUMENTS 2,130,993 A * 9/1938 Dubiller ................ E04H 12/185
160/25
2,661,082 A * 12/1953 Ziegler ................ E04H 12/185
182/102
(Continued)

FOREIGN PATENT DOCUMENTS

WO    WO 00/64663    11/2000
WO    WO 02/06619    1/2002
(Continued)

OTHER PUBLICATIONS

Robert M. Warden, Relatchable Launch Restraint Mechanism for Deployable Booms, Apr. 1 1990, pp. 157-166 (Year: 1990).*
(Continued)

*Primary Examiner* — Kyle J. Walraed-Sullivan
(74) *Attorney, Agent, or Firm* — Wilson Patent Law, LLC

(57) ABSTRACT

Systems, devices, and methods for precision boom deployment are provided in accordance with various embodiments. The tools and techniques provided may have space and/or terrestrial applications. Some embodiments include a boom deployment system that may include a furlable boom. Some embodiments include: boom reinforcement devices, end fitting devices, contoured support devices, edge support devices, spiral harness devices, latch devices, combined boom spool and tension drive devices, and/or rotary encoder devices. Some embodiments may utilize a composite slit-tube boom. Some embodiments utilize a furlable boom that may be fabricated with curvature along its length.

30 Claims, 53 Drawing Sheets

(51) Int. Cl.
*B64G 1/22* (2006.01)
*H01Q 1/08* (2006.01)

(58) Field of Classification Search
CPC ...... B65H 54/585; B65H 2301/414225; B64G 1/222; E04C 3/005; F16H 19/064; H01Q 1/087; E04H 12/185; E04H 12/18
USPC .................... 52/108, 632, 111; 405/66, 188; 210/242.3, 923; 242/390.2; 428/906
See application file for complete search history.

(56) References Cited

U.S. PATENT DOCUMENTS

| | | | | |
|---|---|---|---|---|
| 2,784,987 | A | | 3/1957 | Corcoran |
| 2,791,453 | A | * | 5/1957 | Baker .................... E04H 12/182 248/354.3 |
| 2,799,368 | A | * | 7/1957 | Alter .................... E04H 12/185 182/41 |
| 2,888,111 | A | | 5/1959 | Evans |
| 3,144,104 | A | * | 8/1964 | Weir .................... E04C 3/005 182/41 |
| 3,144,215 | A | * | 8/1964 | Klein .................... B64G 9/00 242/388.6 |
| 3,177,987 | A | * | 4/1965 | Swaim .................... H01Q 1/087 138/156 |
| 3,213,573 | A | * | 10/1965 | Bohr .................... B21C 37/10 174/DIG. 11 |
| 3,243,132 | A | * | 3/1966 | Taylor .................... B64G 9/00 242/390.3 |
| 3,331,075 | A | * | 7/1967 | Moulton ................ H01Q 1/087 333/246 |
| 3,360,894 | A | * | 1/1968 | Orr .................... E04C 3/005 138/166 |
| 3,361,377 | A | * | 1/1968 | Trexler, Jr. ............. E04C 3/005 242/390.2 |
| 3,361,456 | A | | 1/1968 | Durand |
| 3,364,488 | A | * | 1/1968 | Perenic ................. H01Q 1/081 343/723 |
| 3,385,397 | A | * | 5/1968 | Robinsky .............. E04H 12/185 182/41 |
| 3,387,414 | A | * | 6/1968 | Adams .................... E04C 3/005 206/216 |
| 3,427,769 | A | * | 2/1969 | Star ....................... E04H 12/185 343/900 |
| 3,434,254 | A | * | 3/1969 | Rubin .................... B64G 9/00 138/119 |
| 3,434,674 | A | * | 3/1969 | Groskopfs ............. B64G 9/00 242/390.2 |
| 3,466,685 | A | * | 9/1969 | Robinsky .............. E01D 15/122 14/27 |
| 3,474,833 | A | | 10/1969 | Garrette |
| 3,477,662 | A | * | 11/1969 | Anderson .............. B64G 1/222 136/245 |
| 3,503,164 | A | * | 3/1970 | Medal .................... E04C 3/005 52/108 |
| 3,528,543 | A | * | 9/1970 | Robinsky .............. B65D 81/03 428/178 |
| 3,564,789 | A | | 2/1971 | Vyvyan |
| 3,589,632 | A | * | 6/1971 | Rew ....................... B21C 47/003 188/82.84 |
| 3,608,844 | A | * | 9/1971 | Tumulty, Jr. ........... B21C 47/18 242/373 |
| 3,688,455 | A | | 9/1972 | Zebuhr |
| 3,691,705 | A | * | 9/1972 | Luckey .................. E04C 3/005 431/47 |
| 3,696,568 | A | * | 10/1972 | Berry .................... E04C 3/005 52/108 |
| 3,784,441 | A | | 1/1974 | Kaempen |
| 3,795,172 | A | * | 3/1974 | Reed .................... B64D 1/06 244/137.4 |
| 3,811,633 | A | * | 5/1974 | Cummings ............ B29C 53/20 226/172 |
| 3,862,528 | A | * | 1/1975 | Meissinger ............. B64G 9/00 242/390.2 |
| 3,978,489 | A | * | 8/1976 | Kurland ................. H01Q 1/085 343/874 |
| 4,047,339 | A | * | 9/1977 | Smith .................... E04C 3/005 52/108 |
| 4,047,821 | A | | 9/1977 | Hoke |
| 4,062,156 | A | | 12/1977 | Roth |
| 4,079,978 | A | | 3/1978 | McMullin |
| 4,096,459 | A | * | 6/1978 | Lowenhar ........... H01B 11/1895 174/69 |
| 4,254,423 | A | | 3/1981 | Reinhard |
| 4,265,690 | A | * | 5/1981 | Lowenhar ............. H01P 3/00 156/148 |
| 4,357,785 | A | * | 11/1982 | Eklund ................. E04H 12/182 212/350 |
| 4,385,849 | A | | 5/1983 | Crain |
| 4,386,485 | A | * | 6/1983 | Kramer ................. E04H 12/185 52/108 |
| 4,480,800 | A | * | 11/1984 | Oberg .................... E02B 15/08 242/535 |
| 4,504,175 | A | * | 3/1985 | Zion .................... E21D 21/0006 405/259.1 |
| 4,587,526 | A | | 5/1986 | Ahl |
| 4,657,112 | A | | 4/1987 | Ream |
| 4,663,900 | A | | 5/1987 | Rehm |
| 4,727,932 | A | * | 3/1988 | Mahefkey .............. B64G 1/50 165/104.26 |
| 4,741,089 | A | * | 5/1988 | Oberg .................... E04C 3/005 29/463 |
| 4,793,197 | A | | 12/1988 | Petrovksy |
| 4,796,797 | A | | 1/1989 | Nakako |
| 4,871,138 | A | | 10/1989 | Sauter |
| 4,890,918 | A | * | 1/1990 | Monford ................ B64G 1/646 244/172.4 |
| 4,991,784 | A | | 2/1991 | Schmid |
| 5,035,094 | A | * | 7/1991 | Legare .................. B63B 15/0083 343/903 |
| 5,074,709 | A | * | 12/1991 | Stensland ............... E02B 15/08 405/68 |
| 5,088,014 | A | | 2/1992 | Boughey |
| 5,163,650 | A | | 11/1992 | Adams |
| 5,164,129 | A | * | 11/1992 | Douglas ................. B64G 1/222 264/342 R |
| 5,203,746 | A | * | 4/1993 | Lehnert ................. E04H 12/185 474/206 |
| 5,235,788 | A | * | 8/1993 | Maimets ................ B64G 4/00 244/172.6 |
| 5,279,084 | A | | 1/1994 | Atsukawa |
| 5,315,795 | A | | 5/1994 | Chae |
| 5,348,096 | A | | 9/1994 | Williams |
| 5,584,604 | A | * | 12/1996 | Osterlund .............. E02B 15/08 242/537 |
| 5,765,320 | A | * | 6/1998 | Hamy .................... B25J 9/104 52/108 |
| 5,882,322 | A | | 3/1999 | Kim |
| 6,065,540 | A | | 5/2000 | Thomeer |
| 6,095,714 | A | | 8/2000 | Spencer |
| 6,112,474 | A | * | 9/2000 | Paine .................... E04H 12/185 242/390.2 |
| 6,131,431 | A | * | 10/2000 | Ona ....................... B21C 37/06 52/108 |
| 6,217,975 | B1 | * | 4/2001 | Daton-Lovett ..... B29C 61/0608 156/161 |
| 6,256,938 | B1 | * | 7/2001 | Daton-Lovett ........ F16H 19/064 138/119 |
| 6,431,271 | B1 | * | 8/2002 | Thomeer ................ E21B 17/206 166/195 |
| 6,454,493 | B1 | * | 9/2002 | Lohbeck ................ B65H 49/18 138/118.1 |
| 6,602,574 | B1 | | 8/2003 | Daton-Lovett |
| 6,920,722 | B2 | | 6/2005 | Brown |
| 7,251,323 | B2 | * | 7/2007 | Holtorf .................. B32B 3/04 379/433.13 |
| 7,299,589 | B2 | | 11/2007 | Campbell |
| 7,326,354 | B2 | * | 2/2008 | Ferreira ................. E02B 15/06 210/776 |

(56) References Cited

U.S. PATENT DOCUMENTS

| | | | |
|---|---|---|---|
| 7,617,639 B1 | 11/2009 | Pollard | |
| 7,694,465 B2 | 4/2010 | Pryor | |
| 7,806,370 B2* | 10/2010 | Beidleman | B64G 1/222 |
| | | | 136/245 |
| 7,895,795 B1* | 3/2011 | Murphey | B64G 1/222 |
| | | | 52/108 |
| 8,006,462 B2 | 8/2011 | Murphy | |
| 8,683,755 B1* | 4/2014 | Spence | B64G 1/222 |
| | | | 136/245 |
| 8,689,514 B1 | 4/2014 | Sternowski | |
| 8,770,522 B1* | 7/2014 | Murphey | B64G 1/222 |
| | | | 244/159.4 |
| 8,863,369 B2* | 10/2014 | Taylor | B29C 67/0014 |
| | | | 29/447 |
| 8,893,442 B1* | 11/2014 | Spence | E04C 3/005 |
| | | | 52/108 |
| 9,156,568 B1* | 10/2015 | Spence | B64G 1/44 |
| 9,580,190 B1* | 2/2017 | Spence | B64G 1/222 |
| 9,593,485 B2 | 3/2017 | Freebury | |
| 10,004,310 B2* | 6/2018 | Wilson | A45C 13/262 |
| 10,059,471 B2* | 8/2018 | Steele | B64G 1/44 |
| 10,196,817 B2 | 2/2019 | Rakow | |
| 10,266,368 B2* | 4/2019 | Turse | B65H 75/4402 |
| 2002/0112417 A1* | 8/2002 | Brown | B64G 1/222 |
| | | | 52/108 |
| 2004/0016844 A1* | 1/2004 | Felts | B65H 19/28 |
| | | | 242/532.6 |
| 2007/0006963 A1 | 1/2007 | Bever | |
| 2007/0181241 A1 | 8/2007 | Kramer | |
| 2007/0278352 A1* | 12/2007 | Quincieu | B64G 1/222 |
| | | | 244/172.6 |
| 2008/0078139 A1 | 4/2008 | Overby | |
| 2009/0140100 A1* | 6/2009 | Mueller | B64G 1/14 |
| | | | 244/158.9 |
| 2009/0294565 A1* | 12/2009 | Ouchi | B60R 22/46 |
| | | | 242/390.2 |
| 2011/0195209 A1 | 8/2011 | Bosman | |
| 2011/0204186 A1* | 8/2011 | Keller | B64G 1/222 |
| | | | 244/172.6 |
| 2011/0271864 A1* | 11/2011 | Rastegar | F42B 10/44 |
| | | | 102/517 |
| 2011/0308174 A1* | 12/2011 | Meyer | E04C 3/005 |
| | | | 52/111 |
| 2012/0297717 A1* | 11/2012 | Keller | B64G 1/222 |
| | | | 52/645 |
| 2013/0061541 A1* | 3/2013 | Taylor | B29C 67/0014 |
| | | | 52/108 |
| 2014/0123575 A1* | 5/2014 | Bobbio | E04H 12/185 |
| | | | 52/108 |
| 2014/0150863 A1* | 6/2014 | Spence | B64G 1/222 |
| | | | 136/256 |
| 2014/0230949 A1* | 8/2014 | Daton-Lovett | B64G 1/222 |
| | | | 138/177 |
| 2014/0311057 A1* | 10/2014 | Puetz | E04H 12/182 |
| | | | 52/121 |
| 2015/0102172 A1* | 4/2015 | Thurn | B64G 1/40 |
| | | | 244/158.2 |
| 2015/0144740 A1* | 5/2015 | Turse | B64G 1/44 |
| | | | 244/172.6 |
| 2015/0259911 A1* | 9/2015 | Freebury | E04C 3/005 |
| | | | 52/108 |
| 2015/0284955 A1* | 10/2015 | Adams | E04C 3/005 |
| | | | 52/108 |
| 2015/0315760 A1* | 11/2015 | Lacrosse | E02B 15/101 |
| | | | 210/691 |
| 2015/0368903 A1* | 12/2015 | Turse | B65H 75/4402 |
| | | | 242/407 |
| 2016/0032609 A1* | 2/2016 | Kucinski | B21C 37/0818 |
| | | | 52/108 |
| 2016/0177567 A1* | 6/2016 | Gandhi | B64G 9/00 |
| | | | 52/108 |
| 2016/0223131 A1* | 8/2016 | Daton-Lovett | H01Q 1/087 |
| 2016/0226126 A1* | 8/2016 | Daton-Lovett | H01Q 1/087 |
| 2016/0311558 A1* | 10/2016 | Turse | B64G 1/222 |
| 2017/0058524 A1* | 3/2017 | Fernandez | E04C 3/005 |
| 2017/0298628 A1* | 10/2017 | Rakow | B64G 1/222 |
| 2018/0016762 A1* | 1/2018 | Miller | E02B 15/0807 |

FOREIGN PATENT DOCUMENTS

| | | |
|---|---|---|
| WO | WO 2014/081943 | 5/2014 |
| WO | WO 2014/127292 | 8/2014 |

OTHER PUBLICATIONS

M. W. Thomson, Deployable and Retractable Telescoping Tubular Structure Development, May 1, 1994, pp. 327-330 (Year: 1994).*
Notice of Allowance, U.S. Appl. No. 14/645,844, dated Mar. 9, 2017, USPTO.
Final Office Action, U.S. Appl. No. 14/645,844, dated Jun. 28, 2016, USPTO.
Non-Final Office Action, U.S. Appl. No. 14/645,844, dated Sep. 9, 2015, USPTO.
International Search Report and Written Opinion for PCT International Patent Application No. PCT/US2013/071266, dated May 12, 2014, 12 pages total.
International Search Report and Written Opinion for PCT International Patent Application No. PCT/US2014/016605, dated Jun. 3, 2014, 13 pages total.
Galletly et al. Bistable composite slit tubes. I. A beam model. International Journal of Solids and Structures, 2004, 41 :4517-4533.
Iqbal et al. Bi-Stable Composite Shells. Proc. 41 st AIAA Structures, Structural Dynamics, and Materials Conference and Exhibit, Apr. 2000, Atlanta, GA, USA, 8 total pages.
Prigent. A Finite Element Model of Bi-Stable Woven Composite Tape-Springs. KTH, Thesis submitted for the Master's degree, Stockholm, Sweden, Oct. 2011.
Rolatube Extending Technology. Rolatube Technology: Product Brochure: The Rollable Structural Composite Technology. Website, http://www.rolatube.com, originally downloaded May 6, 2019, 24 total pages.
Straubel. Large Deployable Structures. Gossamer Concepts for Versatile Applications. SpacePlan 2020; University of Surrey, Feb. 27, 2014, Guildford, UK; 12 pages total.
Astro Aerospace Corporation. STEM Design & Performance. Website, http://www.as.northropgrumman.com, downloaded Oct. 24, 2012, 9 total pages.
Northrop Grumman. Astro Aerospace: Deployable Structures and Mechanisms for Space Applications. Website, https://www.northropgrumman.com/BusinessVentures/AstroAerospace/Documents/pageDocs/Astro_Aerospace_Brochure.pdf, downloaded Oct. 1, 2019, 2 total pages.
Northrop Grumman. 150-lb Linear Actuator Stem. Website, http://www.as.northropgrumman.com, originally downloaded Oct. 24, 2012, 2 total pages.
Rolatube Technology Ltd. Product Brochure: Defense and Security. Website, http://www.rolatube.com, originally downloaded Oct. 24, 2012, 20 total pages.
Rolatube Technology Ltd. A Brief Introduction to Bi-Stable Reeled Composites. Website, http://www.rolatube.com, originally downloaded Oct. 24, 2012, 9 total pages.
Straubel, M., et al. Results of Research Study: Evaluation of Deployable Space Mast Concepts. Final Presentation, NASA--LaRC, dated Sep. 28, 2011, 54 total pages.
Daton-Lovett, A., et al. Deployable structures using bi-stable reeled composites. Smart Structures and Materials 2000, Proceedings of SPIE vol. 3992 (2000), pp. 636-646.
Hillebrandt, M., et al. Deploment Testing of the De-Orbit Sail Flight Hardware. AIAA SciTech, Jan. 5-9, 2015, 24 total pages.
Straubel, M., et al. The Design and Test of the GOSSAMER-1 Boom Deployment Mechanisms Engineering Model. AIAA SciTech, Jan. 5-9, 2015, 15 total pages.

(56) References Cited

OTHER PUBLICATIONS

Northrop Grumman. Astro Aerospace: Products and Capabilities. Website, https://www.northropgrumman.com/BusinessVentures/AstroAerospace/Documents/pageDocs/AstroAerospaceCapabilities.pdf, downloaded Oct. 1, 2019, 2 total pages.

* cited by examiner

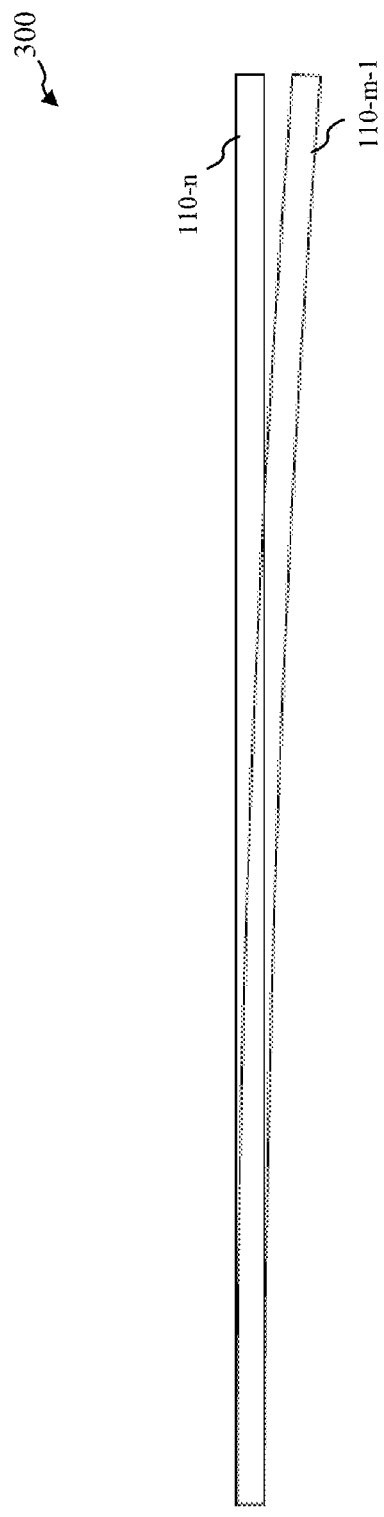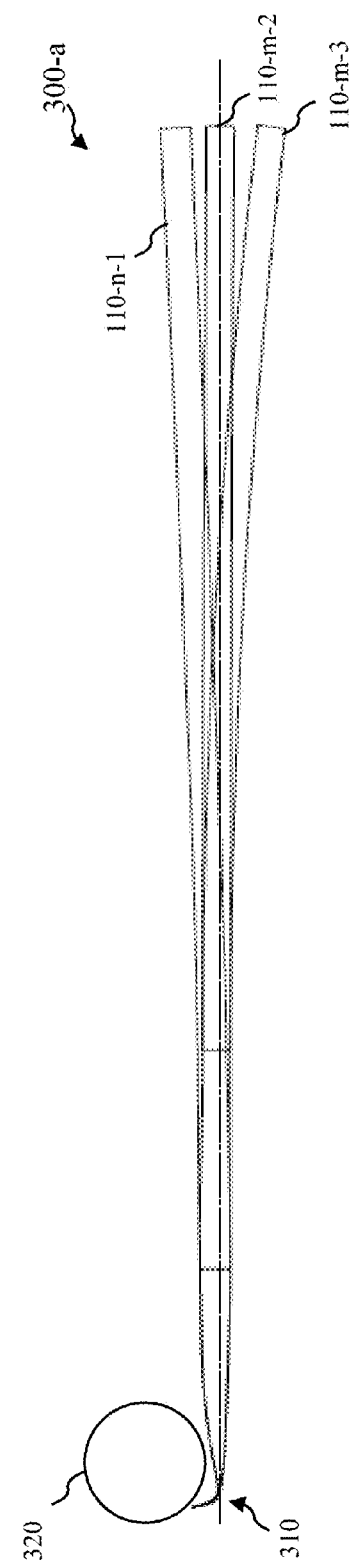
FIG. 3D
FIG. 3E

Furlable Boom 110-q

End Fitting 610

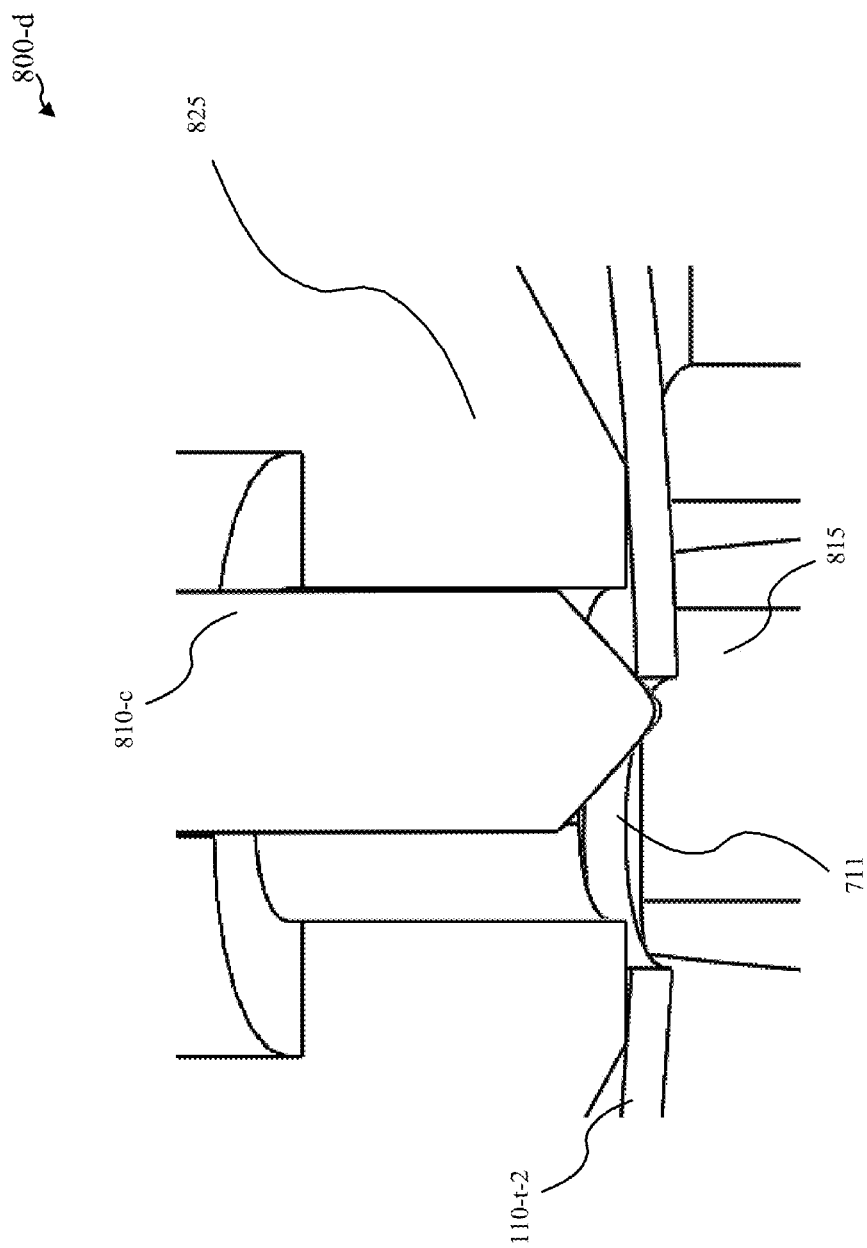

PRECISION DEPLOYMENT DEVICES, SYSTEMS, AND METHODS

CROSS-REFERENCES TO RELATED APPLICATIONS

This application is a non-provisional patent application claiming priority benefit of U.S. provisional patent application Ser. No. 62/410,451 filed on Oct. 20, 2016 and entitled "PRECISION DEPLOYMENT DEVICES, SYSTEMS, AND METHODS," the entire disclosure of which is herein incorporated by reference for all purposes.

BACKGROUND

Different boom deployment tools and techniques have been utilized for space and/or terrestrial applications. These tools and techniques may often lack precision. There may be a need for new tools and techniques to address precision deployment of booms or other issues with respect to boom deployment.

SUMMARY

Systems, devices, and methods for precision boom deployment are provided in accordance with various embodiments. The tools and techniques provided may have space and/or terrestrial applications.

For example, some embodiments include a boom deployment system that may include a furlable boom. The system may also include an end fitting configured to couple with the furlable boom; one or more portions of the end fitting may engage one or more end portions of the furlable boom when the furlable boom may be deployed and may release the one or more end portions of the furlable boom when the furlable boom may be stowed. In some embodiments, the one or more portions of the end fitting includes an end support configured to direct the one or more end portions of the furlable boom during deployment of the furlable boom and support the one or more end portions of the furlable boom after deployment. In some embodiments, the end fitting includes an insert configured to support an inner surface of the furlable boom when the furlable boom is deployed.

Some embodiments of the system include one or more static contoured supports configured to match a geometry of the furlable boom as the furlable boom transitions from a furled geometry to a deployed geometry. In some embodiments, the one or more of the static contoured supports include a cutout portion configured to accommodate a deformation of a portion of the furlable boom. Some embodiments include one or more edge supports configured to supply a circumferential or downward force on the furlable boom. In some embodiments, at least one of the one or more edge supports is configured to provide one or more hard stops for one or more edges of the furlable boom. In some embodiments, the one or more edge supports are configured to form one or more grooves in situ in the one or more edge supports from contact with the one or more edges of the furlable boom. In some embodiments, the one or more edge supports include one or more spring components configured to apply a preload to a first edge from the one or more edges of the furlable boom while the one or more hard stops make contact with a second edge from the one or more edges of the furlable boom.

Some embodiments of the system include an inner guide positioned between a portion of the furlable boom furled around a boom spool and a portion of the furlable boom that is being deployed or retracted from the boom spool on a concave side of the furlable boom. Some embodiments of the system include an outer guide positioned opposite to the inner guide on a convex side of the furlable boom such that the portion of the furlable boom that is being deployed or retracted from the boom spool moves between at least a portion of the inner guide and a portion of the outer guide.

Some embodiments of the system include a tension drive coupled with the furlable boom such that the furlable boom is extendible; the system may also include a boom spool drive coupled with the furlable boom such that the furlable boom is retractable. In some embodiments, the tension drive includes a ribbon drive with a pull ribbon. In some embodiments, the pull ribbon is fabricated from steel. Some embodiments of the system include a clutch mechanism configured to disengage the tension drive when the boom spool drive is driven. Some embodiments of the system include a ratchet and pawl configured to disengage the boom spool drive when the tension drive is driven.

Some embodiments of the system include an insertable stop component. Some embodiments include a store energy component configured to press an end of the insertable stop component into a feature of the furlable boom to control deployment of the furlable boom. Some embodiments include a shutoff component configured to facilitate stopping the deployment of the furlable boom when at least a portion of the insertable stop component presses into or passes over the feature of the furlable boom. Some embodiments of the system include a reinforcement component configured to locally strengthen a portion of the furlable boom. In some embodiments, the reinforcement component is co-cured with the furlable boom during fabrication. In some embodiments, the reinforcement component is configured to engage the insertable stop component.

In some embodiments of the system, the furlable boom is fabricated with an axial curvature along its length. In some embodiments, the furlable boom is configured to exhibit a deployed geometry with a central axis parallel to an axial direction when a portion of the furlable boom is coupled with a boom spool. In some embodiments, the furlable boom is configured to exhibit a deployed geometry with a central axis with a negative curvature (e.g., away from a slit of a slit-tube boom) when a portion of the furlable boom is coupled with a boom spool.

Some embodiments of the system include a spiral harness enclosed within the furlable boom when the furlable boom is deployed. Some embodiments include a coiled spring coupled with the spiral harness to provide a return force for retraction.

Some embodiments of the system include a rotary encoder. Some embodiments include a rotatable shaft coupled with a boom spool, wherein the boom spool is coupled with the furlable boom. Some embodiments include one or more gears configured to couple the rotary encoder with the rotatable shaft such that the rotary encoder rotates less than 360 degrees when the rotatable shaft rotates 360 degrees or more. In some embodiments, the rotary encoder is at least configured or calibrated to determine a deployment position of the furlable boom.

In some embodiments of the system, the furlable boom includes a slit-tube composite boom. Other furlable booms may be utilized.

The foregoing has outlined rather broadly the features and technical advantages of embodiments according to the disclosure in order that the detailed description that follows may be better understood. Additional features and advantages will be described hereinafter. The conception and specific embodiments disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3A, FIG. 3B, FIG. 3C, FIG. 3D, FIG. 3E, FIG. 3F, and FIG. 3G show furlable boom devices in accordance with various embodiments.

FIG. 8A, FIG. 8B, FIG. 8C, FIG. 8D, FIG. 8E, FIG. 8F, FIG. 8G, and FIG. 8H show deployment devices in accordance with various embodiments.

DETAILED DESCRIPTION

Figure 1A:
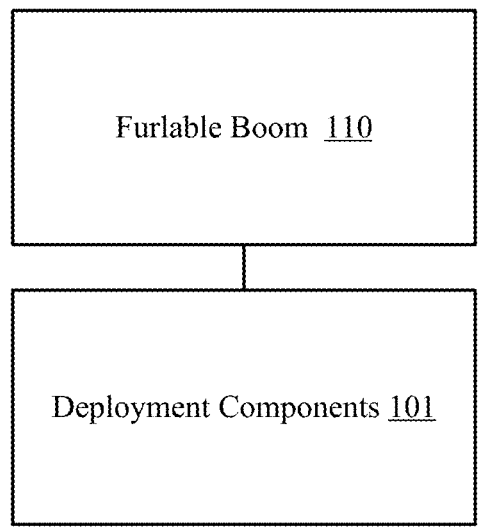
FIG. 1A, FIG. 1B, and FIG. 1C show boom deployment systems in accordance with various embodiments.

This description provides embodiments, and is not intended to limit the scope, applicability or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted or combined. Also, aspects and elements described with respect to certain embodiments may be combined in various other embodiments. It should also be appreciated that the following systems, devices, and methods may individually or collectively be components of a larger system, wherein other procedures may take precedence over or otherwise modify their application.

Devices, systems, and methods for precision boom deployment are provided. The different devices, systems, and/or methods may be applicable for different space applications and some or all may have terrestrial applications. Precision deployment in accordance with various embodiments may be applicable for mechanical docking, device deployment, and/or structural applications, such as antennas, for example. Some embodiments may also provide for higher performance. Some embodiments may provide for applications that may involve accurate deployment orientation.

Some embodiments may be used for different mechanical docking systems for space applications. The tools and techniques provided may be utilized to allow for deployment resulting in multiple spacecraft being tethered together. Some embodiments may allow for retraction, where two spacecrafts may be pulled securely together with mechanical interfacing between the spacecraft or where deployed component may be retracted.

The boom deployment systems, devices, and/or methods provided in accordance with various embodiments may allow for a furlable boom to furl into a very compact volume and may then deploy to a long length while forming a dimensionally precise and stable structure. Some embodiments may be used for applications such as radio-frequency antenna and sensor support structures on space-satellites, which may involve precise and stable dimensions that may be repeatable over multiple deployment cycles and may be stable over time and under loading conditions such as accelerations and extreme temperatures. The boom deployment systems, devices, and/or methods may allow for the furlable boom to be re-stowed, on the ground or in space, and may be repeatably re-deployed into the same dimensionally precise and stable structure. In some embodiments, the furlable boom may be constructed of a rigid and dimensionally stable material with a structurally efficient cross section when in the deployed configuration. The structurally efficient cross section that may be utilized for different embodiments may include a slit-tube boom, which may form a tubular or channel-like cross section when deployed but may flatten and furl around a cylindrical spool for compact stowage.

The boom deployment systems, devices, and/or methods provided in accordance with various embodiments may include interfaces and/or supports for the furlable boom, such as a slit-tube boom, which may allow for flattening of the cross section in the stowed state but also provide rigid and stable boundary conditions in the deployed state that may be involved for the utilization of a slit-tube or other furlable boom as a precision deployable structure. In some embodiments, for example, the slit tube boom's interfaces and supports may begin at the distal end of the boom. An end fitting in accordance with various embodiments may allow the furlable boom cross-section to open and deform, which may enable compact furling but may also take advantage of the boom end-motion during deployment to guide the furlable boom into an end boundary condition during deployment. The boundary condition provided within the end fitting may prevent warping and deformation of the slit-tube boom cross section, which may be involved for the slit-tube booms, or other furlable booms, to be used as a precision structure. The end fitting in accordance with various embodiments may also provide an attachment feature for instruments or other components.

In some embodiments, the base of the furlable boom is supported by a complimentary pair of support types. One of the complimentary support types may include boom supports, which may provide a support around the outside surface of the furlable boom to create a rigid radial boundary condition around the circumference of the furlable boom. The compliment to the boom supports may include edge supports, which may apply pressure to the boom edges forcing a radial preload between the boom outer surface and the rigid boom supports. The support system in accordance with various embodiments may provide a precise and rigid boundary condition that may help prevent warping and distortion of the furlable boom at the base but may allow it to slide in the axial direction during deployment and furling. The support system may be further complimented by a latching pin device, which may be passed through an insert on the boom at any deployment length to determine precisely the deployed length and provide an axial boundary condition at the base of the furlable boom.

The tools and techniques provided in accordance with various embodiments with respect to the furlable boom (such as a slit-tube boom), its interfaces, and supports may be complimented by furling components to guide and hold the furled boom and drive components to drive the boom outward during deployment and inward during furling. The main furling components that may be used may include a boom spool to hold the furled boom and one or more guides, which may be referred to as wings or shrouds in some embodiments, to guide the furlable boom from the boom spool into its base supports. The main drive component may be a ribbon, which may be co-wrapped with the furlable boom onto the boom spool and may then be pulled off of the boom spool by a motor to apply deployment force to the furlable boom in a manner that may use very few moving parts, may generate very little friction, and may enable very high boom axial-deployment forces.

Turning now to FIG. 1A, a boom deployment system 100 in accordance with various embodiments is provided. System 100 may include a deployable, furlable boom 110 that may be coupled with or utilized with respect to one or more deployment components 101. In general, system 100 may be configured for precision deployment in a variety of ways. Different deployment components 101 may be utilized as described herein.

In some embodiments of system 100, deployment components 101 include an end fitting configured to couple with the furlable boom 110; one or more portions of the end fitting may engage one or more end portions of the furlable boom 110 when the furlable boom 110 may be deployed and may release the one or more end portions of the furlable boom 110 when the furlable boom 110 may be stowed. In some embodiments, the one or more portions of the end fitting includes an end support configured to direct the one or more end portions of the furlable boom 110 during deployment of the furlable boom 110 and support the one or more end portions of the furlable boom 110 after deployment. In some embodiments, the end fitting includes an insert configured to support an inner surface of the furlable boom 110 when the furlable boom 110 is deployed.

In some embodiments of the system 100, deployment components 101 include one or more static contoured supports configured to match a geometry of the furlable boom 110 as the furlable boom 110 transitions from a furled geometry to a deployed geometry. In some embodiments, the one or more of the static contoured supports includes a cutout portion configured to accommodate a deformation of a portion of the furlable boom 110. Some embodiments include deployment components 101 that include one or more edge supports configured to supply a circumferential or downward force on the furlable boom 110; the one or more edge supports may include one or more edge supports. In some embodiments, at least one of the one or more edge supports is configured to provide one or more hard stops for one or more edges of the furlable boom 110. In some embodiments, the one or more edge supports are configured to form one or more grooves in situ in the one or more edge supports from contact with the one or more edges of the furlable boom 110. In some embodiments, the one or more edge supports include one or more spring components configured to apply a preload to a first edge from the one or more edges of the furlable boom 110 while the one or more hard stops make contact with a second edge from the one or more edges of the furlable boom 110.

In some embodiments of the system 100, deployment components 101 include an inner guide positioned such that the inner guide is positioned between a portion of the furlable boom 110 furled around a boom spool and a portion of the furlable boom 110 that is being deployed or retracted from the boom spool on a concave side of the furlable boom 110. Some embodiments of the system 100 include deployment components 101 that include an outer guide positioned opposite the inner guide on a convex side of the furlable boom 110 such that the portion of the furlable boom 110 that is being deployed or retracted from the boom spool moves between at least a portion of the inner guide and a portion of the outer guide.

In some embodiments of the system 100, deployment components 101 include a tension drive coupled with the furlable boom 110 such that the furlable boom 110 is extendible; the deployment components 101 may also include a boom spool drive coupled with the furlable boom 110 such that the furlable boom 110 is retractable. In some embodiments, the tension drive includes a ribbon drive with a pull ribbon. In some embodiments, the pull ribbon is fabricated from steel. Some embodiments of the system 100 include deployment components 101 that include a clutch mechanism configured to disengage the tension drive when the boom spool drive is driven. Some embodiments of the system 100 include deployment components 101 that include a ratchet and pawl configured to disengage the boom spool drive when the tension drive is driven.

In some embodiments of the system 100, deployment components 101 include an insertable stop component. In some embodiments, deployment components 101 include a store energy component configured to press an end of the insertable stop component into a feature of the furlable boom 110 to control deployment of the furlable boom 110. Some embodiments include deployment components 101 that include a shutoff component configured to facilitate stopping the deployment of the furlable boom 110 when at least a portion of the insertable stop component presses into or passes over the feature of the furlable boom 110. In some embodiments of the system 100, deployment components 101 include a reinforcement component configured to locally strengthen a portion of the furlable boom 110.

In some embodiments, the reinforcement component is co-cured with the furlable boom 110 during fabrication. In some embodiments, the reinforcement component is configured to engage the insertable stop component.

In some embodiments of the system 100, the furlable boom 110 is fabricated with an axial curvature along its length. In some embodiments, the furlable boom 110 is configured to exhibit a deployed geometry with a central axis parallel to an axial direction when a portion of the furlable boom 110 is coupled with a boom spool. In some embodiments, the furlable boom 110 is configured to exhibit a deployed geometry with a central axis with a negative curvature when a portion of the furlable boom 110 is coupled with a boom spool.

In some embodiments of the system 100, deployment components 101 include a spiral harness enclosed within the furlable boom 110 when the furlable boom 110 is deployed. Some embodiments include a coiled spring coupled with the spiral harness to provide a return force for retraction.

In some embodiments of the system 100, deployment components 101 include a rotary encoder. Some embodiments include a rotatable shaft coupled with a boom spool, wherein the boom spool is coupled with the furlable boom 110. Some embodiments include one or more gears configured to couple the rotary encoder with the rotatable shaft such that the rotary encoder rotates less than 360 degrees when the rotatable shaft rotates 360 degrees or more. In some embodiments, the rotary encoder is at least configured or calibrated to determine a deployment position of the furlable boom 110.

In some embodiments of the system 100, the furlable boom 110 includes a slit-tube composite boom. The furlable boom 110 may include other designs and boom cross-section shapes, such as triangular rollable and collapsible booms.

Figure 1B:
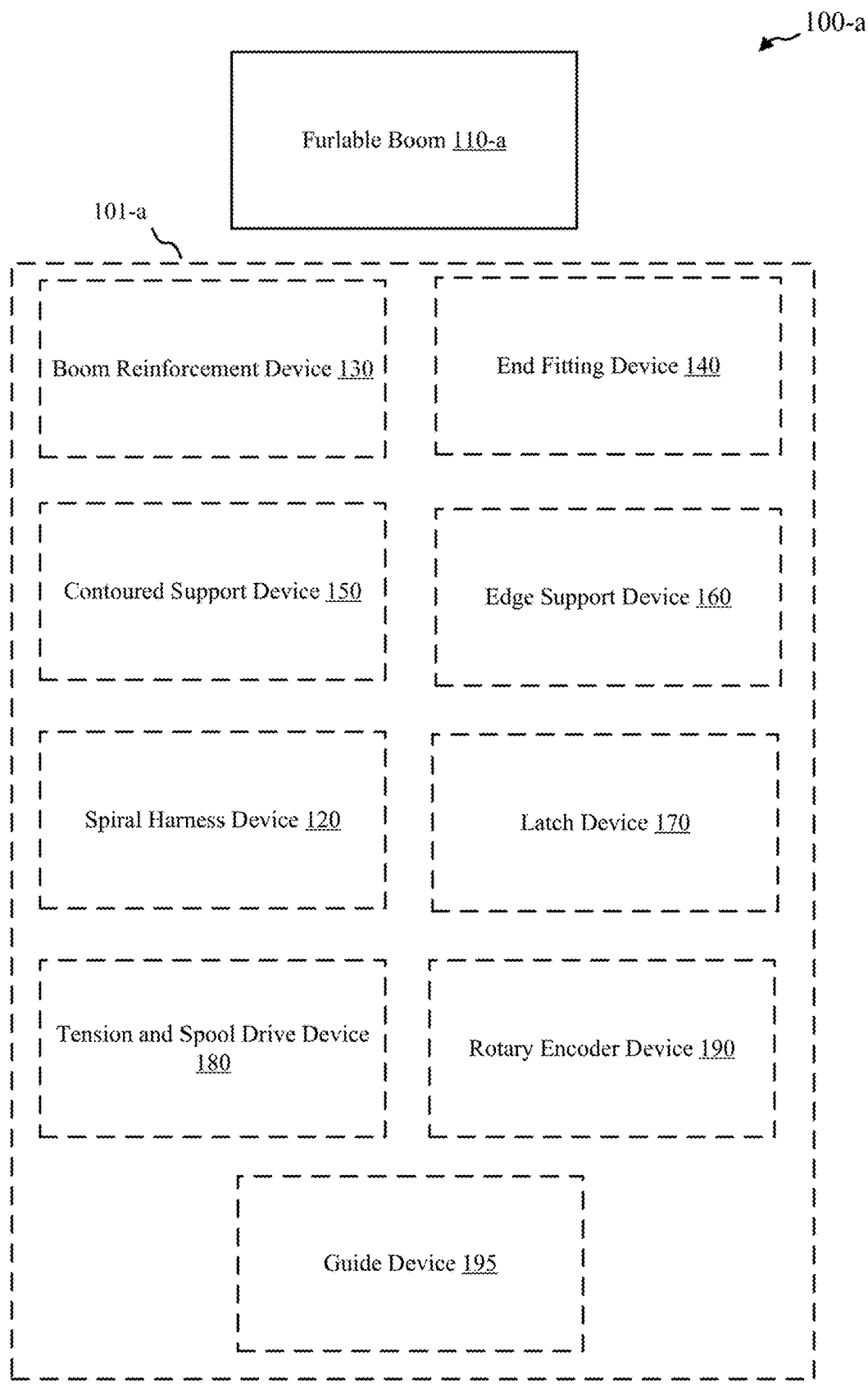

For example, FIG. 1B shows a boom deployment system 100-a in accordance with various embodiments, where system 100-a may be an example of system 100 of FIG. 1A. System 100-a may include a furlable boom device 110-a, which may be an example of furlable boom 110 of FIG. 1A. System 100-a may include a variety of aspects included in deployment components 101-a, which may include one or more of the following devices: boom reinforcement device 130, end fitting device 140, contoured support device 150, edge support device 160, spiral harness device 120, latch device 170, combined spool and tape drive 180, rotary encoder device 190, and/or guide device 195. The variety of devices reflected with respect to the deployment components 101-a may be combined in different ways, different numbers, and/or different combinations; these devices may share aspects with each other from deployment components 101-a and/or furlable boom device 110-a in some embodiments.

Furlable boom device 110-a may include a variety of different configurations, including configurations with zero, positive, and/or negative curvature in the deployed configuration. In general, furlable boom device 110-a may be referred to as a furlable boom. Furlable boom device 110-a may include a slit-tube configuration and may be configured with composite materials. Some embodiments may utilize other furlable boom designs and broom cross-sectional shapes, such as triangular rollable and collapsible booms.

In some embodiments of the system 100-a, the furlable boom 110-a is fabricated with a central axis that has non-zero curvature along its length. In some embodiments, the furlable boom 110-a is configured to exhibit a deployed geometry with a central axis parallel to an axial direction when a portion of the furlable boom 110-a is coupled with a boom spool, which may be one of the components and or devices of deployment components 101-a. In some embodiments, the furlable boom 110-a is configured to exhibit a deployed geometry with a central axis with a negative curvature when a portion of the furlable boom 110-a is coupled with a boom spool.

For example, in some embodiments, the furlable boom 110-a is fabricated with a central axis with a negative curvature away from a slit direction. In some embodiments, furlable boom 110-a may be configured to deploy into a state with a central axis without curvature in an axial direction in some embodiments. The furlable boom 110-a may be configured to deploy into a state with a central axis without curvature in the axial direction when an end of the furlable boom 110-a is coupled with a boom spool. In some embodiments, the furlable boom device 110-a is configured to deploy into a state with a central axis with negative curvature when an end of the furlable boom 110-a is fixed. Some embodiments of furlable boom 110-a may fabricated with a central axis with other curvature, such as positive curvature. Some embodiments of furlable boom 110-a may be fabricated with a central axis with no curvature.

In some embodiments, the deployment components 101-a may include a spiral harness device 120, which may include a spiral harness enclosed within the furlable boom 110-a when the furlable boom 110-a is deployed. A proximal end of the spiral harness may be coupled with a boom housing, which also may be part of system 100-a, and a distal end of the spiral harness may be coupled with a distal end of the furlable boom 110-a. Some embodiments include a shroud installed around the spiral harness to limit a motion of at least a portion of the spiral harness within the boom housing. In some embodiments, the spiral harness is connectorized with at least the distal end of the furlable boom 110-a or the boom housing. Some embodiments include a coiled spring coupled with the spiral harness to provide a return force for retraction.

In some embodiments, the deployment components 101-a may include a rotary encoder device 190, which may include a rotary encoder and a rotatable shaft coupled with a boom spool; the boom spool may be coupled with the furlable boom 110-a. Some embodiments include one or more gears configured to couple the rotary encoder with the rotatable shaft such that the rotary encoder rotates less than 360 degrees when the rotatable shaft rotates 360 degrees or more. In some embodiments of the rotary encoder device 190, the shaft includes a ribbon spool and/or a clutch shaft. In some embodiments of the rotary encoder device 190, the one or more gears include a zero-backlash gear. In some embodiments, the rotary encoder is configured for determining a position of the furlable boom 110-a. In some embodiments, the rotary encoder is configured to maintain the position of the furlable boom 110-a after a power loss.

In some embodiments, the deployment components 101-a may include a tension and spool drive device 180. The tension and spool drive device 180 may include a tension drive coupled with the furlable boom 110-a such that the furlable boom 110-a is extendible; the tension and spool drive device 180 may also include a boom spool drive coupled with the furlable boom 110-a such that the furlable boom 110-a is retractable. In some embodiments, the tension and spool drive device 180 includes a ribbon drive with a pull ribbon. In some embodiments, the pull ribbon is fabricated from steel. Some embodiments of the tension and spool drive device 180 include a clutch mechanism configured to disengage the tension drive when the boom spool drive is driven. Some embodiments of the tension and spool drive device 180 include a ratchet and pawl configured to disengage the boom spool drive when the tension drive is driven.

For example, the tension and spool drive device 180 may include a combined spool and tape drive device may include a boom deployment mechanism and/or a boom retraction mechanism. The boom deployment mechanism may include a tension drive; the tension drive may include a ribbon drive. The boom retraction mechanism may include a boom spool drive. Some embodiments include a motor coupled with boom deployment mechanism and with the boom retraction mechanism; the motor may include a stepper motor, a brusher motor, or a piezo-electric motor, for example. Some embodiments include a clutch mechanism configured to disengage the boom deployment mechanism when the boom retraction mechanism is driven. Some embodiments a ratchet and pawl configured to disengage the boom retraction mechanism when the boom deployment mechanism is driven. In some embodiments, the ribbon drive includes a steel ribbon; other materials may be utilized such as Kevlar or plastics. Some embodiments include a deployable boom, such as furlable boom 110-*a*, coupled with the boom deployment mechanism and with the boom retraction mechanism. The deployable boom may include a slit-tube boom.

Some embodiments of the tension and spool drive device 180 may be referred to as a combined spool and tape drive device, which may primarily include aspects related to a tape or ribbon drive. For example, device 180 may include a boom spool configured to couple with the furlable boom 110-*a* such that the furlable boom 110-*a* may be retractable, a pull ribbon configured to couple with the furlable boom 110-*a* such that the furlable boom 110-*a* may be extendible, a ribbon spool coupled with the pull ribbon, and/or a motor coupled with the ribbon spool. The furlable boom, which may be an example of furlable boom 110-*a*, may be coupled with the boom spool and/or the pull ribbon. The furlable boom 110-*a* may include a slit-tube boom, for example. The pull ribbon may include a stainless-steel ribbon. The pull ribbon may be configured to limit deployment of the furlable boom 110-*a* and/or to allow for retraction of the furlable boom 110-*a*.

In some embodiments, the deployment components 101-*a* may include an end fitting device 140, which may include an end fitting configured to couple with the furlable boom 110-*a*; one or more portions of the end fitting may engage one or more end portions of the furlable boom 110-*a* when the furlable boom 110-*a* may be deployed and may release the one or more end portions of the furlable boom 110-*a* when the furlable boom 110-*a* may be stowed. In some embodiments, the one or more portions of the end fitting includes an end support configured to direct the one or more end portions of the furlable boom 110-*a* during deployment of the furlable boom 110-*a* and support the one or more end portions of the furlable boom 110-*a* after deployment. In some embodiments, the end fitting includes an insert configured to support an inner surface of the furlable boom 110-*a* when the furlable boom 110-*a* is deployed.

In some embodiments of the end fitting device 140, one or more portions of the end fitting may constrain one or more end portions of the furlable boom 110-*a*. Some embodiments of end fitting device 140 include one or more spine attachments configured to couple the end fitting with the end of the furlable boom 110-*a*. In some embodiments, the end fitting includes an insert configured to fit within the furlable boom 110-*a* when the boom is deployed. In some embodiments, one or more portions of the end fitting includes one or more apertures, slots, grooves, indentations, or protuberances configured to fit with one or more features of the one or more end portions of the furlable boom 110-*a*. In some embodiments, the one or more features of the one or more end portions of the furlable boom 110-*a* include one or more apertures, slots, grooves, indentations, or protuberances.

Some embodiments of system 100-*a* may include, as part of the deployment components 101-*a*, a latch device 170, which may include an insertable stop component and/or a store energy component configured to press an end of the insertable stop component into a feature of the furlable boom 110-*a* to control deployment of the furlable boom 110-*a*. The insertable stop component may include a pin. The store energy component may include a spring, such as a compression spring or a torsion spring. The feature of the furlable boom 110-*a* may include an aperture, a slot, a groove, or an indentation of the furlable boom 110-*a*. In some embodiments, the furlable boom 110-*a* includes a slit-tube boom, which may be a composite boom, and the feature of the furlable boom 110-*a* includes a reinforcement component, which may be configured to engage the insertable stop component. Some embodiments include a shutoff component configured to facilitate stopping the deployment of the furlable boom 110-*a* when at least a portion of the insertable stop component presses into or passes over the feature of the furlable boom 110-*a*. The shutoff component may include a sensor configured to determine when at least a portion of the insertable stop component at least presses into the feature of the furlable boom 110-*a* or passes over the feature of the furlable boom 110-*a*.

For example, some embodiments of system 100-*a* include a boom reinforcement device 130, which may include one or more reinforcement components, as part of deployment components 101-*a*. The one or more reinforcement components may be coupled with the furlable boom 110-*a*. The reinforcement component may locally strengthen a portion of the furlable boom 110-*a*. In some embodiments, the reinforcement component includes an aperture. The reinforcement component may be co-cured with the furlable boom 110-*a* during fabrication. The reinforcement component may include a stainless-steel insert. In some embodiments, the furlable boom 110-*a* includes a composite material. In some embodiments, the aperture is configured to create a close-fitting bearing surface. The aperture may be configured to engage the latch device 170. In some embodiments, the reinforcement component may reinforce an edge of the furlable boom 110-*a*.

Some embodiments of system 100-*a* include, as part of the deployment components 101-*a*, one or more contoured support devices 150, which may include one or more static contoured supports configured to match a geometry of the furlable boom 110-*a* as the furlable boom 110-*a* transitions from a furled geometry to a deployed geometry. In some embodiments, the static contoured support includes a cutout portion configured to accommodate a deformation of a portion of the furlable boom 110-*a*. Some embodiments of system 100-*a*, as part of deployment components 101-*a*, include one or more edge support devices 160, which may include one or more edge supports configured to supply a circumferential or downward force on the furlable boom 110-*a*. In some embodiments, the one or more edge supports may be configured to provide hard stops for one or more edges of the furlable boom 110-*a*. In some embodiments, the edge supports include one or more spring components configured to apply a preload to one or more edges of the furlable boom 110-*a*, while the one or more hard stops makes contact with one or more other edges of the furlable boom 110-*a*. In some embodiments, one or more of the one or more edge supports are configured to form one or more grooves in situ in the one or more edge supports from contact with the one or more edges of the furlable boom 110-*a*.

Some embodiments of system 100-*a* include, as part of the deployment components 101-*a*, one or more guide devices 195, which may include an inner guide positioned on a convex side of the furlable boom 110-*a* between a portion of the furlable boom 110-*a* furled around the boom spool and a portion of the furlable boom 110-*a* that may be being deployed or retracted from A boom spool. Some embodiments of the one or more guide devices 195 include an outer guide positioned proximal to the inner guide such that the portion of the furlable boom 110-*a* that is being deployed or retracted boom spool moves between at least a portion of the inner guide and a portion of the outer guide. In some embodiments, the inner guide may be referred to as a wing, while the outer guide may be referred to as a shroud.

Figure 1C:
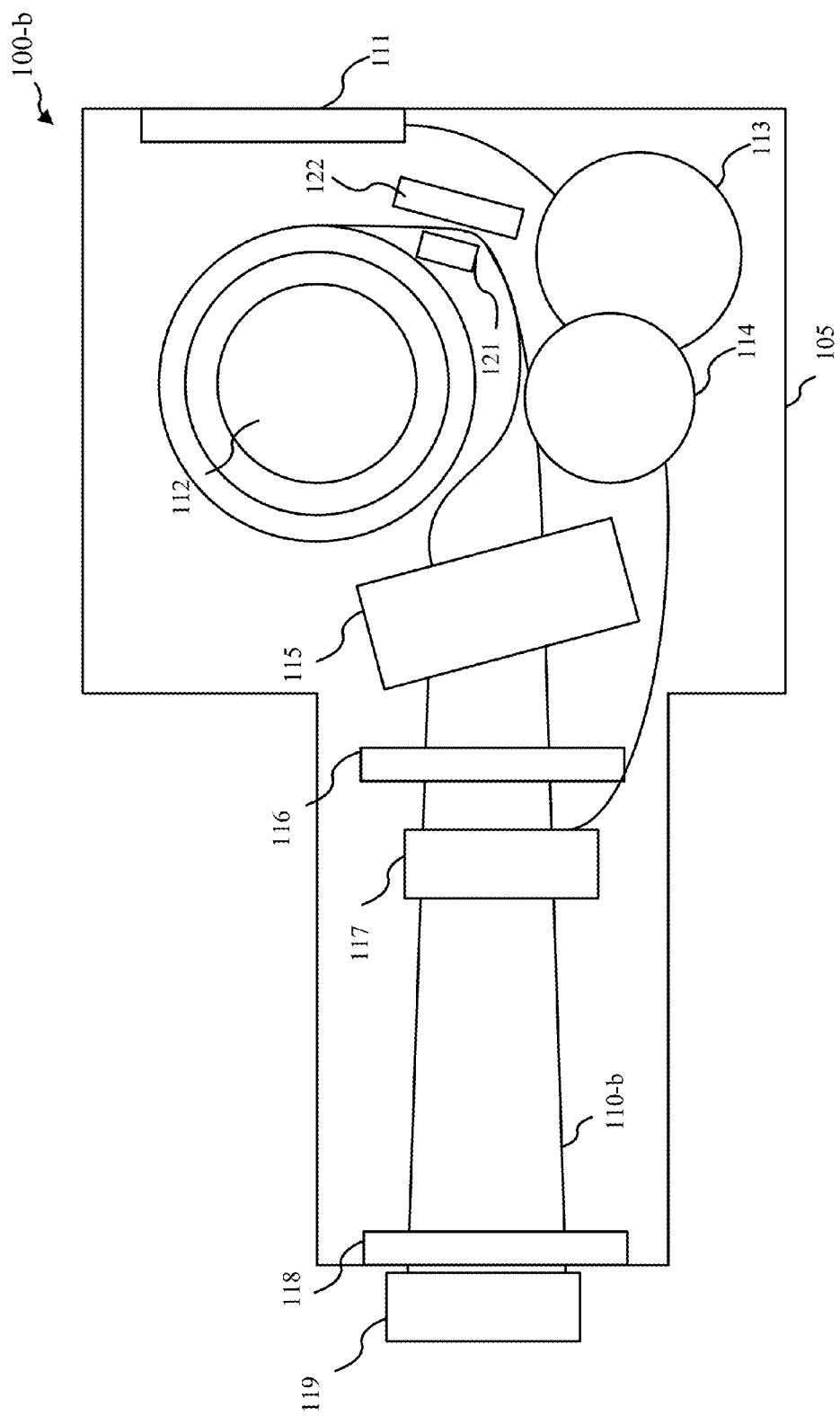

FIG. 1C shows a general layout of a boom deployment system 100-*b* in accordance with various embodiments, where system 100-*b* may be an example of system 100 of FIG. 1A and/or system 100-*a* of FIG. 1B. System 100-*b* may include a furlable boom 110-*b* that may be coupled with a boom spool 112. Furlable boom 110-*b* may include a slit-tube boom or other rollable boom, which may be configured to roll around boom spool 112; in some embodiments, furlable boom 110-*b* may be fabricated from a composite material. Furlable boom 110-*b* may be an example of furlable boom 110 of FIG. 1A and/or boom device 110-*a* of FIG. 1B.

System 100-*b* may include other components such as one or more electrical harnesses 111, one or more motors 113, one or more drive trains 114, one or more drive and/or reaction rollers 115, one or more aft boom supports and/or edge supports 116, one or more latch components 117, one or more forward boom supports and/or edge supports 118, and/or one or more distal components 119, an inner guide 121, and/or an outer guide 122. System 100-*b* may also include one or more housings 105, which may be referred to as a boom housing and/or deployment canister in some embodiments. Distal component 119 may be an example of end fitting device 140 of FIG. 1B. Forward boom support and/or edge supports 118 may be an example of contoured support device 150 and/or edge support device 160 of FIG. 1B. Aft boom support 116 may be an example of contoured support device 150 and/or edge support device 160 of FIG. 1B. Latch components 117 may be an example of latch device 170 of FIG. 1B. Motor 113, drive train 114, and/or drive and/or reaction wheels 115 may be aspects of tension and pool drive device 180 of FIG. 1B. Inner guide 121 and/or outer guide 122 may be examples of guide devices 195 of FIG. 1B. Examples of these components and/or devices may be described in more detail herein.

Figure 2A:
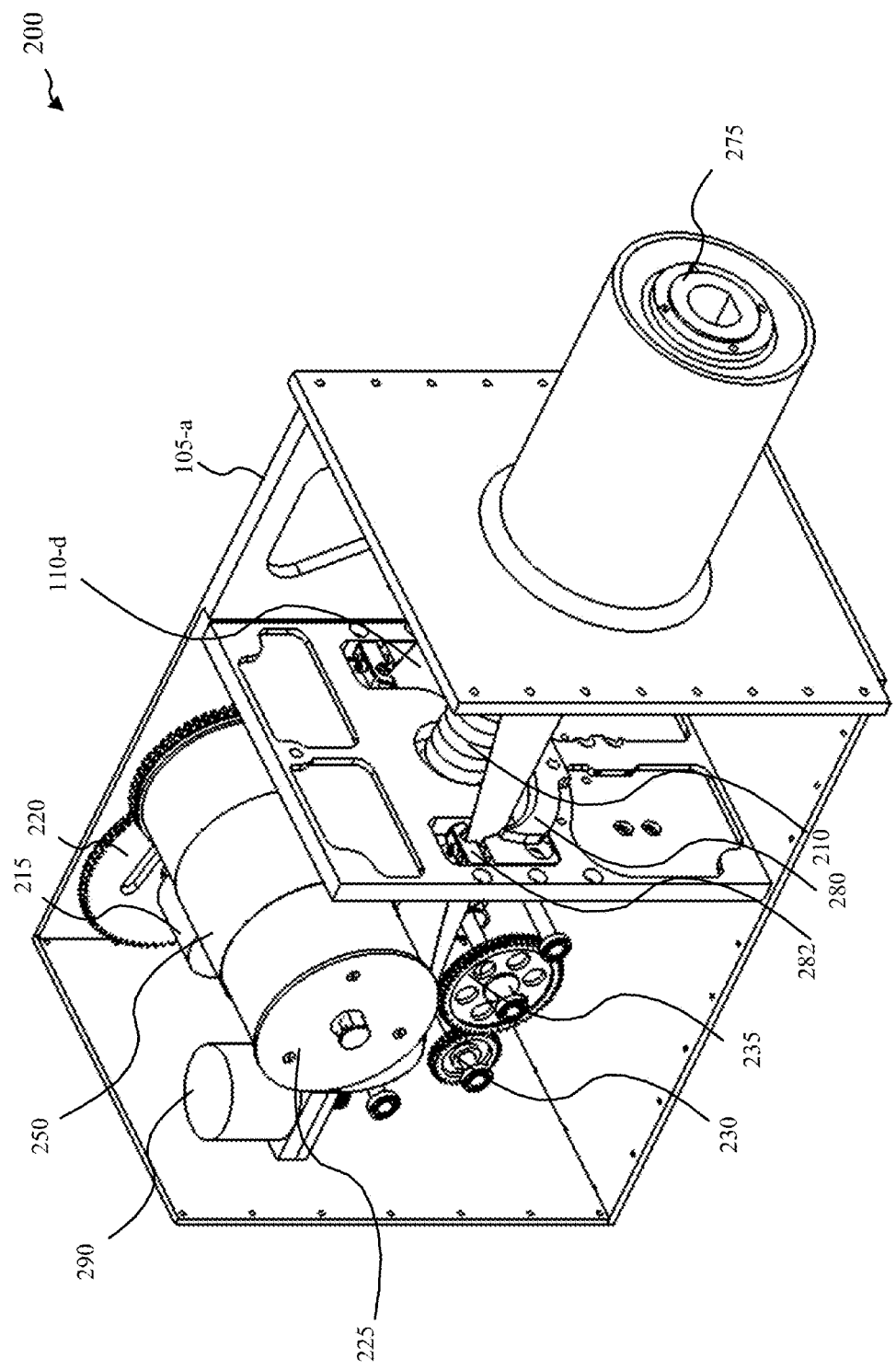
FIG. 2A, FIG. 2B, FIG. 2C, and FIG. 2D show different perspectives on a boom deployment system in accordance with various embodiments.
Figure 2B:
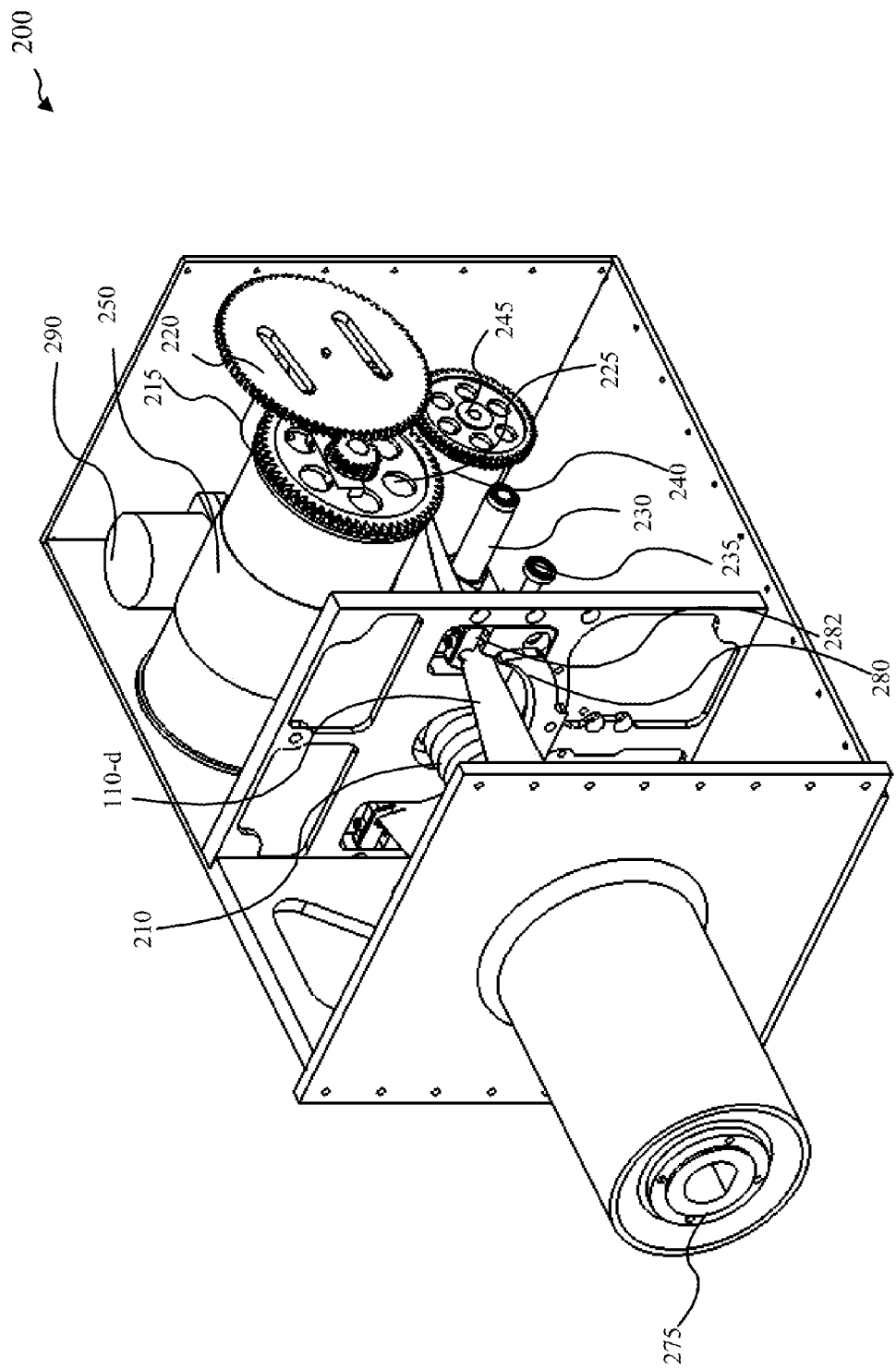
Figure 2C:
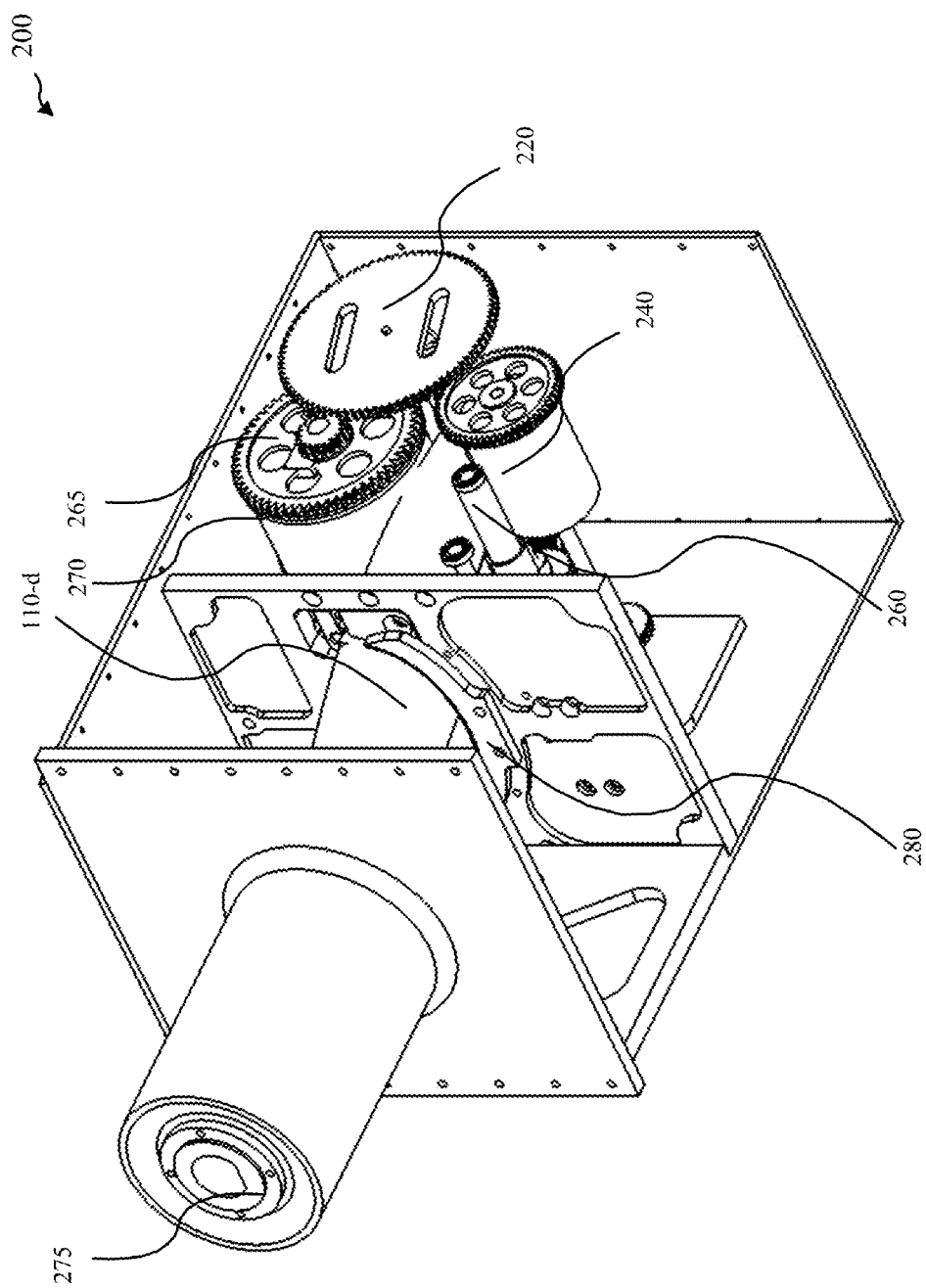

Turning now to FIG. 2A, FIG. 2B, and FIG. 2C, three different perspectives of a system 200 in accordance with various embodiments are provided. The system 200 may be an example of system 100 of FIG. 1A, system 100-*a* of FIG. 1B, and/or system 100-*b* of FIG. 1C.

System 200 may include a variety of components such as a furlable boom 110-*d*. System 200 may include a spiral wire harness 210, which may an example of aspects of the spiral harness device 120 of FIG. 1B. System 200 may include encoder components, such as encoder 215 and encoder gears 220, which may be examples of aspects of rotary encoder device 190 of FIG. 1B. System 200 may include a boom spool 225, a clutch gear 230, a ribbon spool gear 235, an electric clutch 240, a worm gear 245, a drive tape 250, a tape drive spool 260, a motor 290, a boom spool gear 265, and/or a ratchet 270; these components may be examples of aspects of the tension and spool drive device 180 of FIG. 1B. System 200 may include boom supports, such as a static contoured support 280 and edge support 282, which may be examples of aspects of contoured support device 150 and/or edge support device 160 of FIG. 1B. System 200 may include a distal end fitting 275, which may an example of aspects of end fitting device 140 of FIG. 1B.

Systems such as system 200 in accordance with various embodiments may include a deployable and retractable boom, such as a slit-tube boom 110-*d*, which may generally be referred to as a furlable boom. An actuator may be mounted to the end of the boom 110-*d* with a simple metallic interface. The structural slit-tube boom 110-*d* may be composed of traditional fiber reinforced epoxy polymer with a laminate architecture giving the ability to roll and unroll thousands of cycles. The boom 110-*d* may serve as a conduit for a simple spiral wire harness 210 that electrically connects a spacecraft, for example, to the distal end actuator mechanism. A motorized tape-drive mechanism may deploy the boom 110-*d* with the maximum possible authority without causing undue stress on the boom material and without causing the rolled boom to balloon away from its spool. During retraction, the same motor 290 may be used to directly drive the spool on which the boom mounted. The deployment and retraction motor 290 may be a stepper motor utilizing a worm-gear reduction that may be self-locking so that a highly stable tension load may be maintained in the boom when the motor is powered off. A rotary absolute encoder 215 may be geared to the boom spool 225 to precisely indicate the deployed length.

Systems in accordance with various embodiments such as system 200 may have numerous advantages and/or improvements over other known tools and techniques. For example, some embodiments may be highly resilient including long cycle life and high surface damage tolerance. Some embodiments may utilize composite booms that may not be gage limited and properties may be infinitely tailorable. High flexibility boom in combination with high lateral and axial strength may be provided. Deployment and retraction mechanisms may enable performance near boom theoretical limit. Some embodiments include a high accuracy encoder configuration. Some embodiments include a simple and reliable harness that may not involve moving parts such as slip-ring or twist capsule.

Figure 2D:
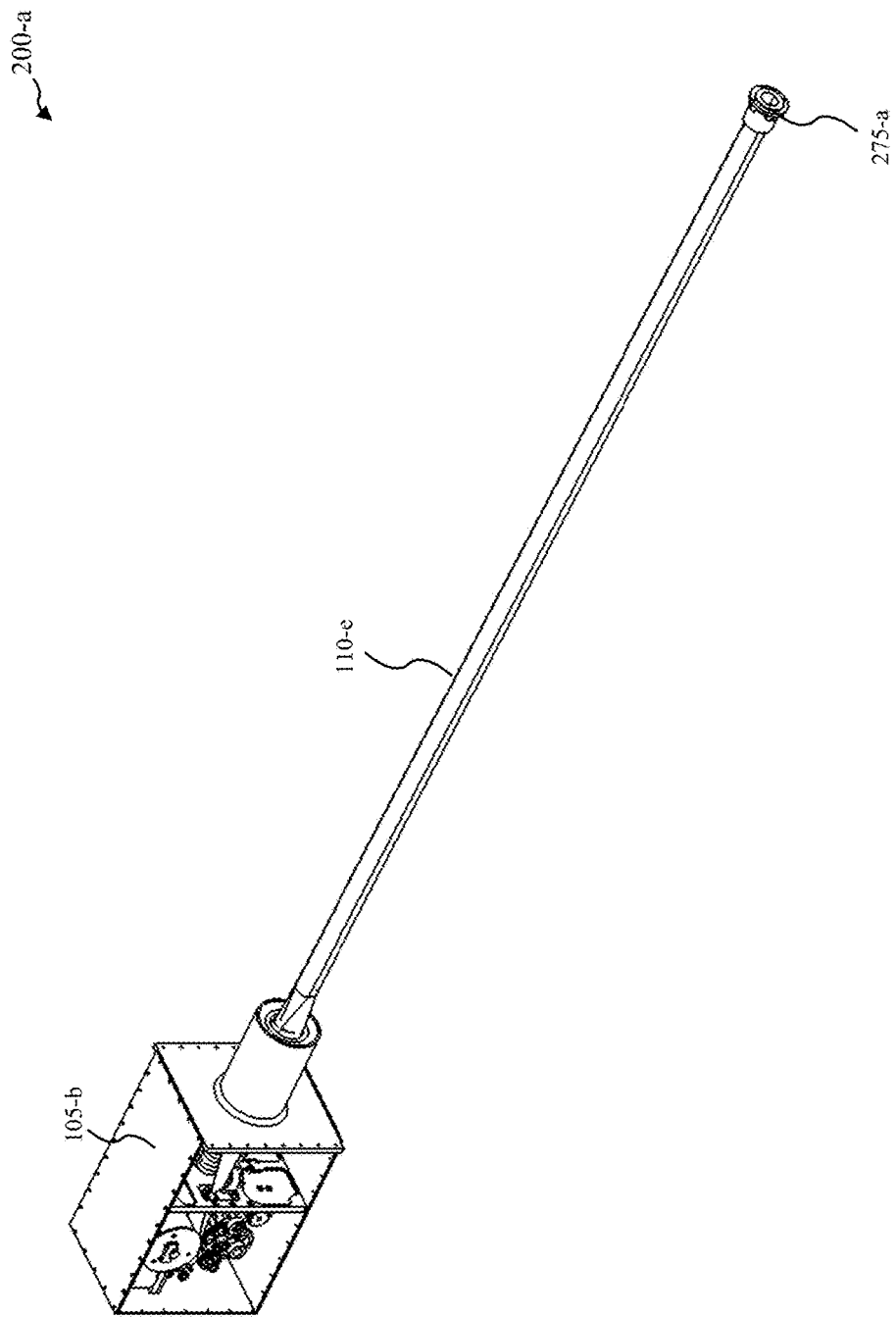

Turning now to FIG. 2D, a system 200-*a* in accordance with various embodiments is provided. System 200-*a* may be an example of system 200 of FIGS. 2A-2C, with furlable boom 110-*e* in a deployed state. System 200-*a* may reflect a distal end fitting 275-*a* that may include components configured as mechanical interfaces in accordance with various embodiments. An interface plate, which may be referred to as a spacecraft interface in some embodiments, may be placed coincident with the inner wall of a bus, such as a spacecraft bus. interface includes may include flanges with through holes for fasteners to pass through for mounting. Merely by way of example, the distal end mechanical interface may be 2 inches in diameter with four threaded mounting holes for clamping and a cylindrical step approximately 0.060 inches in height to provide a shear interface; other configurations and dimensions may be utilized.

In some embodiments, electrical connectors may be provided on the sidewall of the deployer box 105-*b* for motor, control, and/or harness wiring. A harness connector may be provided at the distal end with specified harness slack to connect with the distal end actuator. The volumetric dimensions of the external complete Faraday cage may be provided for example.

Figure 2E:
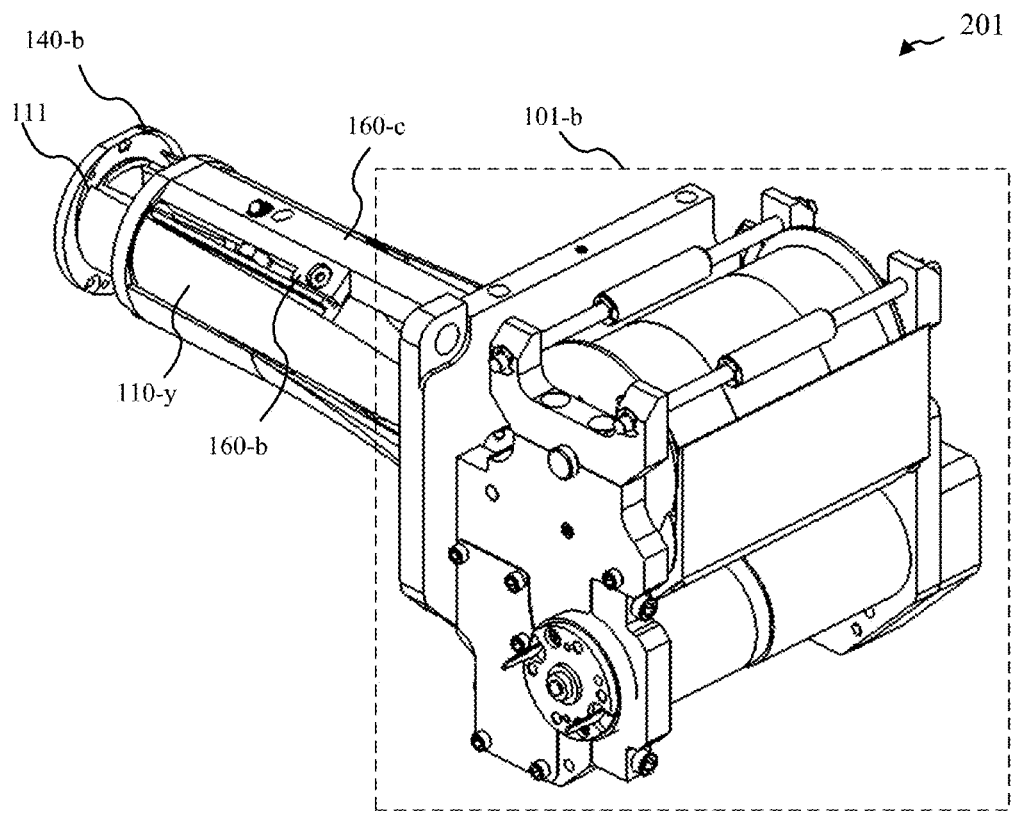
FIG. 2E, FIG. 2F, FIG. 2G, and FIG. 2H, show aspects of a boom deployment systems in accordance with various embodiments.
Figure 2F:
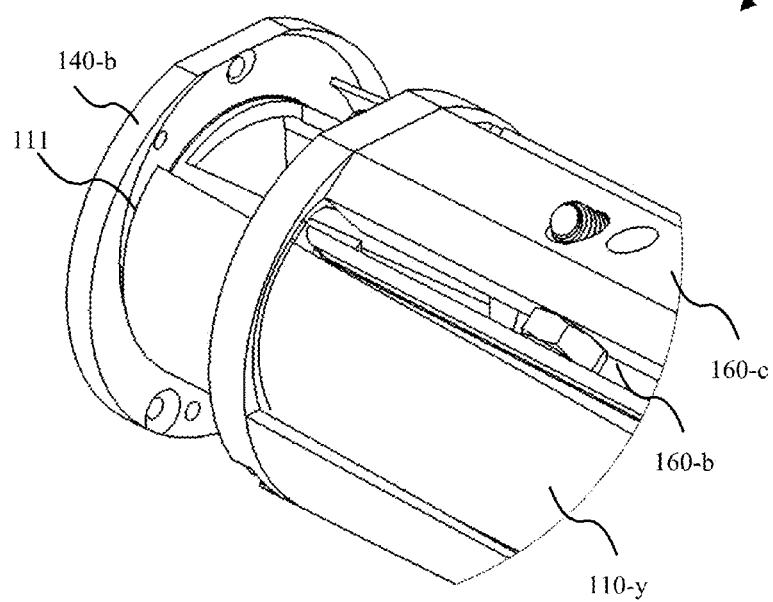
Figure 2G:
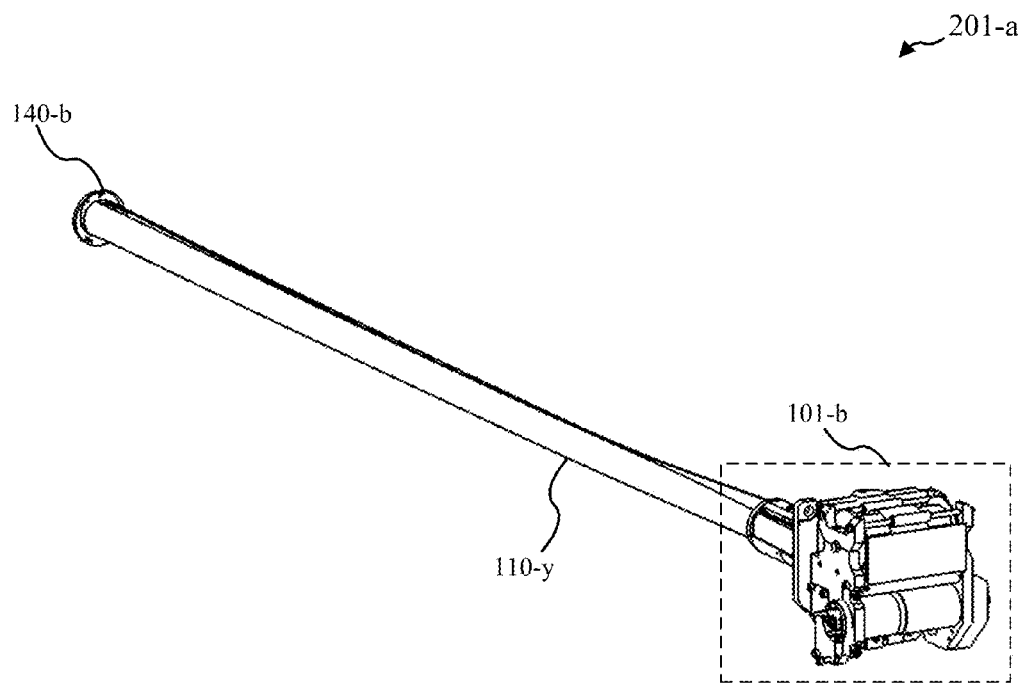
Figure 2H:
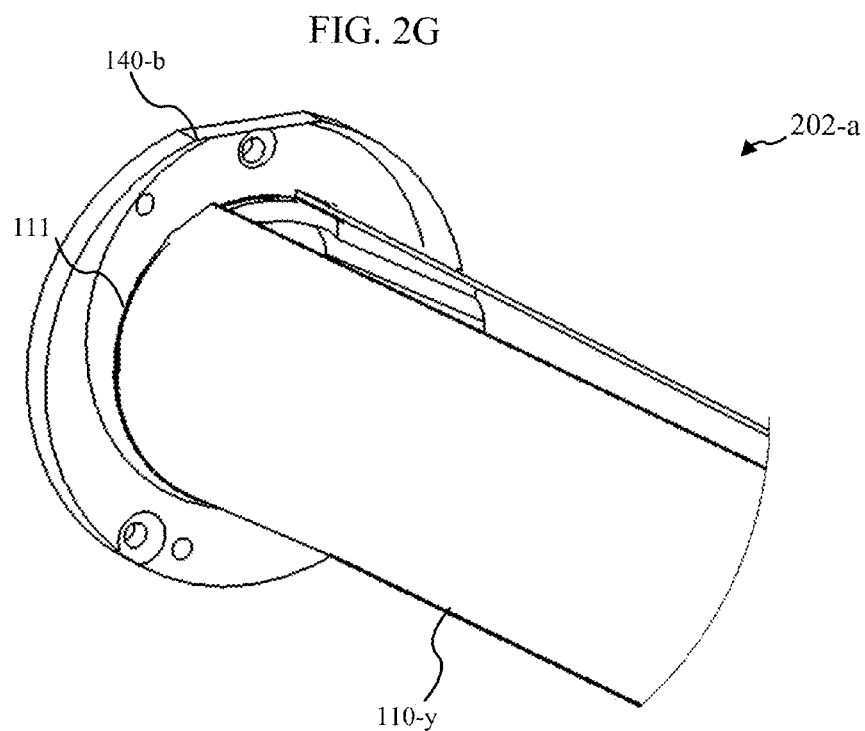

Turning next to FIG. 2E, FIG. 2F, FIG. 2G, and FIG. 2H, different perspectives on a deployment system 201 are shown in accordance with various embodiments. System 201 may be an example of system 100 of FIG. 1A, system 100-a of FIG. 1B, system 100-b of FIG. 1C. In particular, FIG. 2E may show system 201 in an approximately stowed configuration with respect to a furlable boom 110-y. An end fitting 140-b is shown such that is slightly deployed, which may reveal the relationship between the furlable boom 110-y and its distal edge 111 with respect to the end fitting 140-b. End fitting 140-b may be an example of end fitting 140 of FIG. 1B and/or end fitting 119 of FIG. 1C. Further examples of different embodiments of end fitting 140-b may be shown with respect to FIG. 6A, FIG. 6B, FIG. 6C, FIG. 6D, FIG. 6E, FIG. 6F, FIG. 6G, FIG. 6H, FIG. 6I, and/or FIG. 6J. FIG. 2F may then show a perspective 202 that may highlight these components. FIG. 2G may then show a deployed configuration 201-a with respect to furlable boom 110-y. FIG. 2H shows a perspective 202-a that may highlight specific components, some of which may also be shown in to FIG. 2F.

System 201 and aspects of system 201 shown through perspective 202 also show edge supports 160-b and 160-c in accordance with various embodiments. Further examples of different embodiments of edge support 160-b and/or 160-c may be shown with respect to FIG. 9A, FIG. 9B, FIG. 9C, FIG. 9D, FIG. 9E, FIG. 9F, FIG. 9G, FIG. 9H, FIG. 9I, FIG. 9J, and/or FIG. 9K.

In particular, FIG. 2E, FIG. 2F, FIG. 2G, and/or FIG. 2H may show end fitting 140-b configured to couple with the furlable boom 110-y such that one or more portions of the end fitting 140-b may engage one or more end portions, such as edge 111, of the furlable boom 110-y, when the furlable boom 110-y may be deployed, such as may be seen in FIG. 2G and/or FIG. 2H, and may release the one or more end portions, such as edge 111, of the furlable boom 110-y when the furlable boom 110-y may be stowed, as may approximately be seen in FIG. 2E and/or FIG. 2F. One or more portions of the end fitting 140-b may include an end support configured to direct the one or more end portions of the furlable boom 110-y during deployment of the furlable boom 100-y, as may be seen in FIG. 2E and/or FIG. 2F, and support the one or more end portions of the furlable boom 110-y after deployment, as may be seen in FIG. 2G and/or FIG. 2H. Furthermore, edge support 160-b may include one or more spring components configured to apply a preload to an edge of furlable boom 110-y, while edge support 160-c may provide one or more hard stops that may make contact with another edge from the furlable boom 110-y.

FIG. 2E and FIG. 2G may also show other deployment components 101-b, though not explicitly called out, which may include one or more of the devices such as those shown in deployment components 101 of FIG. 1A, deployment components 101-a of FIG. 1B, and/or deployment components of system 100-b of FIG. 1C. System 201 may include numerous deployment components similar to those shown with respect to system 200 of FIGS. 2A-2D.

Figure 3A:
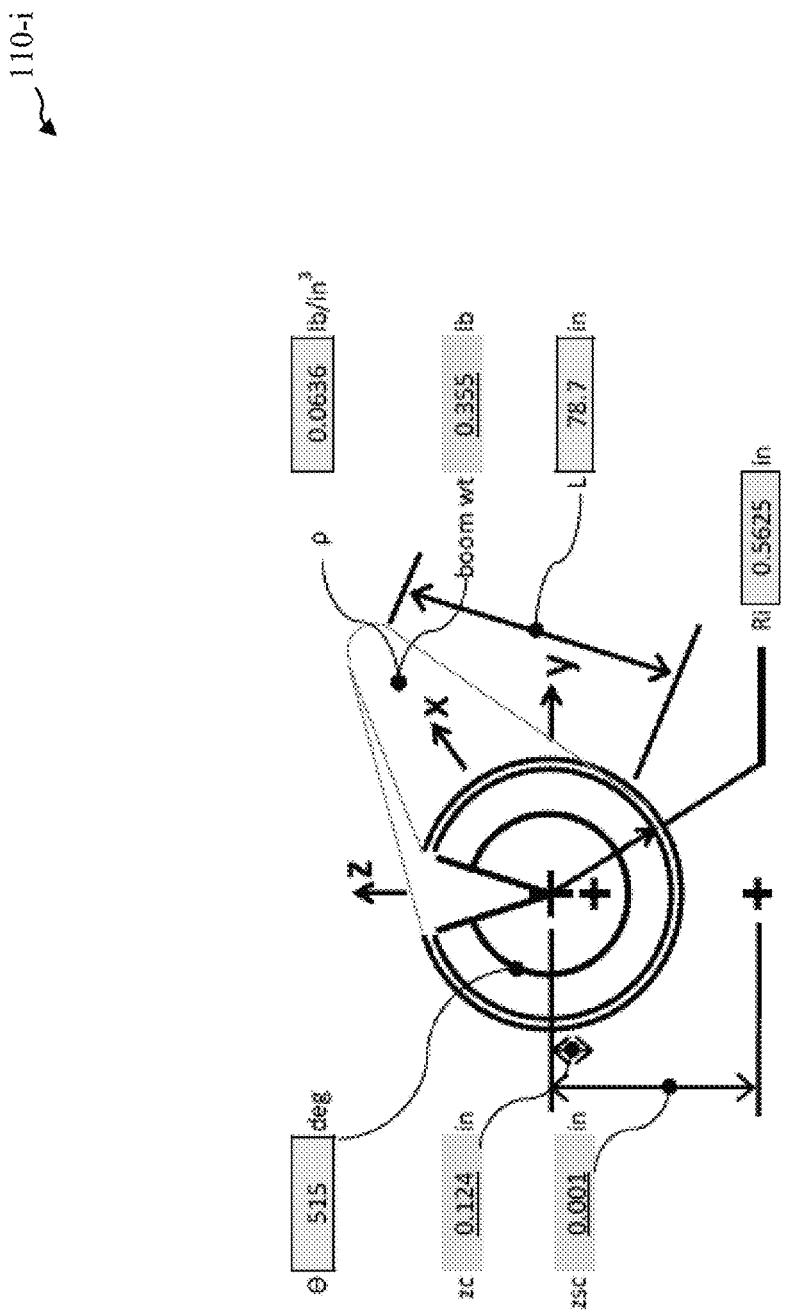
Figure 3B:
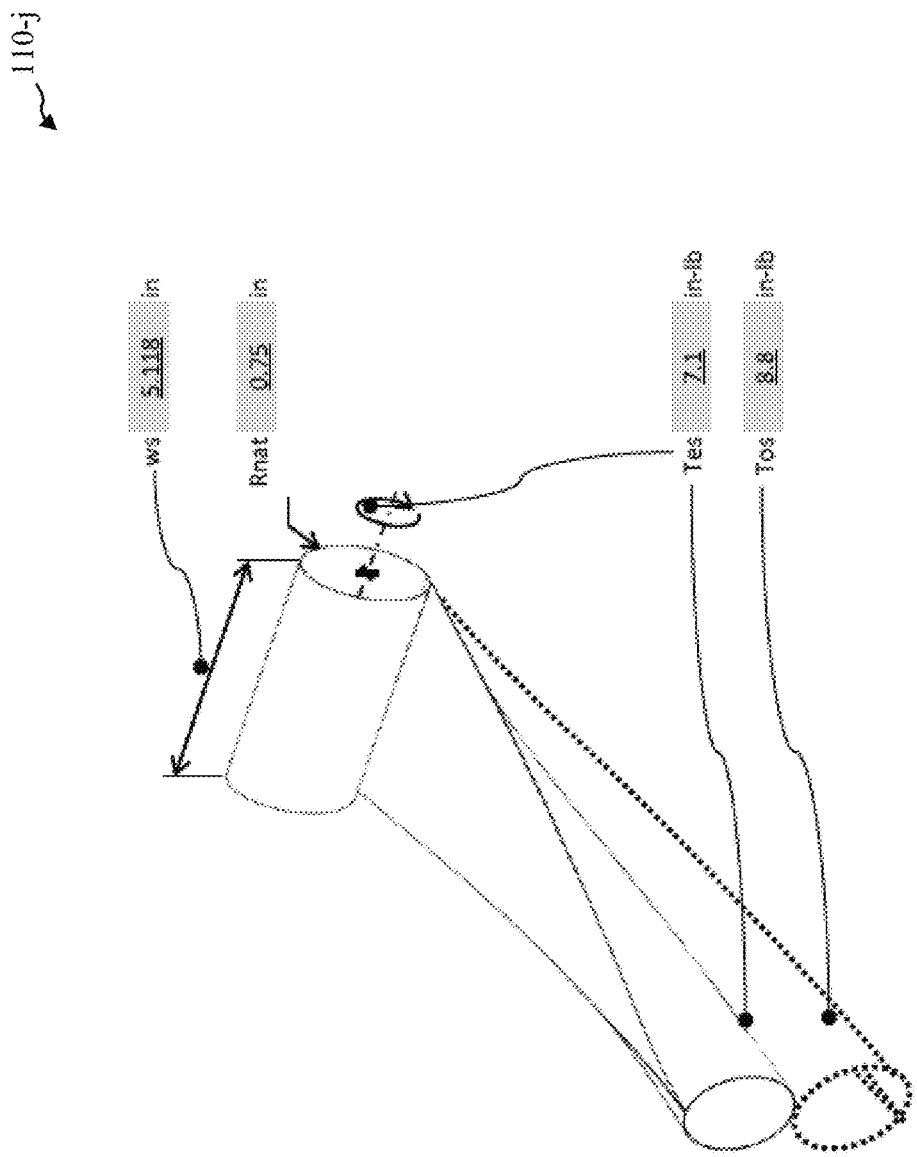

Turning now to FIG. 3A and FIG. 3B, furlable booms 110-i and 110-j in accordance with various embodiments are provided. Furlable booms 110-i and 110-j may be examples of furlable boom 110 of FIG. 1A, boom device 110-a of FIG. 1B, furlable boom 110-b of FIG. 1C, furlable boom 110-d of FIGS. 2A-2C, furlable boom 110-e of FIG. 2D, and/or furlable boom 110-y of FIGS. 2E-2H. Different boom structures may be utilized in accordance with various embodiments. In some embodiments, the structural boom is composed of a traditional epoxy matrix that may be reinforced by common glass and graphite fibers. The composite material may have a much higher strain capacity than metallic materials, which may allow for a much higher wall tube-wall thickness. The composite may also have infinite design flexibility so that it may be tailored to different applications of a high lateral compliance combined with high buckling strength. The composite may have a short lead time as the tooling may be a cylindrical mandrel and a low recurring cost. Surface features on the tube that indicate deployed length may be desired and may be easily accomplished by co-curing a pattern specified into the laminate under a thin layer of glass fiber reinforced polymer. In some embodiments, the thick walled composite slit tube may be very resilient with a long cycle life and is insensitive to surface imperfections that may be caused by unintended impacts or surface contact.

The geometrical properties of some booms in accordance with various embodiments may be shown in FIG. 3A and/or FIG. 3B. These geometrical properties are provided merely by way of example; some embodiments may utilize other geometrical properties. For example, some embodiments may include a furlable boom 110-i with where the diameter may be 1.125 inches and the included angle may be 515 degrees, which may mean that the free edges of the slit tube overlap each other by 155 degrees; other dimensions and angular configurations may be utilized in some embodiments. The overlap may allow the free edges to support one another, which may greatly increase buckling strength for a given diameter.

The nominal material properties for a slit tube laminate may be given in Table 1 below. The properties may generally vary due to processing variation, temperature, and/or aging effects such as radiation exposure. Other embodiments may have other properties.

TABLE 1

| axial modulus lb/in$^2$ | shear stiffness lb/in$^2$ | Poisson's ratio | density lb/in$_3$ | thickness in |
|---|---|---|---|---|
| 7.45E+06 | 7.38E+05 | 0.253 | .064 | 0.014 |

Merely by way of example, Table 2 below may provide the effective bending stiffness of the boom at various lengths for some embodiments; other embodiments may utilize other parameters. The bending stiffness may be nearly perfectly symmetric for some booms, but may be given in two directions where the "Iy" and "Iz" are the moments of inertia about the y-axis and z-axis referring to the coordinate system within FIG. 3A and/or FIG. 3B. It may be desirable for some embodiments to have a relatively low torsional rigidity to prevent overloading LAE (nozzle on client vehicle). The torsional rigidity may be highly dependent on the distal boundary condition and, in particular, how effectively it may prevent warping of the open cross section. An upper and a lower bound may therefore be given for the torsional rigidity, which may represent the theoretical limits of what may be achieved by adjusting the distal end fitting design.

TABLE 2

| L length in | 3 Ex Iy/L³ Bending Stiffness lb/in | 3 Ex Ii/L³ Bending Stiffness lb/in | EA/L Axial Stiffness lb/in | Mcr Critical buckling moment in-lb | Fcr Critical lateral tip force lb | Pcr, euler Critical axial tip force pinned-pinned lb | Gxy Kw1/L Effective Torsion rigidity about x, lower bound lb-in/Rad | Gxy Kw1/L Effective Torsion rigidity about x, upper bound lb-in/Rad |
|---|---|---|---|---|---|---|---|---|
| 80.0 | 0.478 | 0.478 | 6598 | 614 | 7.67 | 125 | 2.2 | 8.8 |
| 78.7 | 0.501 | 0.501 | 6703 | 614 | 7.79 | 129 | 2.4 | 9.2 |
| 75.0 | 0.580 | 0.580 | 7038 | 614 | 8.18 | 143 | 2.7 | 11 |
| 70.0 | 0.713 | 0.713 | 7540 | 614 | 8.77 | 164 | 3.3 | 13 |
| 65.0 | 0.890 | 0.891 | 8120 | 614 | 9.44 | 190 | 4.1 | 16 |
| 60.0 | 1.132 | 1.133 | 8797 | 614 | 10.2 | 223 | 5.3 | 21 |
| 55.0 | 1.470 | 1.470 | 9597 | 614 | 11.1 | 265 | 6.8 | 27 |
| 50.0 | 1.956 | 1.957 | 10556 | 614 | 12.2 | 321 | 9.0 | 36 |
| 45.0 | 2.684 | 2.685 | 11729 | 614 | 13.6 | 397 | 12 | 49 |
| 40.0 | 3.821 | 3.822 | 13195 | 614 | 15.3 | 502 | 18 | 70 |
| 35.0 | 5.704 | 5.706 | 15080 | 614 | 17.5 | 656 | 26 | 105 |
| 30.0 | 9.057 | 9.061 | 17594 | 614 | 20.4 | 893 | 42 | 166 |
| 25.0 | 15.651 | 15.657 | 21113 | 614 | 24.5 | 1287 | 72 | 287 |
| 20.0 | 30.569 | 30.580 | 26391 | 614 | 30.6 | 2011 | 140 | 561 |

Figure 3C:
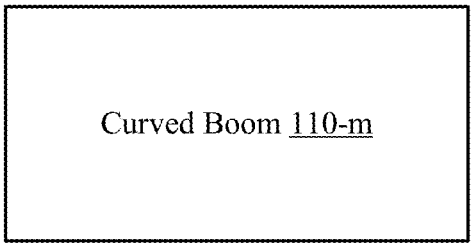

Turning now to FIG. 3C, a curved boom 110-m in accordance with various embodiments is provided. Curved boom 110-m may be an example of furlable boom devices 110 as shown in FIGS. 1A, 1B, 1C, 2A, 2B, 2C, 2D, 2E, FIG. 2F, FIG. 2G, and/or FIG. 2H.

The curved boom 110-m may be fabricated with a curvature along its length. In some embodiments, the curved boom 110-m is configured to exhibit a deployed geometry parallel to an axial direction when a portion of the curved boom 110-m is coupled with a boom spool. In some embodiments, the curved boom 110-m is configured to exhibit a deployed geometry with a negative curvature when a portion of the curved boom 110-m is coupled with a boom spool.

For example, curved boom 110-m may include a boom fabricated with a central axis with a negative curvature. For example, a slit-tube boom may be fabricated with a negative curvature away from a slit direction. The boom may include a slit tube. The boom 110-m may include a composite material. In some embodiments, the boom 110-m may be configured to deploy with a central axis without curvature in an axial direction in some embodiments. The boom 110-m may be configured to deploy without curvature in the axial direction when an end of the boom is coupled with a boom spool. In some embodiments, the boom 110-m is configured to deploy with negative curvature when an end of the boom is fixed. Some embodiments may include booms 110-m with other curvature, such as positive curvature.

FIG. 3D shows two different examples 300 of furlable booms as manufactured. Boom 110-n may be manufactured as a straight boom, while boom 110-m-1 may be manufactured as a curved boom in accordance with various embodiments; boom 110-m-1 may be an example of the curved boom 110-m. Boom 110-m-1 may be fabricated with a central axis with a curvature along its length. In particular, boom 100-m-1 may show a boom with a central axis with negative curvature. The negative curvature may be achieved during manufacturing in a variety of ways, such as utilized a curved mold (which may have positive curvature to impart negative curvature on the boom) or other mechanical processes (such as mechanically bending the boom or mold during the manufacturing process).

Figure 3F:
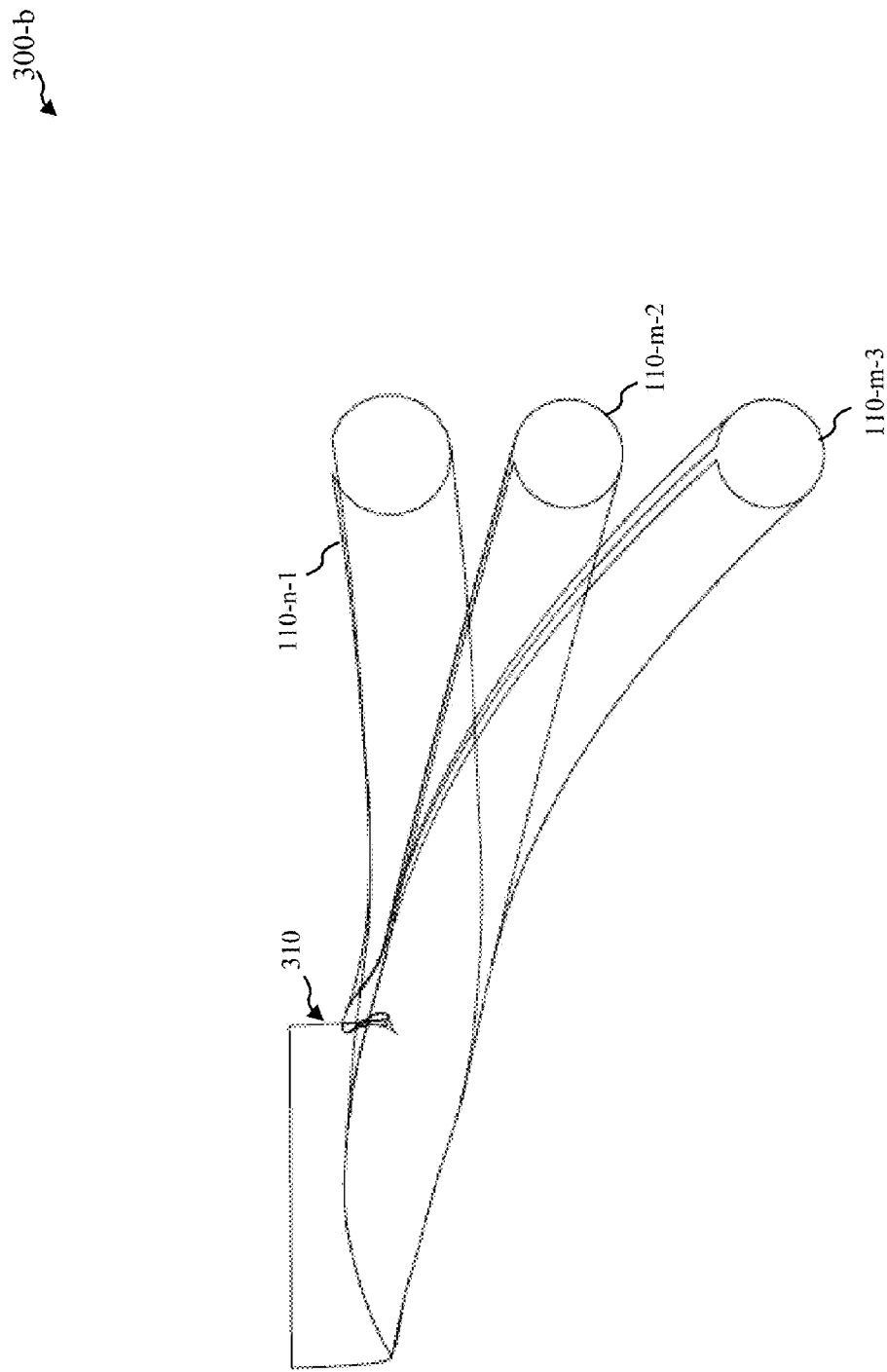
Figure 3G:
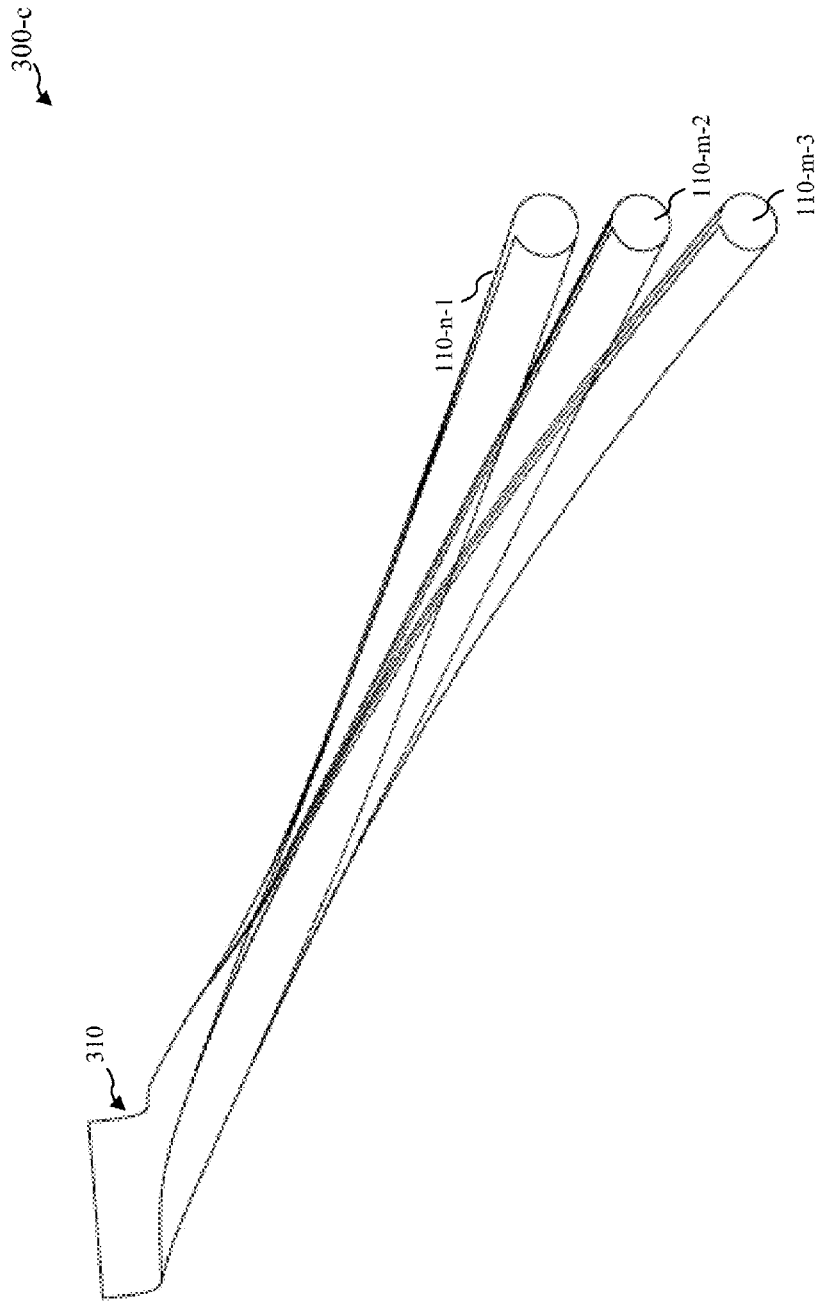

Turning now to FIG. 3E, FIG. 3F, and FIG. 3G, three perspectives 300-a, 300-b, and 300-c show examples on three different boom configurations 110-n-1, 110-m-2, and 110-m-3 that may be shown as packaged booms. Booms 110-m-2 and 110-m-3 may be examples of curved boom 110-m of FIG. 3A. These examples may involve taking a manufacturing boom in its free state and opening up a cross section at a root end of the boom. The opened section 310 may be attached to a boom spool 320 in some cases. As such, the boom may be rolled around the boom spool and then unrolled or deployed as is generally shown in these three figures.

In these three figures, the top boom 110-n-1 may reflect a boom that is manufactured in a straight configuration. As shown, this boom 110-n-1 may have positive curvature when rolled out or left partially furled.

The middle boom 110-m-2 may reflect a balanced curvature in accordance with various embodiments. This boom 110-m-2 may be manufactured to have, in the free state, enough negative curvature so that in the partially packaged state, as shown in these figures, it has no curvature. Boom 110-m-2 may be fabricated with a curvature along its length. Boom 110-m-2 may be configured to exhibit a deployed geometry parallel to an axial direction when a portion of the furlable boom is coupled with a boom spool.

The bottom boom 110-m-3 may reflect a boom in accordance with various embodiments that has been manufactured to always have negative curvature, even when it is in a partially packaged state as shown in these three figures. This configuration may have added stability and may have better performance characteristics than a boom deployed to be straight or positively curved. Boom 110-m-3 may be fabricated with a curvature along its length. Boom 110-m-3 may be configured to exhibit a deployed geometry with a negative curvature when a portion of the furlable boom is coupled with a boom spool.

Embodiments such as booms 110-m may address problems that may arise with partially furled boom such as boom 110-n with positive curvature. For example, slit tube booms may have different stability problems when they are positively curved. When a force may be applied, such as a side lode, a positively curved boom such as boom 110-n may twist rather than bend. In contrast, a boom 110-*m* manufactured with negative curvature may bend rather than twist when a load is applied. Negatively curved booms may thus have higher torsional stiffness than booms manufactured in straight or positively curved configurations. Booms manufactured with negative curvature may also address problems when compression is applied to a boom. For booms such as boom 110-*n*, buckling at the free edges of the boom along the slit may generally occur when compression is applied. A boom 110-*m* manufactured with negative curvature may have added strength, reducing the edge buckling problem that may arise when a compressive force is applied to the boom. A boom 110-*m* manufactured with negative curvature may increase structural performance of the boom and may make deploying elements that may involve accurate deployed orientation simpler.

While these figures may generally show slit-tube boom configurations, other types of booms may benefit from negative curvature, such as asymmetric booms with an open section. For example, triangular rollable and collapsible booms may benefit from being manufactured with negative curvature.

The booms 110-*m* shown with respect to FIGS. 3A-3G may be fabricated in a variety of ways. Some booms, as noted, may include a composite material and/or fabrication. For example, composite material and/or fabrication may include a laminate constructed by uniting two or more layers of laminable material together. The process of creating a laminate may include impregnating or applying an adherent material in or between the layers of laminable material. Sufficient heat or pressure, or both, may be applied to the layers of laminable materials and the adherent material to produce the laminate. For example, heat may be applied in a range of between about 10 degrees centigrade ("° C.") to about 400° C. and pressure may be applied in a range of between about 15 pounds per square inch ("psi") to about 50,000 psi depending upon the composition, number, thickness, size, porosity, or other factors relating to the layers of laminable materials; the source of pressure (whether vacuum pressure, atmospheric pressure, mold pressure, or the like); or the source of heat (whether applied directly through a mold, or indirectly from a remote heat source). In some embodiments, the laminate may be formed about a mold to yield the slit-tube construction having the boom internal surface defining a desired arcuate form or curvature or circular arc of radius disposed between a boom first and second longitudinal edges in a desired radius, degree angle, or amount of overlap.

With respect to composite fabrication in accordance with some embodiments, the layers of laminable material may be used to produce the laminate of the boom that may be in the form of discrete or woven fibers including or consisting of, as illustrative examples: boron carbide fibers, silicon carbide fibers, alumina fibers, alumina titanium fibers, carbon fibers, para-aramid fibers such as KEVLAR®, polypropylene such as INNEGRA®, a ultra-high molecular weight polyethylene such as DYNEEMA® or SPECTRA®, s-glass, e-glass, polyester, or the like, or combinations thereof.

With respect to composite fabrication in accordance with some embodiments, the layers of laminable material may be coated or impregnated with an amount of adherent material having suitable mechanical characteristics, including or consisting of, as illustrative examples: a phenolic, an epoxy, a polyethylene a terephtalate, a vinylester, bis(maleimide/diallybisphenol A, a cyanate ester, a nylon, a polypropylene, polyethylene terephthalate, polyethersulfone, polyetheretherketone, acrylonitrile butadiene styrene, a polyamide, a polyethylene, a thermoplastic urethane, or the like, which can be either catalytically or thermally set, or combinations thereof.

Figure 4A:
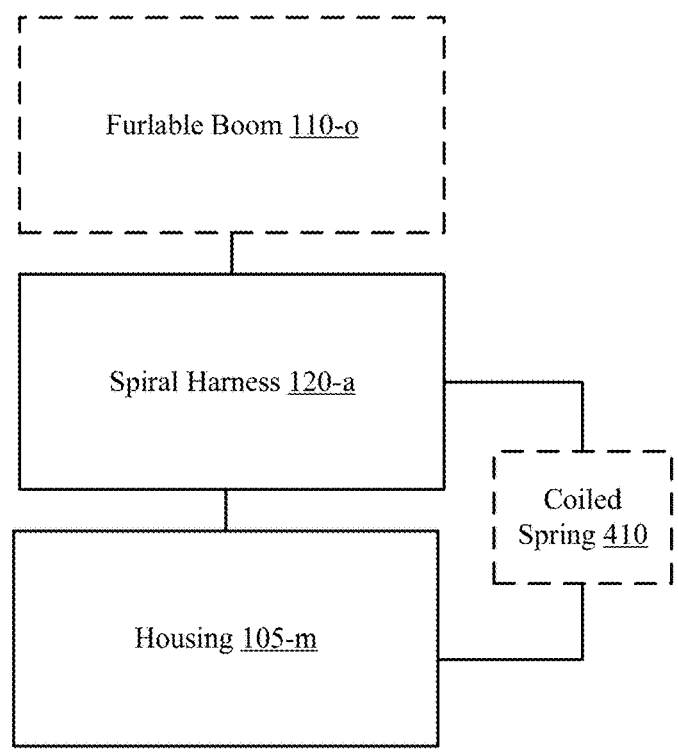
FIG. 4A, FIG. 4B, and FIG. 4C show deployment devices in accordance with various embodiments.

Turning now to FIG. 4A, a deployment device 400 in accordance with various embodiments is provided. Device 400 may be an example of spiral harness device 120 of FIG. 1B, for example. Device 400 may be an example of aspects of system 100 of FIG. 1A, system 100-*b* of FIG. 1C, system 200 of FIGS. 2A-2D, and/or system 201 of FIG. 2E or FIG. 2G. Device 400 may include a furlable boom 110-*o* that may be coupled with a spiral harness 120-*a*; the spiral harness 120-*a* may also be referred to as spiral wire harness. The spiral harness 120-*a* may be enclosed within the furlable boom 110-*o* when the furlable boom 110-*a* is deployed. Device 400 may also include a housing 105-*m* that may be coupled with the spiral harness 120-*a*.

For example, a proximal end of the spiral harness 120-*a* may be coupled with the boom housing 105-*a* and a distal end of the spiral harness 120-*a* may be coupled with a distal end of the furlable boom 110-*o*. Some embodiments include a shroud (not shown) installed around the spiral harness 120-*a* to limit a motion of at least a portion of the spiral harness 120-*a* within a boom housing 105-*m*. In some embodiments, the furlable boom 110-*o* includes a slit-tube boom. In some embodiments, the spiral harness 120-*a* is connectorized with at least the distal end of the furlable boom 110-*o* or the boom housing 105-*m*. Some embodiments include a coiled spring 410 coupled with the spiral harness 120-*a* to provide a return force for retraction. The coiled spring 410 may be made from steel in some embodiments.

Figure 4B:
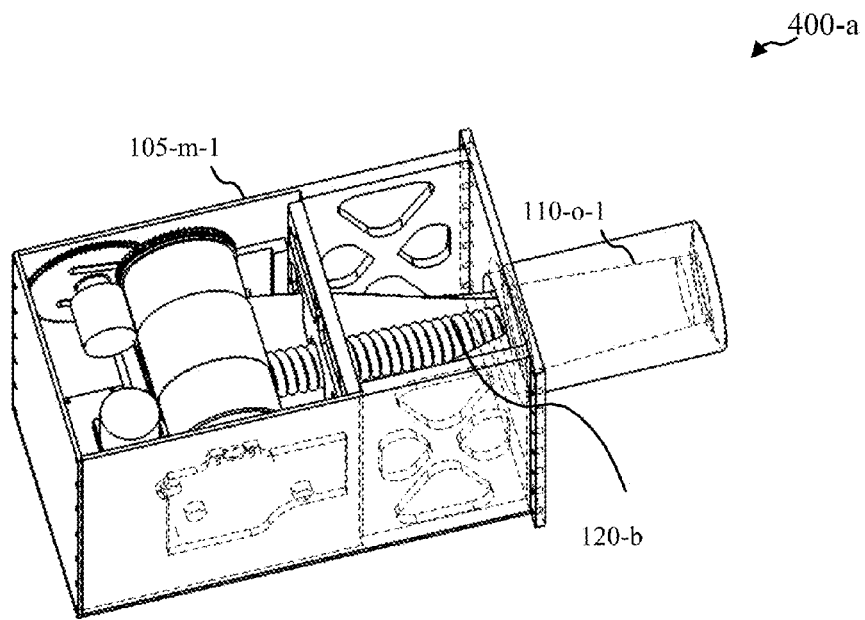
Figure 4C:
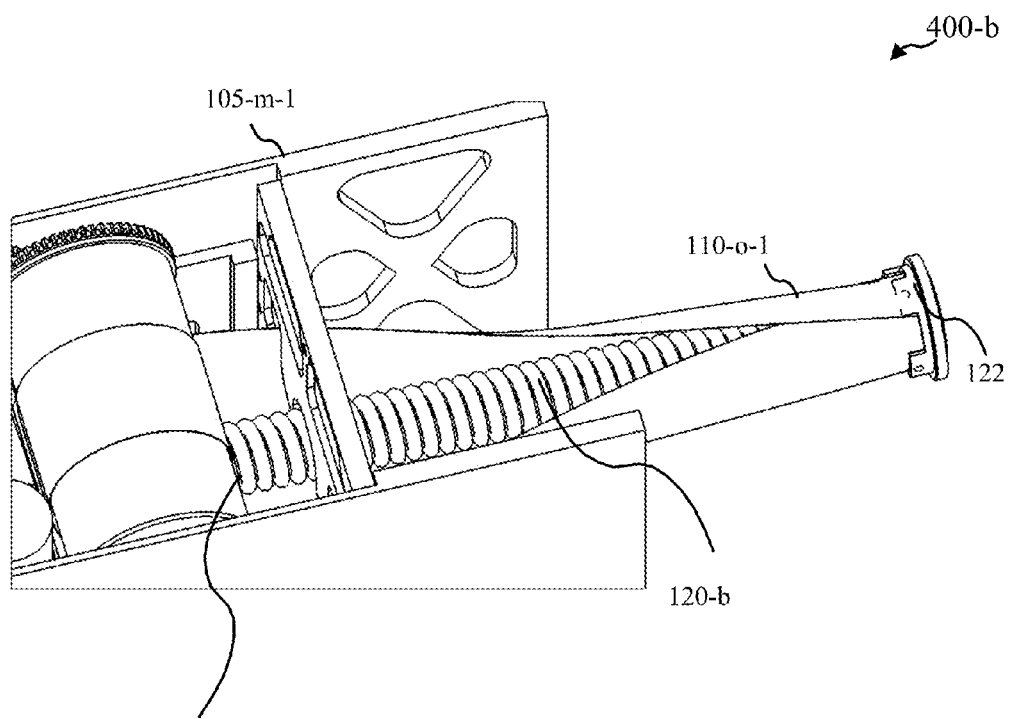

FIG. 4B and FIG. 4C show an example of device 400-*a* and highlighted portion 400-*b* in accordance with various embodiments, which may be examples of device 400 of FIG. 4A. Device 400-*a* may include a spiral harness 120-*b*, a furlable boom 110-*o*-1, and/or a housing 105-*m*-1.

Merely by way of example, the harness 120-*b* may be composed of 20 wires, all of which are 26 AWG. The 20-wire bundle may be arranged in 10 twisted pairs and may be surrounded by overall shielding resulting in a total nominal diameter of 0.26 inches. The bundle may be formed into a spiral pattern as shown and may maintain the spiral pattern when the bundle is constrained to itself. The elastic properties of the spiral harness 120-*b* can be tailored by bundling a strand of spiral shaped spring steel along with the wire bundle. Merely by the way of example, the 0.26 inch diameter harness may be formed into a spiral with an approximate diameter of 1.1 inches and a pitch of approximately 0.28 inches for a total harness length of 120 inches if completely straightened. Other embodiments may utilize different numbers of wires with different dimensions.

During deployment and retraction cycles, it may be desirable for the harness 120-*b* to remain in a spiral shape to maintain its compliance. In some embodiments, this is accomplished as the 120 inch harness may only deploy from 10 inches to a maximum of 80 inches or, a 66% extension; in general compliance may be maintained through avoided full extension of the harness.

Internal to the housing 105-*m*-1 (which may be referred to a deployer canister), the harness 120-*b* may be exposed where the slit-tube boom 110-*o*-1 opens. In the exposed area, a shroud (not shown) may be installed around the harness 120-*b* to contain the harness 120-*b* under vibration and acceleration loads. External to the deployer canister 105-*m*-1, the harness 120-*b* may be completely enclosed within the overlapped slit-tube boom 110-*o*-1, which may act as a conduit for the harness 120-*b*. The proximal end 121 of the harness 120-*b* may be staked to a bulkhead of the housing 105-*m*-1 and routed to the deployer sidewall where it may be connectorized. The harness 120-*b* may also be connectorized on the distal end 122 of the boom 110-*o*-1.

Figure 5A:
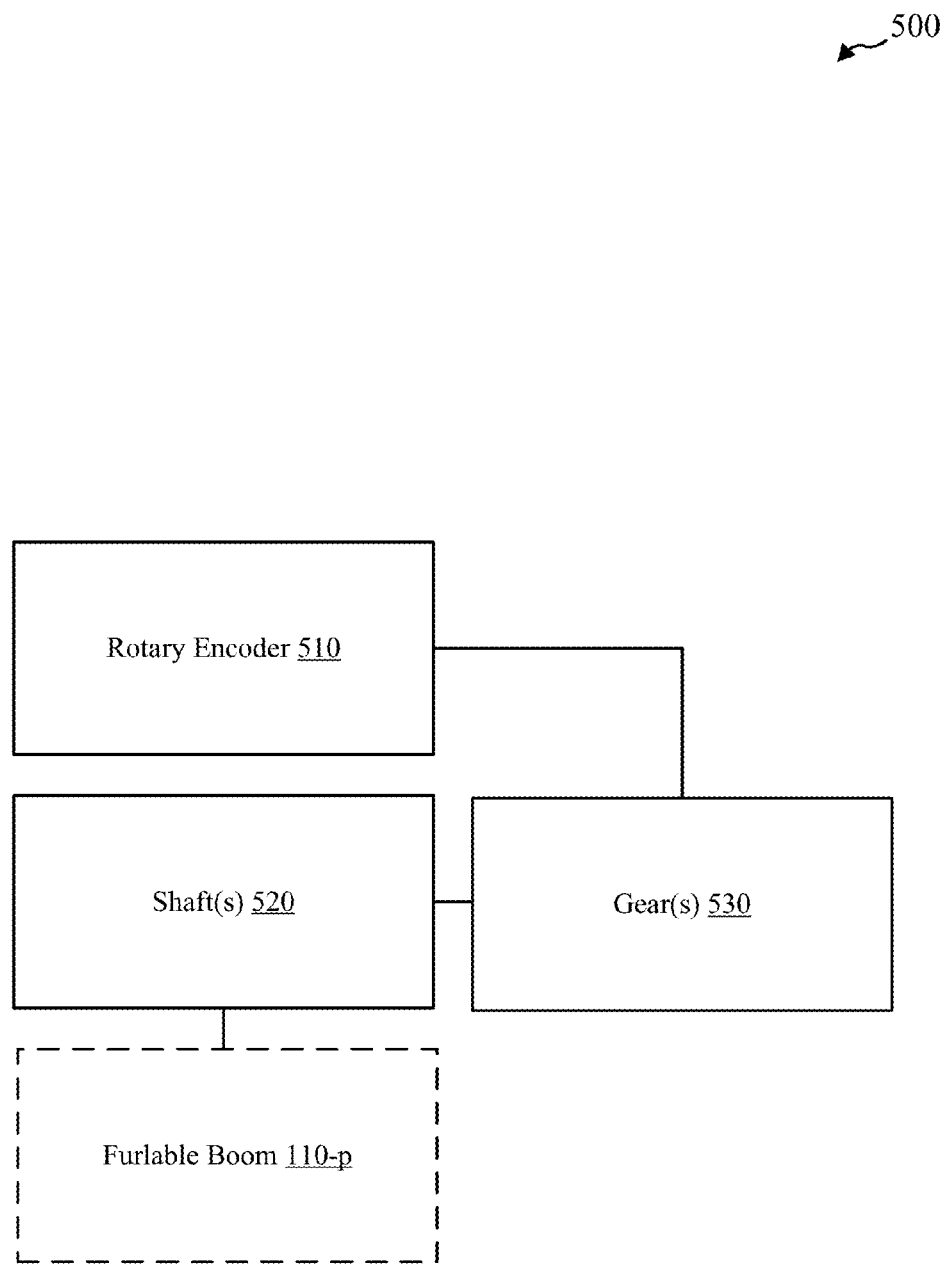
FIG. 5A and FIG. 5B show deployment devices in accordance with various embodiments.

Turning now to FIG. 5A, a deployment device 500 is shown in accordance with various embodiments. Device 500 may be an example of rotary encoder device 190 of FIG. 1B, for example. Device 500 may be an example of aspects of system 100 of FIG. 1A, system 100-*b* of FIG. 1C, system 200 of FIGS. 2A-2D, and/or system 201 of FIG. 2E and/or FIG. 2G. Device 500 may include a rotary encoder 510; the rotary encoder 510 may be referred to as rotary absolute encoder in some embodiments. Device 500 may also include one or more rotatable shafts 520. One or more gears 530 may be configured to couple the rotary encoder 510 with the rotatable shaft 520 such that the rotary encoder 510 rotates less than 360 degrees when the rotatable shaft 520 rotates 360 degrees or more. Device 500 may be configured to couple to a furlable boom 110-*p* in some embodiments.

In some embodiments, the shaft 520 includes a boom spool configured to rotate with furlable boom 110-*p*; the shaft may be coupled with the boom spool, while the furlable boom 110-*p* may be coupled with the boom spool. In some embodiments, the shaft 520 includes a ribbon spool and/or a clutch shaft. Some embodiments include the furlable boom 110-*p* coupled with the boom spool. In some embodiments, the one or more gears 530 include a zero-backlash gear. The furlable boom 110-*p* may include a slit-tube boom. In some embodiments, rotary encoder 510 is configured for determining a position of the furlable boom 110-*p*. In some embodiments, the rotary encoder 510 is configured to maintain the position of the furlable boom 110-*p* after a power loss. The rotary encoder 510 may be at least configured or calibrated to determine a deployment position of the furlable boom. 110-*p*

Device 500 may be utilized for position sensing. For example, some embodiments of device 500 may be configured for position sensing utilizing the rotary encoder 510.

Figure 5B:
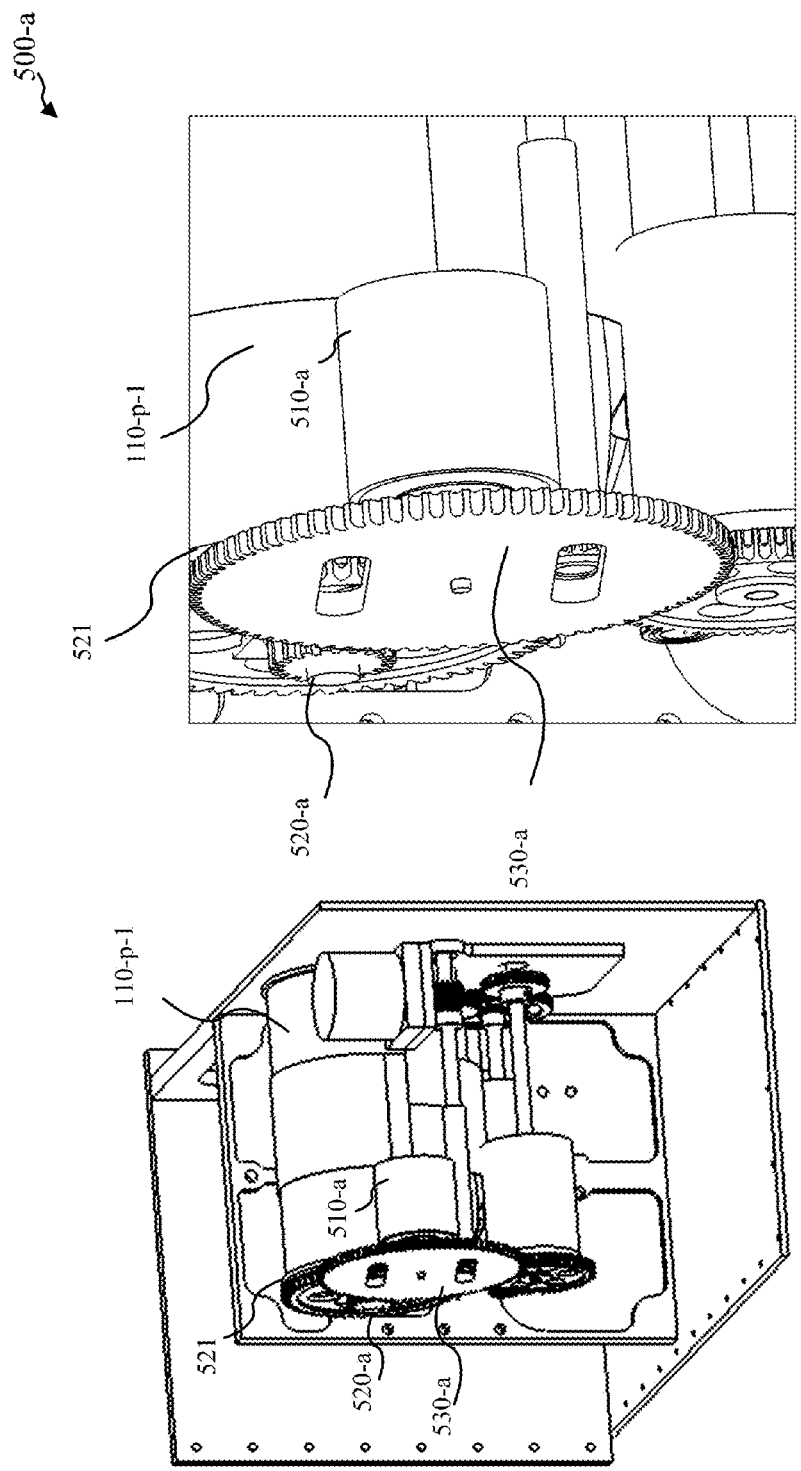

FIG. 5B shows two perspectives of specific example of a device 500-*a* in accordance with various embodiments, which may include rotary encoder 510-*a*, shaft 520-*a*, and gears 530-*a*. Device 500-*a* may be an example of aspects of device 500 of FIG. 5A. Rotary encoder 510-*a* may be geared directly to the boom-spool 521 (coupled with shaft 520-*a*) with a zero-backlash gear 530-*a*; some embodiments may gear the encoder to other shafts, such as a ribbon spool and or clutch shaft. Boom spool 521 may be configured to rotate with a furlable boom 110-*p*-1. In some embodiments, a gear ratio may be selected such that the rotary encoder 510-*a* rotates less than 360 degrees for a full-length deployment; other deployment lengths may be set for the rotation of the encoder 510-*a* as when it rotates less than 360 degrees.

Figure 6A:
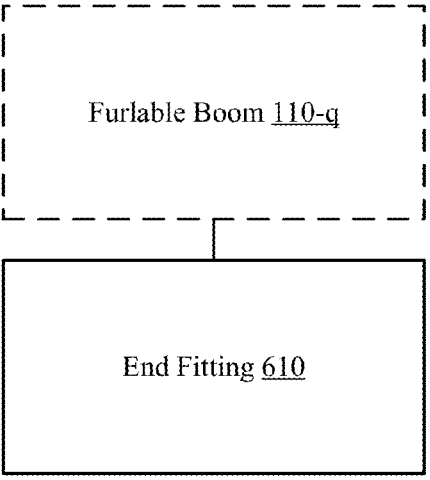
FIG. 6A, FIG. 6B, FIG. 6C, FIG. 6D, FIG. 6E, FIG. 6F, FIG. 6G, FIG. 6H, FIG. 6I, and FIG. 6J show deployment devices in accordance with various embodiments.

Turning now to FIG. 6A, a deployment device 600 in accordance with various embodiments is provided. Device 600 may be an example of end fitting device 140 of FIG. 1B for example. Device 600 may be an example of aspects of system 100 of FIG. 1A, system 100-*b* of FIG. 1C, system 200 of FIGS. 2A-2D, and/or system 201 of FIG. 2E and/or FIG. 2G. Device 600 may include an end fitting 610 configured to couple with the furlable boom 110-*q*. One or more portions of the end fitting 610 may engage one or more end portions of the furlable boom 110-*q* when the furlable boom 110-*q* may be deployed and may release the one or more end portions of the furlable boom 110-*q* when the furlable boom 110-*q* may be stowed. In some embodiments, the one or more portions of the end fitting 610 includes an end support configured to direct the one or more end portions of the furlable boom 110-*q* during deployment of the furlable boom 110-*q* and support the one or more end portions of the furlable boom 110-*q* after deployment. In some embodiments, the end fitting 610 includes an insert configured to support an inner surface of the furlable boom 110-*q* when the furlable boom 110-*q* is deployed.

For example, one or more portions of the end fitting 610 may constrain one or more end portions of the furlable boom 110-*q* (such as the distal end and/or edges of boom 110-*q*). End fitting 610 may help prevent relative shear between different aspects of the end of the boom 110-*q*, such as two free edges or end segments of the boom. Ending fitting 610 may help capture a distal edge of the boom 110-*q* and bring to a known position with repeatability. Device 600 may help provide a physical radial restriction for boom 110-*q* beyond friction force. While device 610 may be configured as an end fitting, some embodiments of device 610 may be utilized to interface with features that may limit shear with respect to other portions of boom 110-*q*, such as a middle portion of boom 110-*q*.

In some embodiments, the one or more end portions of the furlable boom 110-*q* include an end edge of the furlable boom 110-*q*. In some embodiments, the one or more portions of the end fitting 610 includes a groove configured to direct the one or more end portions of the furlable boom 110-*q* during deployment of the furlable boom 110-*q*. Some embodiments include one or more spine attachments configured to couple the end fitting 610 with the end of the furlable boom 110-*q*. In some embodiments, the end fitting 610 includes an insert configured to fit within the furlable boom 110-*q* when the boom is deployed. In some embodiments, the furlable boom 110-*q* includes a slit-tube boom. In some embodiments, one or more portions of the end fitting 610 includes one or more apertures, slots, grooves, indentations, or protuberances configured to fit with one or more features of the one or more end portions of the furlable boom 110-*q*. In some embodiments, the one or more features of the one or more end portions of the furlable boom 110-*q* include one or more apertures, slots, grooves, indentations, or protuberances. For example, the end fitting 610 may include features that may fit with features of the boom 110-*q* to constrain end portion(s) of boom 110-*q*.

Figure 6B:
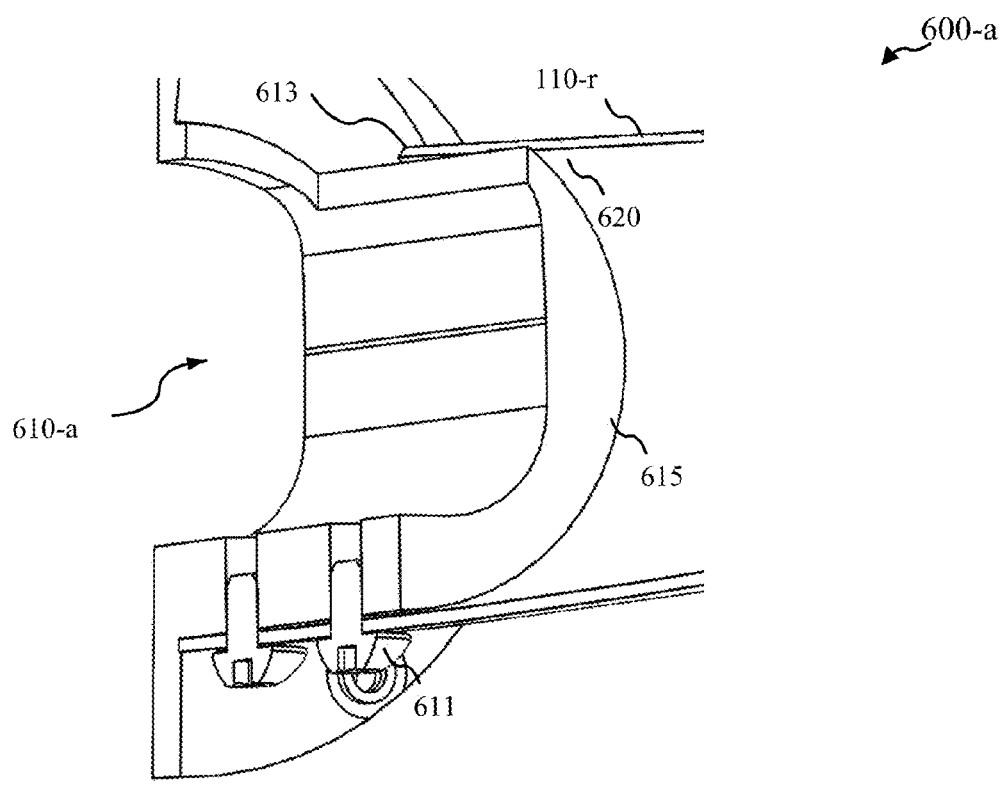
Figure 6C:
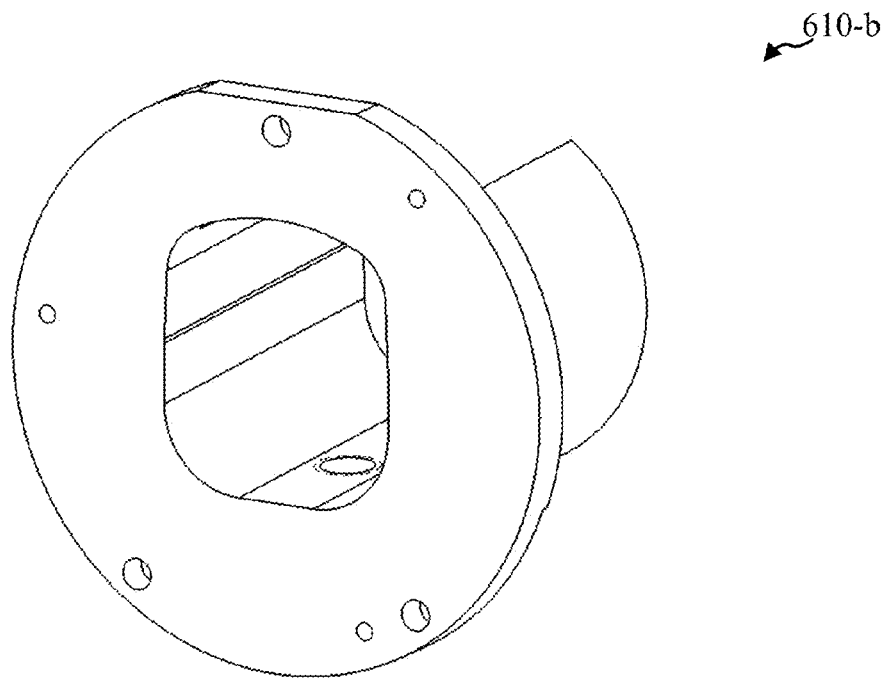

FIG. 6B shows a cross-section view of a deployment device 600-*a* in accordance with various embodiments, which may be an example of device 600 of FIG. 6A. Device 600-*a* may include an end fitting 610-*a* that may be coupled with a furlable boom 110-*r* utilizing one or more spine attachments 611. One or more edges 613 of boom 110-*r* may engage with a portion of the end fitting when deployed and may release when the furlable boom 110-*r* when stowed; FIG. 6B shows edge 613 when it has yet to engage fully with the end fitting 610-*a*. End fitting 610-*a* may also include an insert 615 which may support an inner surface 620 of the furlable boom 110-*r* when the furlable boom 110-*r* is deployed. FIG. 6C shows an example of an end fitting 610-*b* in accordance with various embodiments. End fitting 610-*b* may be an example of end fitting 610 of FIG. 6A and/or end fitting 610-*a* of FIG. 6B.

Figure 6D:
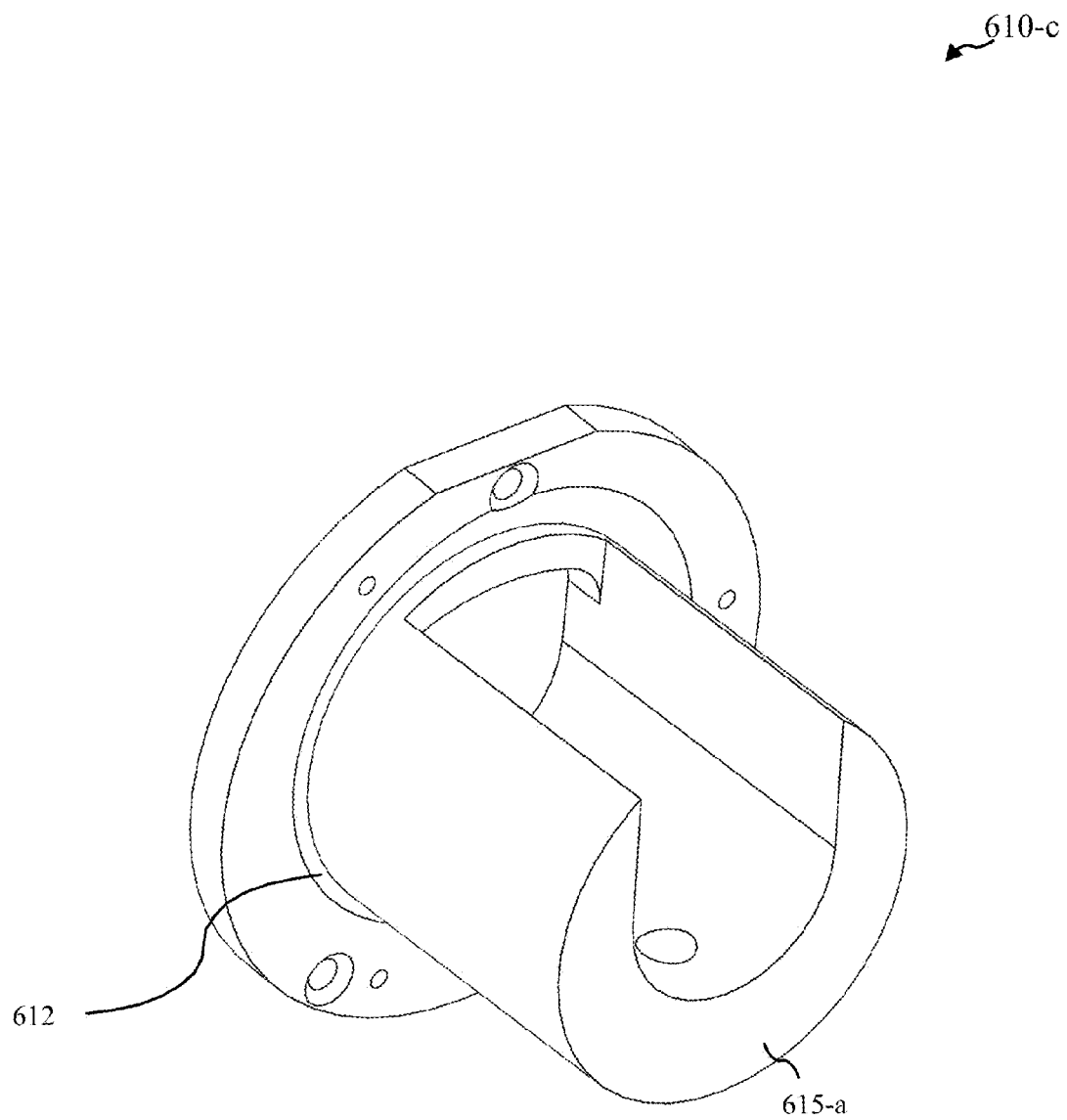
Figure 6E:
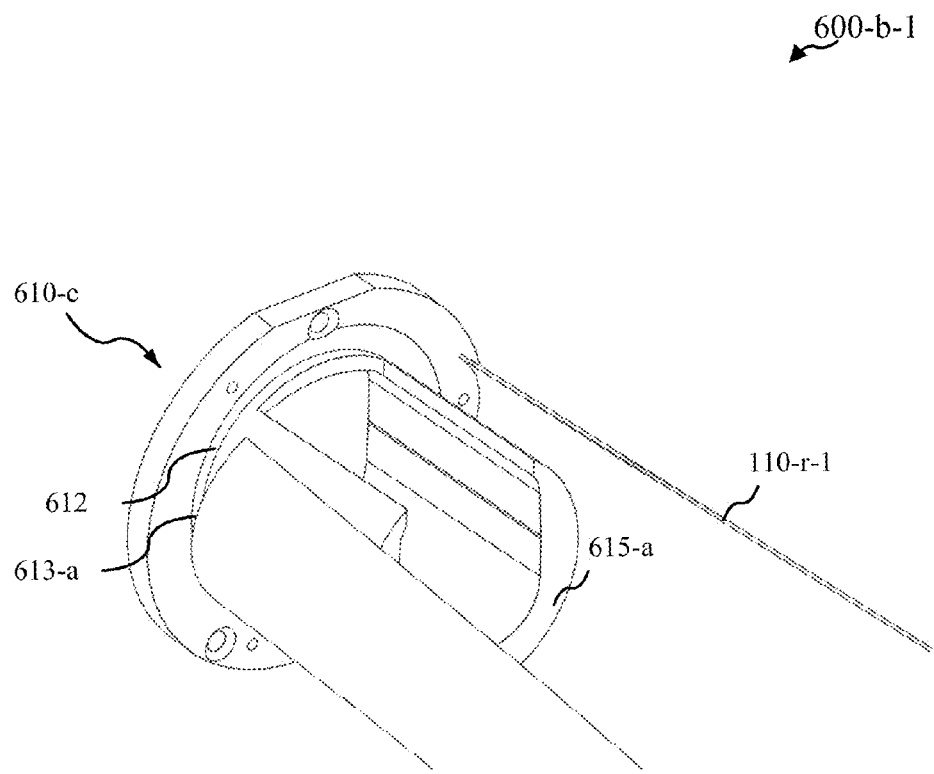
Figure 6F:
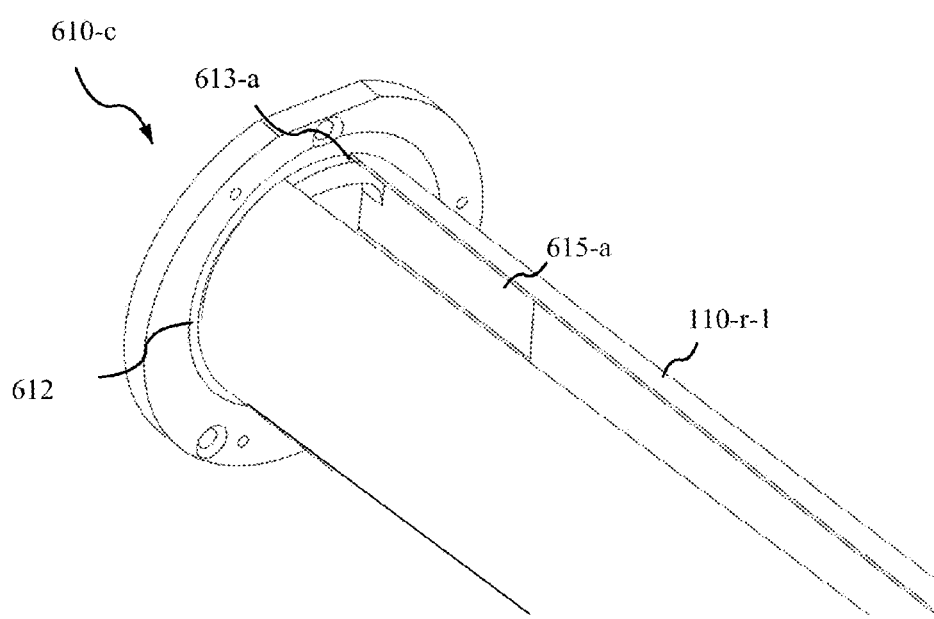

FIG. 6D shows an example of an end fitting 610-*c* in accordance with various embodiments. End fitting 610-*c* may be an example of end fitting 610 of FIG. 6A, end fitting 610-*a* of FIG. 6B, and/or end fitting 610-*b* of FIG. 6C. In particular, end fitting 610-*c* shows groove 612 that may be configured to direct one or more edges of a furlable boom. For example, the one or more end portions of the end fitting 610-*c* includes an end support, such as groove 612, configured to direct the one or more end portions of the furlable boom during deployment of the furlable boom and support the one or more end portions of the furlable boom after deployment. Furthermore, device 610-c shows an insert 615-a, which may be configured to fit within a furlable boom. Insert 615-a may support an inner surface of the furlable boom when the furlable boom is deployed. FIG. 6E then shows a deployment device 600-b-1 that may include a boom 110-r-1 coupled with the end fitting 610-c with groove 612. Edge 613-a of boom 110-r-1 may move forward during deployment and engagement with groove 612 of end fitting 610-c. FIG. 6F further shows device 600-b-2 that may include boom 110-r-1 coupled with the end fitting 610-c with groove 612. Device 600-b-2 may be shown in a deployed state, where edges 613-a of boom 110-r-1 have engaged with groove 612 of end fitting 610-c. FIG. 6E and/or FIG. 6F may thus show one or more portions of the end fitting 610-c that may include an end support, such as groove 612, configured to direct the one or more end portions, which may include edge 613-a, of the furlable boom 110-r-1 during deployment of the furlable boom 110-r-1 and support the one or more end portions of the furlable boom 110-r-1 after deployment.

Figure 6G:
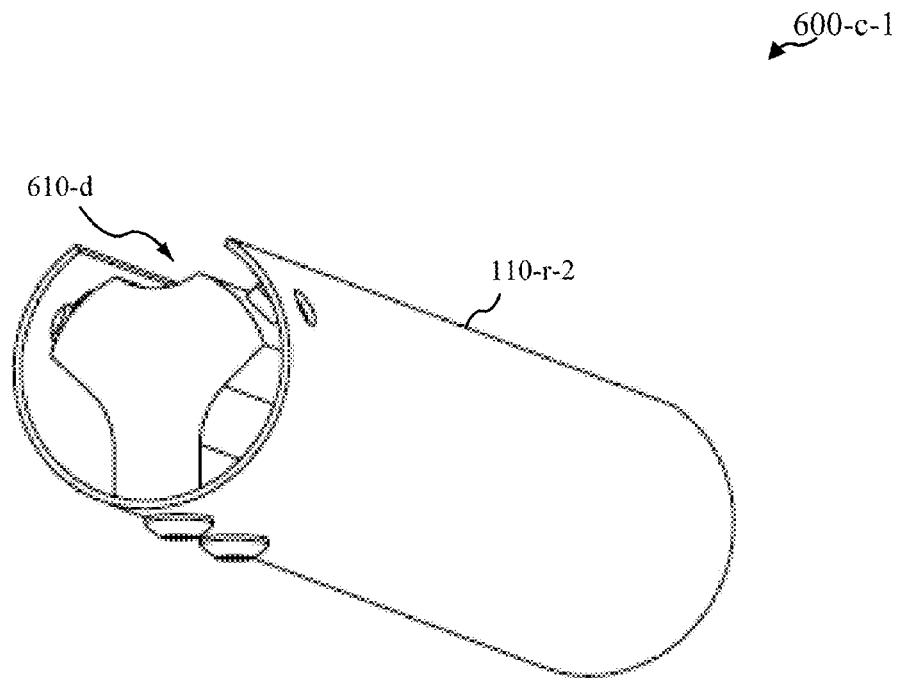
Figure 6H:
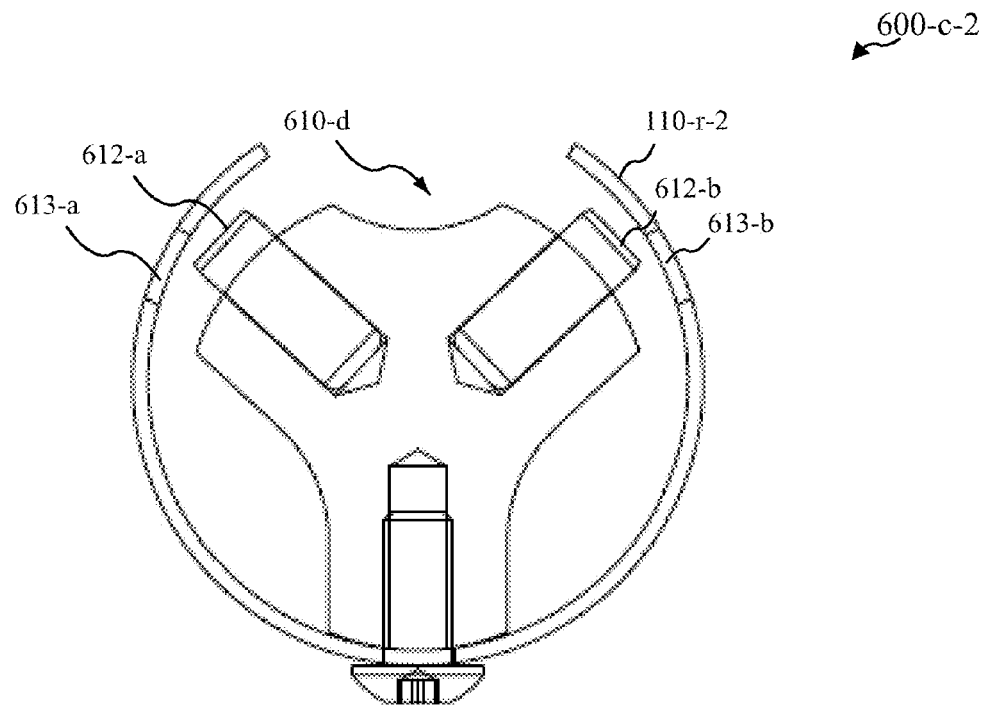
Figure 6I:
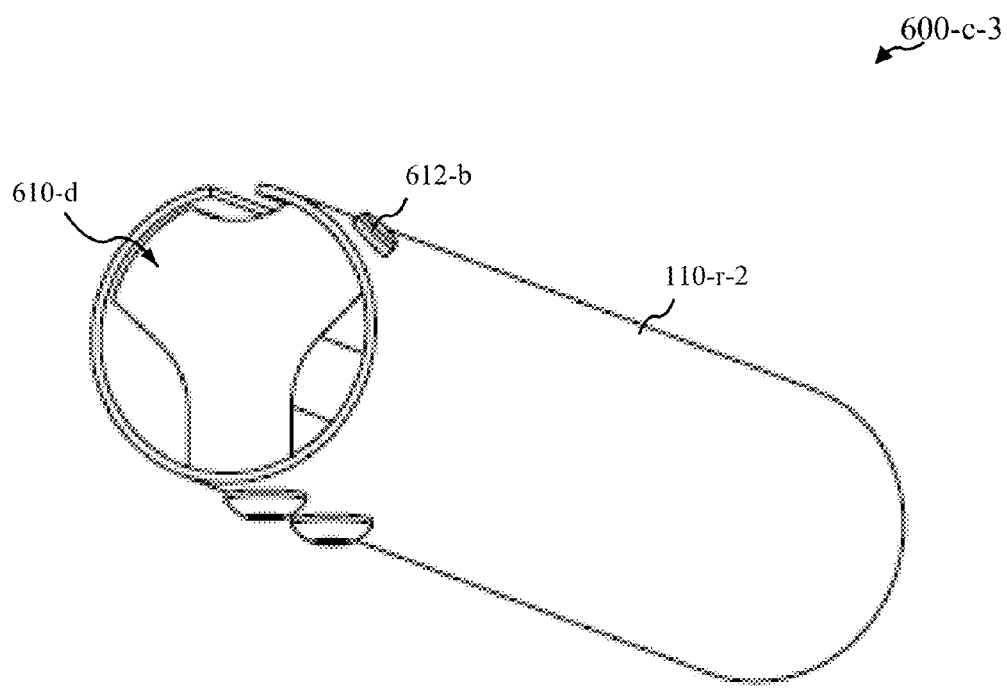
Figure 6J:
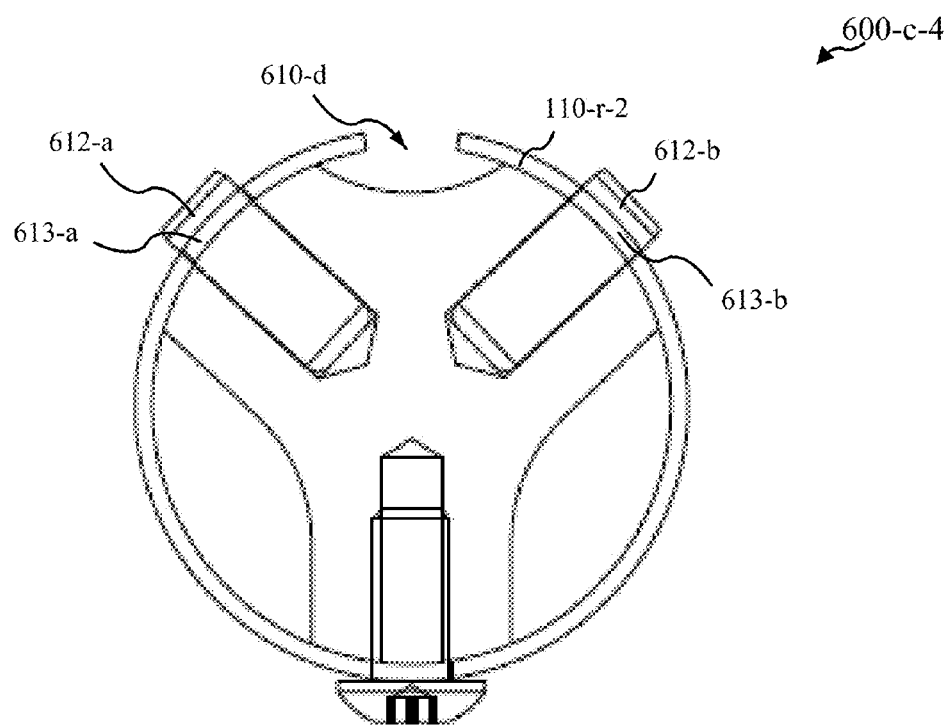

FIG. 6G and FIG. 6H show an isometric view 600-c-1 and a cross-sectional view 600-c-2 of a deployment device in accordance with various embodiments that may include a furlable boom 110-r-2 coupled with the end fitting 610-d before full deployment. End fitting 610-d may be an example of end fitting 610 of FIG. 6A. In some embodiments, one or more portions of the end fitting 610 includes one or protuberances 612-a, 612-b configured to fit with one or more features, such as one or more apertures 613-a, 613-b, of the one or more end portions of the furlable boom 110-r-2. Apertures 613-a, 613-b of boom 110-r-2 may move toward protuberances 612-a, 612-b during deployment and engagement with protuberances 612-a, 612-b of end fitting 610-d when deployed. FIG. 6I and FIG. 6J then show an isometric view 600-c-3 and a cross-sectional view 600-c-4 of the deployment device in accordance with various embodiments that may include the furlable boom 110-r-2 coupled with the end fitting 610-d after deployment. In these figures, the protuberances 612-a, 612-b have engaged the apertures 613-a, 613-b. The protuberances 612-a, 612-b and the apertures 613-a, 613-b may release when the boom 110-r-2 goes from a deployed state to a stowed state when the boom may be retracted.

Figure 7A:
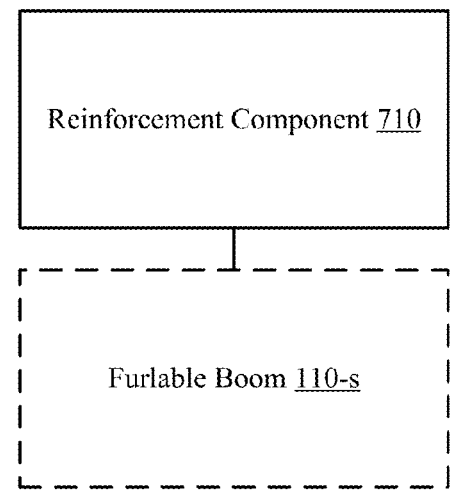
FIG. 7A, FIG. 7B, and FIG. 7C show deployment devices in accordance with various embodiments.

Turning to FIG. 7A, a deployment device 700 in accordance with various embodiments is provided. Device 700 may be an example of boom reinforcement device 130 of FIG. 1B. Device 700 may be an example of aspects of system 100 of FIG. 1A, system 100-b of FIG. 1C, system 200 of FIGS. 2A-2D, and/or system 201 of FIG. 2E and/or FIG. 2G. Device 700 may include one or more reinforcement components 710 and a furlable boom 110-s.

The reinforcement component 710 may be coupled with the furlable boom 110-s. The reinforcement component 710 may locally strengthen a portion of the furlable boom 110-s. In some embodiments, the reinforcement component 710 includes an aperture.

The reinforcement component 710 may be co-cured with the furlable boom 110-s during fabrication. In some embodiments, the reinforcement component 710 may be attached or otherwise bonded with the furlable boom 110-s.

The reinforcement component 710 may include a metallic insert, such as a stainless-steel insert. In some embodiments, the furlable boom 110-s may be fabricated from composite material, such as multiple laminate layers. The reinforcement component 710 may be referred to as a local laminate reinforcement component. In some embodiments, the reinforcement component 710 is configured to engage an insertable stop component (see, e.g., FIG. 8A). In some embodiments, the aperture is configured to create a close-fitting bearing surface. The aperture may be configured to engage a latch mechanism.

Figure 7B:
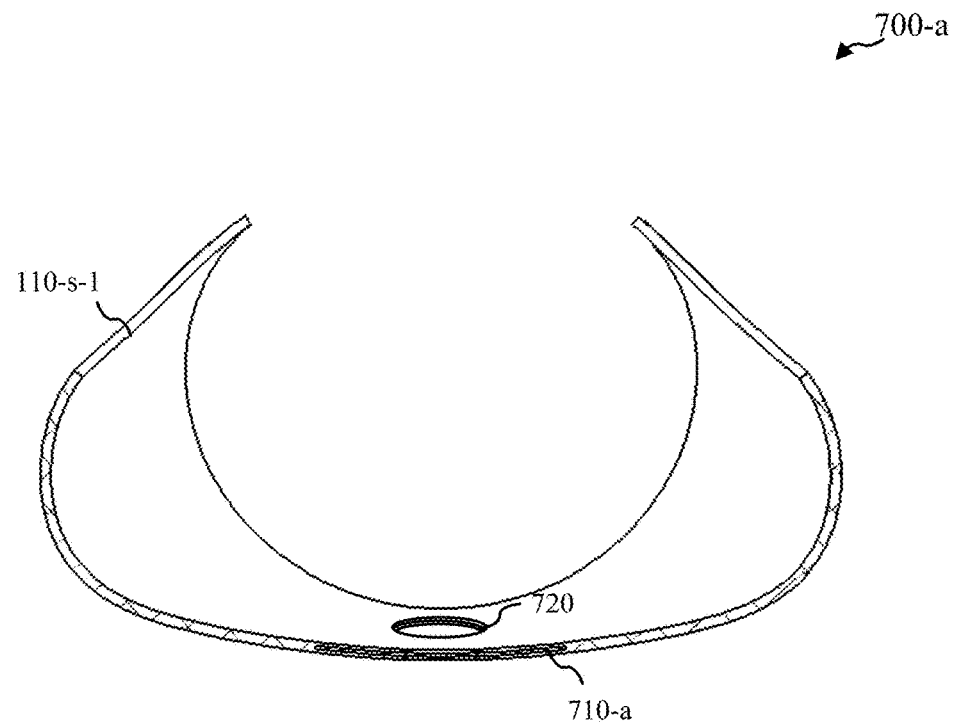
Figure 7C:
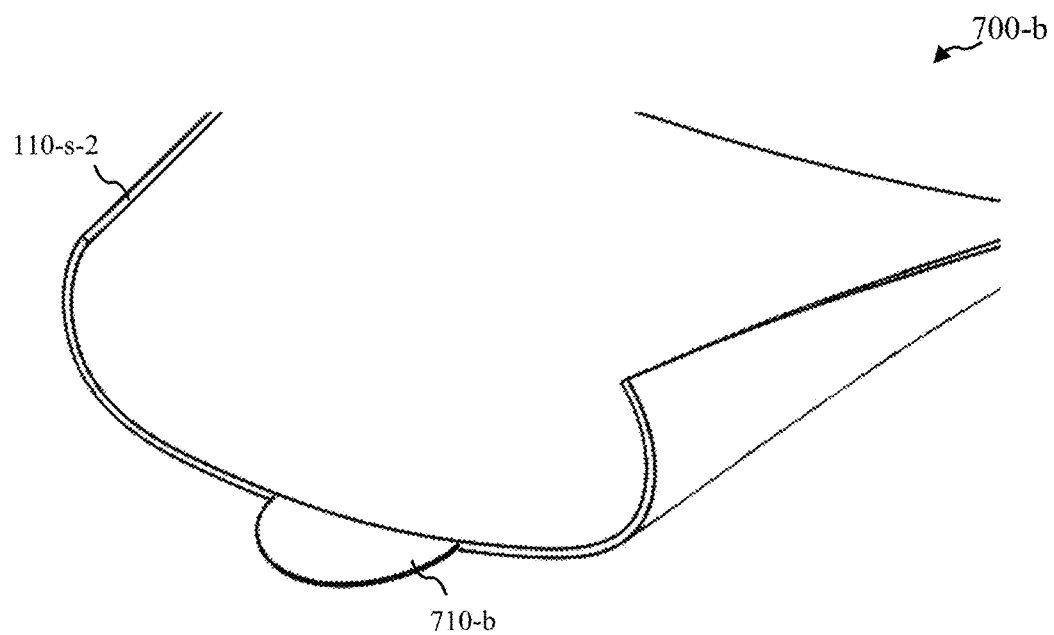

FIG. 7B shows a device 700-a in accordance with various embodiments, which may be an example of device 700 of FIG. 7A. This device 700-a may show a reinforcement component 710-a and furlable boom 110-s-1 in accordance with various embodiments. In some embodiments, an aperture 720 or other feature may be formed in the reinforcement component 710-a before or after it is coupled with the furlable boom 110-s-1. In some embodiments, an aperture 720 or other feature may also be formed in the furlable boom 110-s-a that coincides with the aperture or other feature of the reinforcement component 710-a, as may be shown in FIG. 7B. FIG. 7C shows an isometric view of a device 700-b in accordance with various embodiments, which may be an example of device 700 of FIG. 7A. Device 700-b may include a reinforcement component 710-b and furlable boom 110-s-2 in accordance with various embodiments; a portion of boom 110-s-2 may be cut away to show reinforcement component 710-b. In these examples, the reinforcement components 710 may be co-cured with the furlable booms 110-s during fabrication.

Figure 8A:
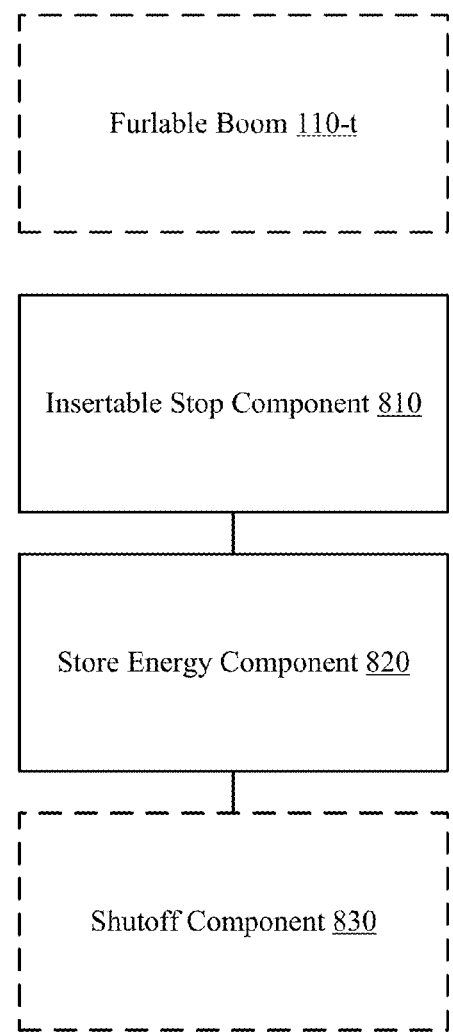

Turn now to FIG. 8A, a deployment device 800 in accordance with various embodiments is provided. Device 800 may be an example of latch device 170 of FIG. 1B, for example. Device 800 may be an example of aspects of system 100 of FIG. 1A, system 100-b of FIG. 1C, system 200 of FIGS. 2A-2D, and/or system 201 of FIG. 2E and/or FIG. 2G.

Device 800 may include an insertable stop component 810 and/or a store energy component 820, which may be configured to press an end of the insertable stop component 810 into a feature of a furlable boom 110-t to control deployment of the furlable boom 110-t. In some embodiments, the store energy component 820 may include a compression component. For example, device 800 may be utilized to facilitate precision deployment and high axial load of the furlable boom 110-t. In some embodiments, device 800 may be referred to as a precision latch or pin latch device. Some embodiments include a shutoff component 830 that may be configured to facilitate stopping the deployment of the furlable boom 110-t when at least a portion of the insertable stop component 810 presses into or passes over the feature of the furlable boom 110-t. The feature of the furlable boom 110-t may include an aperture, a slot, a groove, or an indentation of the furlable boom 110-t. In some embodiments, the furlable boom 110-t includes a slit-tube boom and the feature of the furlable boom 110-t includes a reinforced aperture.

In some embodiments, the insertable stop component 810 may include a pin. Other insertable stop components 810 may include other bearing surfaces, sheer members, rods, and/or buttons, for example. The store energy component 820 may include a spring. More generally, an actuator may be utilized for component 820. For example, a motor/electric actuator may be utilized to push the pin or other insertable stop component 810; in some embodiments, an electromagnet may be utilized to pull a magnetic pin through the boom 110-t (potentially against the force of a tension spring, which may reset the pin later). In some embodiments, the component 820 may be an example of linear actuator, linear latching mechanism, and/or linearly actuated lock.

Some embodiments of device 800 include the shutoff component 830 configured to facilitate stopping the deployment of the furlable boom 110-*t* when at least a portion of the insertable stop component 810 presses into or passes over the feature of the furlable boom 110-*t*. The shutoff component 830 may include a sensor configured to determine when at least a portion of the insertable stop component 810 at least presses into the feature of the furlable boom 110-*t* or passes over the feature of the furlable boom 110-*t*. In some embodiments, shutoff component 830 may be located in different positions with respect to insertable stop component 810. Some embodiments may utilize a burn wire coupled with the shutoff component 830.

Figure 8B:
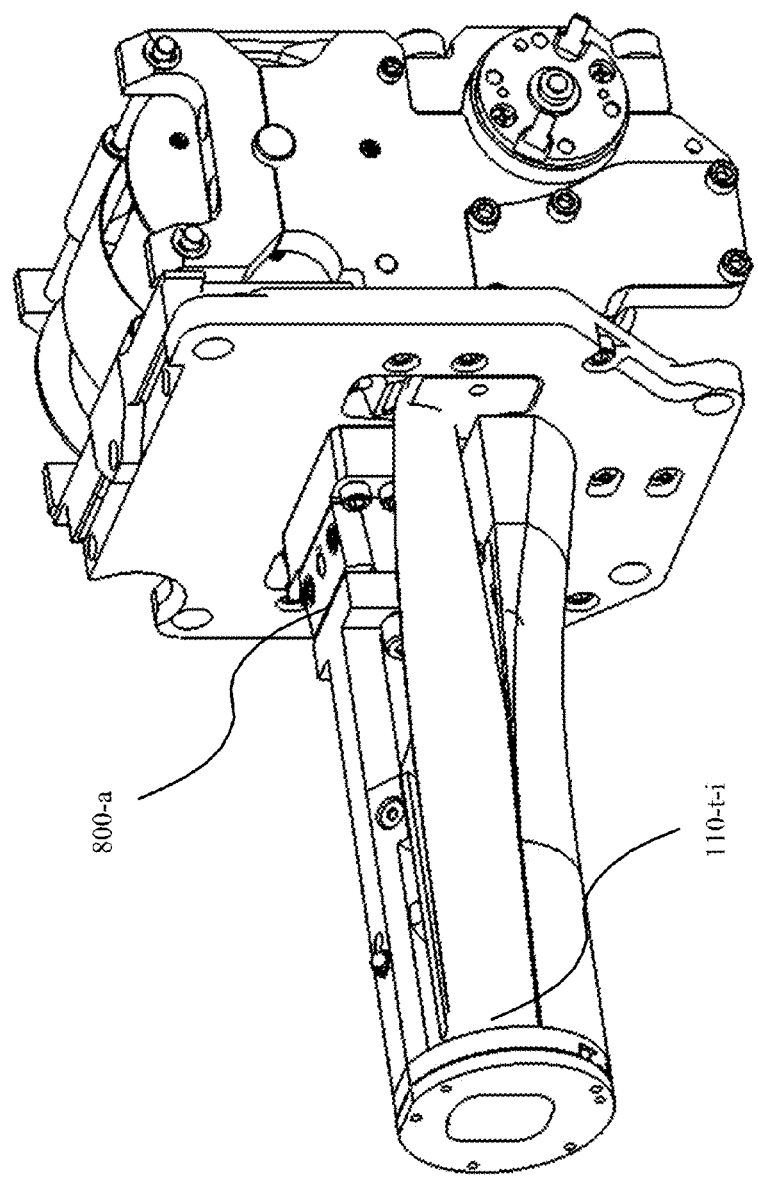

FIG. 8B shows a system 801 in accordance with various embodiments. System 801 may include an example of a device 800-a, which may be an example of device 800 of FIG. 8. System 801 may be an example of a boom deployment system such as those shown in FIGS. 1A, 1B, 1C, 2A, 2B, 2C, 2D, 2E, and/or 2G. System 801 may include numerous components including, but not limited to, a furlable boom 110-*t*-*i* and boom deployment and/or boom retraction components (e.g., see FIG. 10A).

Figure 8C:
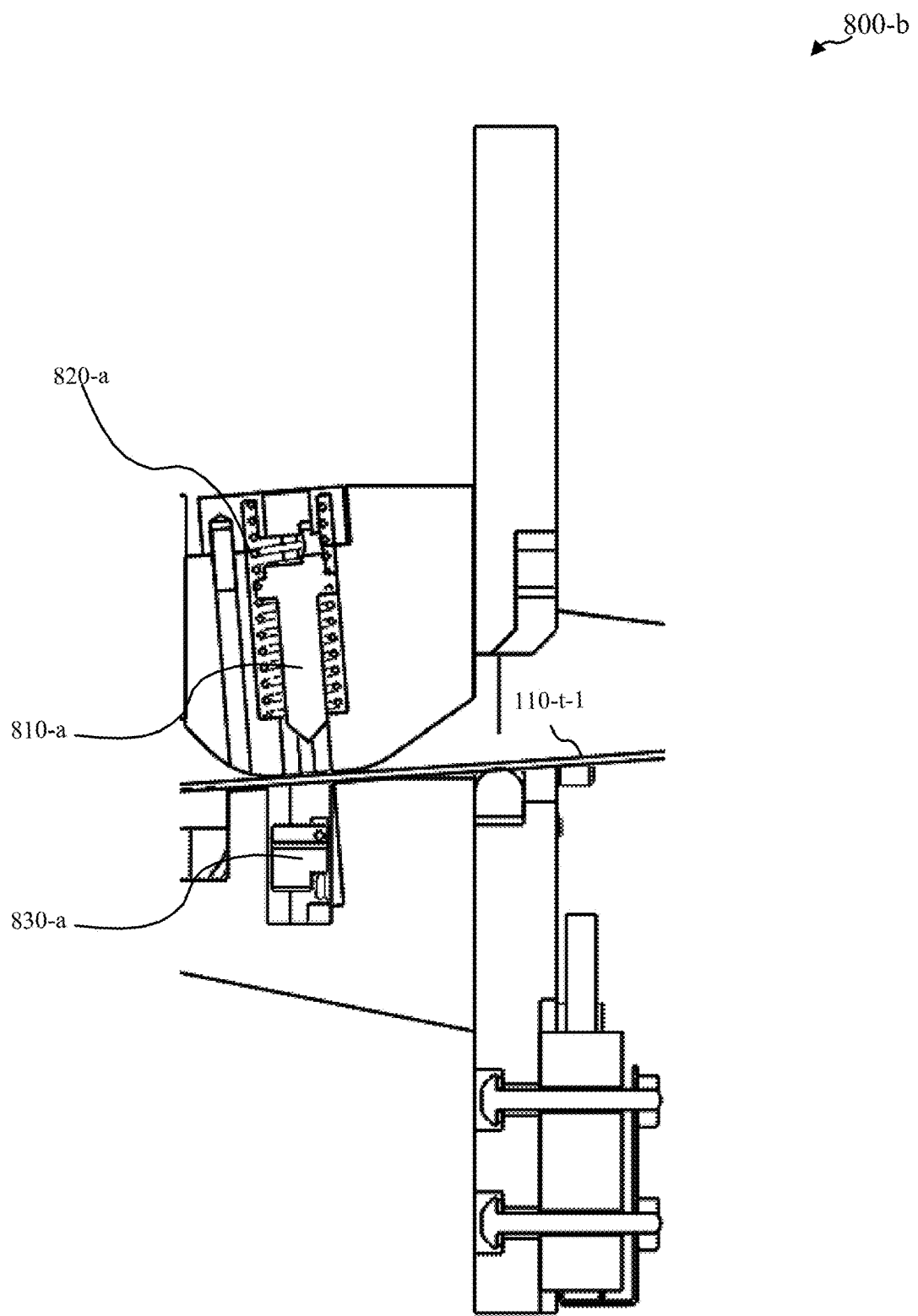

FIG. 8C shows a device 800-*b* in accordance with various embodiments; device 800-*b* may be an example of device 800 of FIG. 8A or device 800-a of FIG. 8B. Device 800-*b* includes an insertable stop component 810-*a* configured as a pin and a storage energy component 820-a configured as a spring (e.g., compression spring). Device 800-*b* may include a shutoff component 830-*a*, which may be configured as a sensor. FIG. 8C also shows a portion of a furlable boom 110-*t*-1 with respect to the device 800-*b*. The pin 810-*a* may be configured to pass through a reinforced hole through the furlable boom 110-*t*-1. The pin 810-*a* may constrain the boom 110-*t*-1 in a Z direction. In some embodiments, the pin 810-*a* may include a 0.125 inch pin, though other embodiments may include a pin with different size. Sensor 830-*a* may record when pin 810-*a* has penetrated through the boom 110-*t*-1. In some embodiments, this may be triggered by a last portion of the travel of the pin 810-*a*, such as the last 0.150 inch of pin travel. The senor 830-*a* may record pin 810-*a* engagement in order to shut down a drive motor autonomously for the boom 110-*t*-1, for example.

Figure 8D:
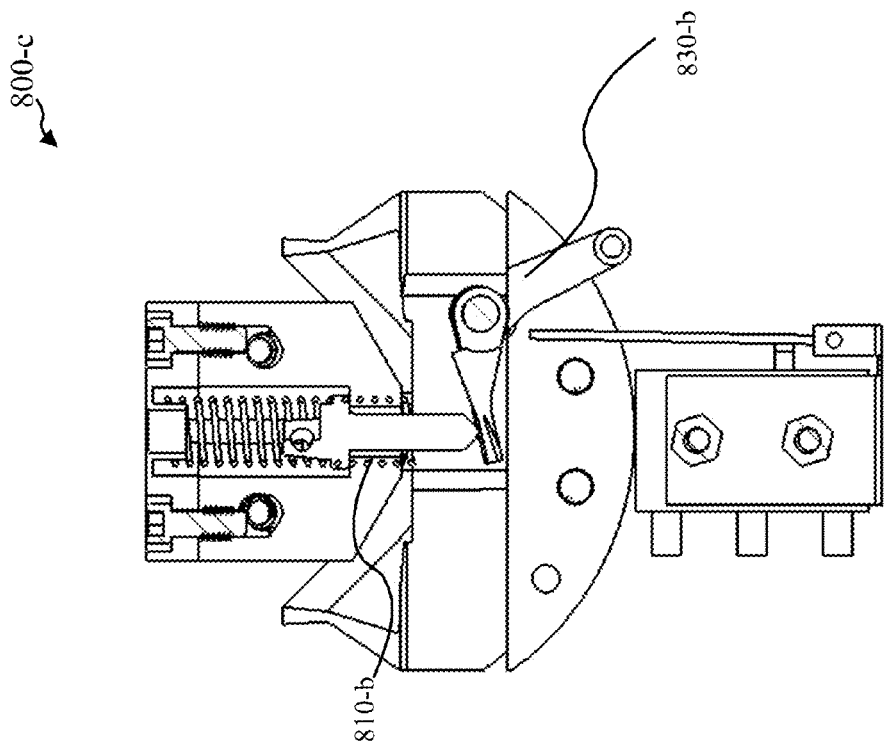
Figure 8D:
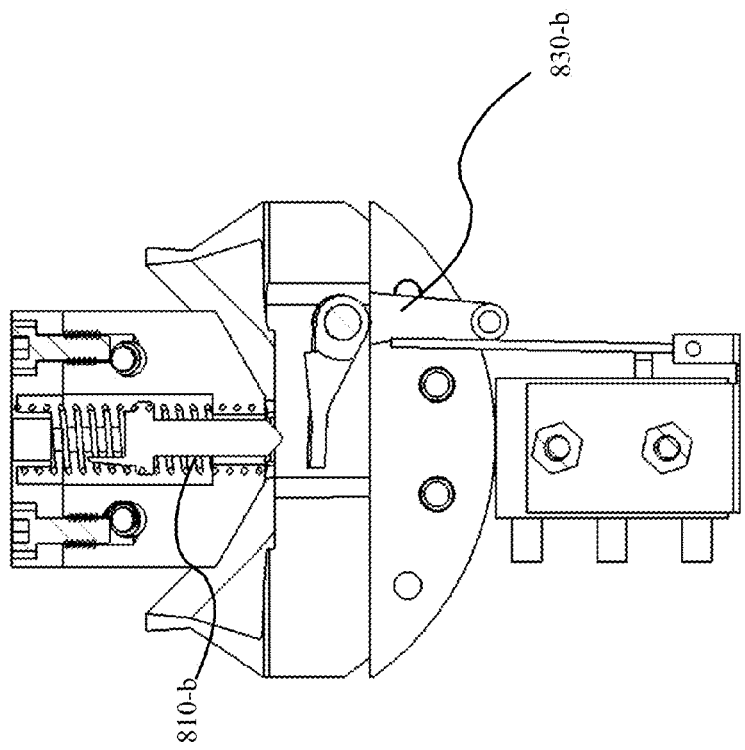

FIG. 8D shows an example of a device 800-*c* in accordance with various embodiments in two different states—before (left portion) and after (right portion) an insertable stop component 810-*b* passes through a furlable boom, resulting in a sensor 830-*b* recording this effect and shutting down a drive motor for the boom. Device 800-c may be an example of aspects of device 800 of FIG. 8A, device 800-a of FIG. 8B, and/or device 800-*b* of FIG. 8C.

FIG. 8E shows aspects of a device 800-*d* in accordance with various embodiments. Device 800-*d* may be an example of device 800 of FIG. 8A, device 800-*a* of FIG. 8B, device 800-*b* of FIG. 8C, and/or device 800-*c* of FIG. 8D. FIG. 8E may show an insertable stop component 810-*c*, configured as a pin, as it meets an aperture 711 (a "boom hole") of furlable boom 110-*t*-2. As pin 810-*c* passes through aperture 711, it may fit into slot 815. This may help prevent over constraining boom 110-*t*-2; this configuration may help constrain boom 110-*t*-2 axially. As may be noted, pin 810-*c* may be configured with a conical tip. The slot 815 may be configured with different sizes, such as being 1.5 times a diameter of pin 810-*c*, though other sizes may be utilized. The use of a flattened end of pin 810-*c* and/or pin tilt may help reduce oversizing.

Pin 810-*c* may be configured to avoid binding between itself and the housing 825. Low-friction coatings on pin 810-*c* and a latch cavity in housing 825 may be utilized in some embodiments; dissimilar metals may be used to ensure galling may not occur.

Figure 8F:
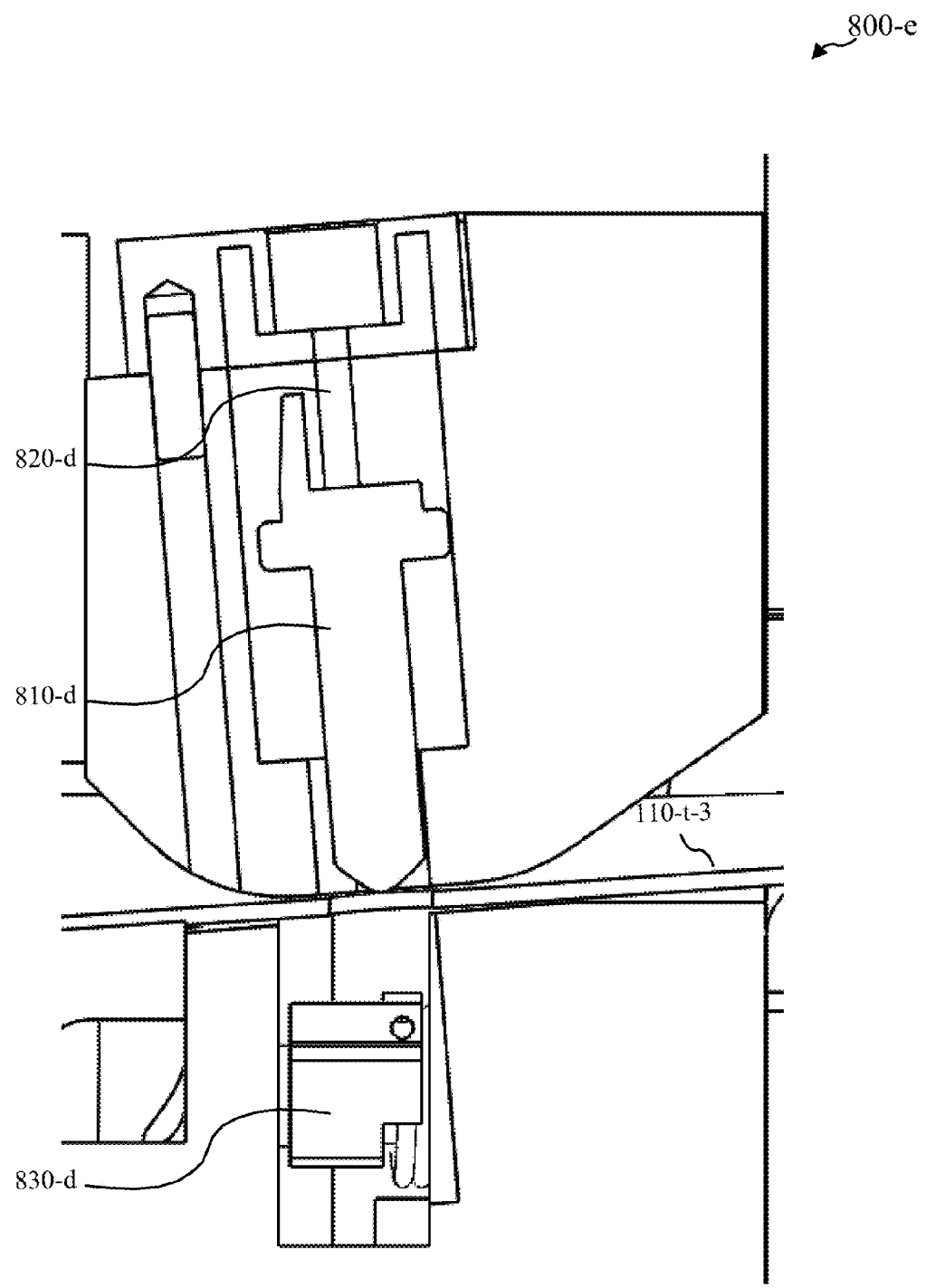
Figure 8G:
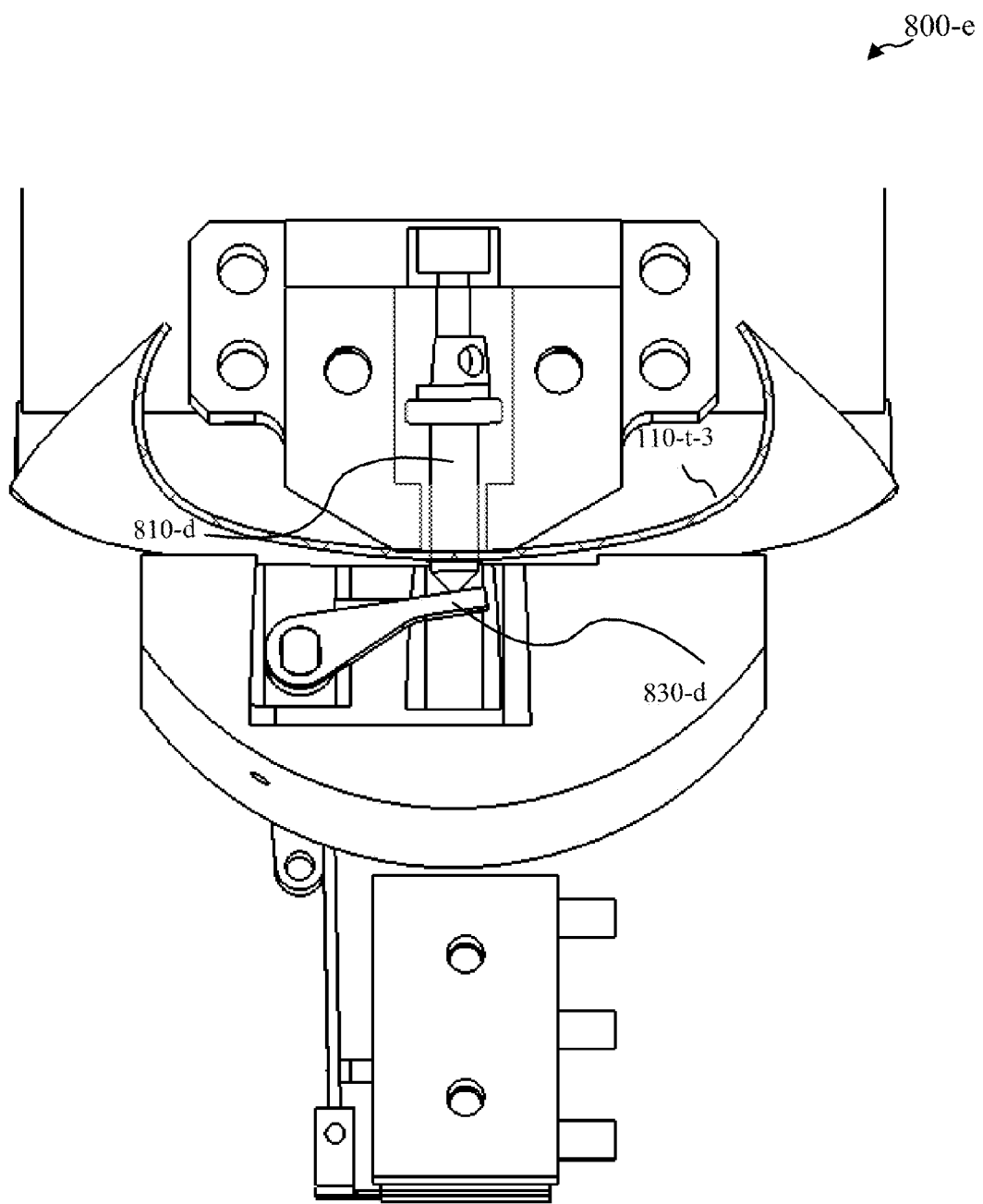
Figure 8H:
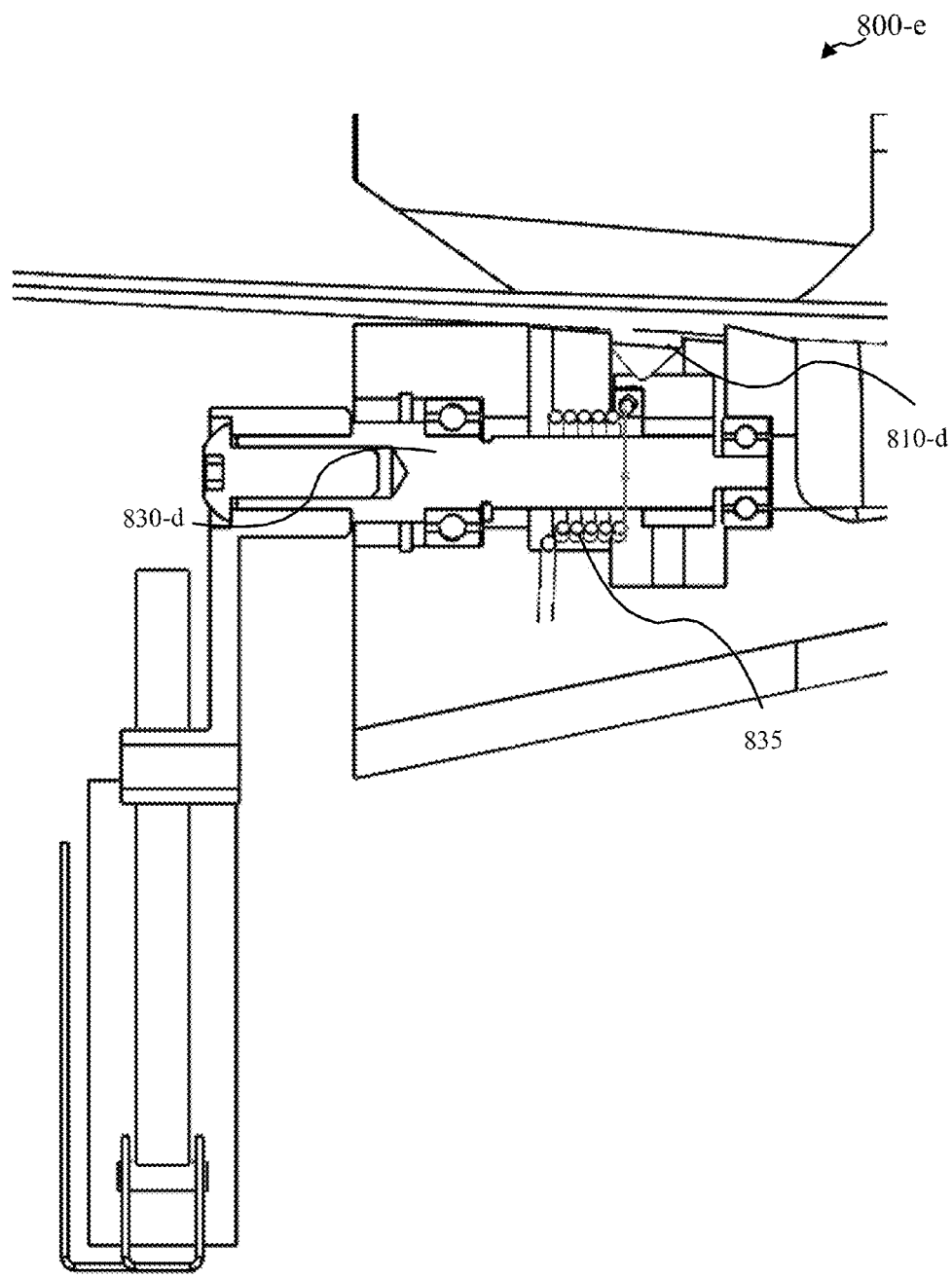

FIG. 8F shows a device 800-*e* in accordance with various embodiments; device 800-*d* may be an example of device 800 of FIG. 8A, device 800-*a* of FIG. 8B, device 800-*b* of FIG. 8C, device 800-*c* of FIG. 8D, and/or device 800-*d* of FIG. 8E. Device 800-*e* includes an insertable stop component 810-*d*, which may be configured as a pin, and a store energy component 820-*d*, which may be configured as a spring. Device 800-*e* may include a shutoff component 830-*d*, which may be configured as a sensor. FIG. 8F also shows a portion of a furlable boom 110-*t*-3 with respect to the device 800-*e*. Pin 810-*d* may be held against a surface of boom 110-*t*-3 by store energy spring 820-*d*. A tip of pin 810-*d* may rest against the surface of boom 110-*t*-3 during stowage and operation. FIG. 8G may show another perspective on device 800-*e* after the pin 810-*d* may have fully penetrated boom 110-*t*-3 and may contact a pin arm as part of sensor 830-*d*, which may move the pin arm. A switch linkage may then rotate, which may allow a switch and actuator to release. FIG. 8H shows aspects of device 800-*e* with regard torsion spring 835. Torsion spring 835 may hold switch linkage as part of sensor 830-*d* in place. Torsion spring 835 may actuate the switch during stowage. Pin 810-*d* may force the linkage to rotate against torsion spring 835.

Figure 9A:
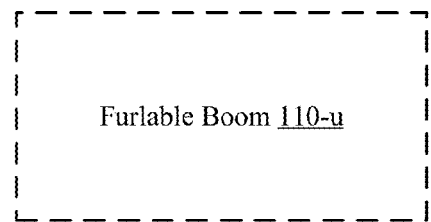
FIG. 9A, FIG. 9B, FIG. 9C, FIG. 9D, FIG. 9E, FIG. 9F, FIG. 9G, FIG. 9H, FIG. 9I, FIG. 9J, FIG. 9K, FIG. 9L, FIG. 9M, and FIG. 9N show deployment devices and/or aspects of deployment systems in accordance with various embodiments.
Figure 9A:
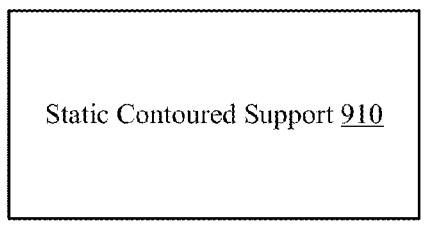
Figure 9A:
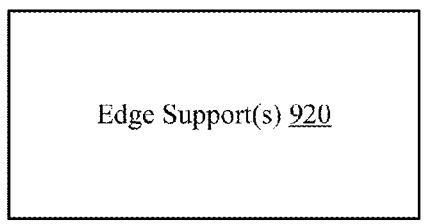

Turning now to FIG. 9A, deployment devices 900 in accordance with various embodiments is provided. Devices 900 may include one or more static contoured supports 910 and/or one or more edge supports 920. Devices 900 may provide examples of aspects of contoured support device 150 and/or edge support device 160 of FIG. 1B, for example. Device 900 may be an example of aspects of system 100 of FIG. 1A, system 100-*a* of FIG. 1B, system 100-*b* of FIG. 1C, system 200 of FIGS. 2A-2D, and/or system 201 of FIG. 2E or FIG. 2G. Devices 900 may include the static contoured support 910 configured to match a geometry of a furlable boom 110-*u*. Device 900 may provide support for the furlable boom 110-*u* during deployment such that the boom 110-*u* may maintain or otherwise achieve a certain shape. Devices 900 may be configured for both forward and aft support of the boom 110-*u*. Some embodiments may utilize device 900 to form a forward boom support and/or to form an aft boom support.

For example the static contoured support 910 may be configured to match the geometry of the furlable boom 110-*u* during a deployment of the boom 110-*u*, such as from a furled geometry to a deployed geometry. Some embodiments include one or more edge supports 920 configured to supply a circumferential or downward force on the furlable boom 110-*u*. In some embodiments, the static contoured support 910 includes a cutout portion configured to accommodate a deformation of a portion of the furlable boom 110-*u*; the deformation of the portion of the furlable boom 110-*u* may allow for the use of the properties of the furlable boom 110-*u* to push against components such as the edge supports 920 in some embodiments. In some embodiments, the one or more edge supports 920 may be configured to provide one or more hard stops for one or more edges of the furlable boom 110-*u*. In some embodiments, the edge supports 920 include one or more spring components configured to apply a preload to one or more edges of the furlable boom 110-*u*. For example, in some embodiments, the one or more edge supports 920 include one or more spring components configured to apply a preload to a first edge from the one or more edges of the furlable boom 110-*u* while the one or more hard stops make contact with a second edge from the one or more edges of the furlable boom 110-*u*. In some embodiments, the one or more edge supports 920 are configured to form one or more grooves in situ in the one or more edge supports 920 from contact with the one or more edges of the furlable boom 110-*u*.

Figure 9B:
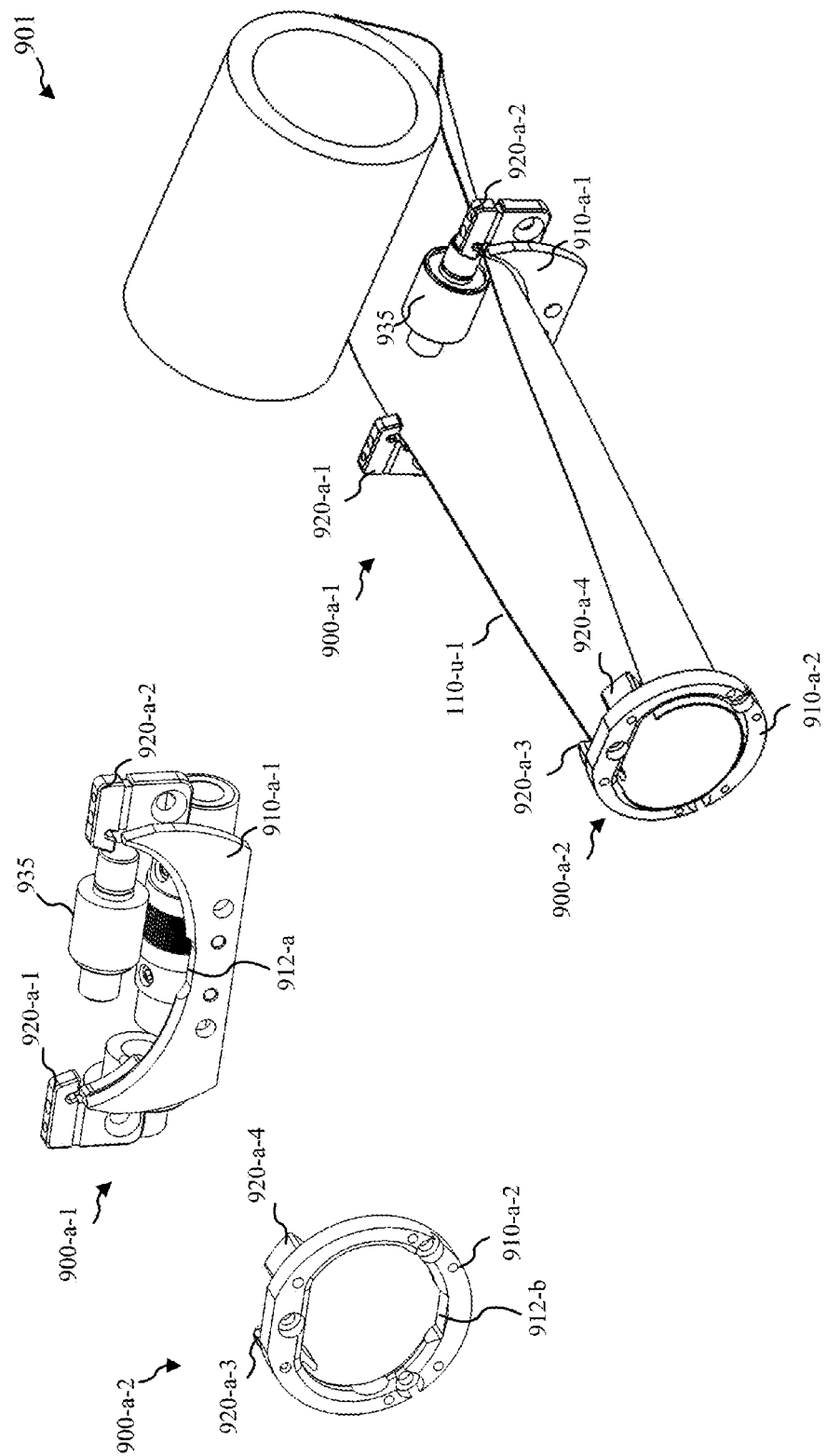

FIG. 9B shows aspects of a deployment system 901 in accordance with various embodiments, which includes devices 900-*a*-1 and 900-*a*-2 and a furlable boom 110-*u*-1. Devices 900-*a*-1 and 900-*a*-2 are also shown in isolation without the boom 110-*u*-1, which may reveal aspects that may be obscured by boom 110-*u*-1 in system 901. Device 900-*a*-1 and/or device 900-*a*-2 may be examples of device 900 of FIG. 9A and may include a static contoured support 910-*a*-1 and 910-*a*-2, respectively. Device 900-*a*-1 may include edge supports 920-*a*-1 and 920-*a*-2; device 900-*a*-2 may include edge supports 920-*a*-3 and 920-*a*-4. Edge supports 920-*a* may supply a circumferential and/or down force on boom 110-*u*-1, while the contoured supports 910-*a* contour the boom 110-*u*-1. Device 900-*a*-1 and/or 900-*a*-2 also may include a cutout portion (for example, cutout portion 912-*a* of static contoured support 910-*a*-1 and/or cutout portion 912-*b* of static contoured support 910-*a*-2), which may accommodate a deformation of the boom 110-*u*-1 when edges of boom 110-*u*-1 push against edge supports 920-*a*; the use of deformation of boom 110-*u*-1 with respect to either cutout portions 912-*a* and/or 912-*b* may allow the boom 110-*u*-1 itself to provide the force to apply a preload to one or more of its edges through a spring-like action of the boom 110-*u*-1. Edge supports 920-*a* may provide one or more hard stops when making contact with an edge of boom 110-*u*. In some embodiments, the one or more edge supports 920-*a* are configured to form one or more grooves in situ in the one or more edge supports from contact with the one or more edges of the furlable boom 110-*u*. In some embodiments, device 900-*a*-1 may be referred to as an aft boom support, while device 900-*a*-2 may be referred to as a forward boom support. Deployment system 901 may also include one or more rollers 935, which may make contact with a top surface and/or bottom surface of boom 110-*u*-1 and help provide further support for the boom 110-*u*-1 during deployment or retraction.

Figure 9C:
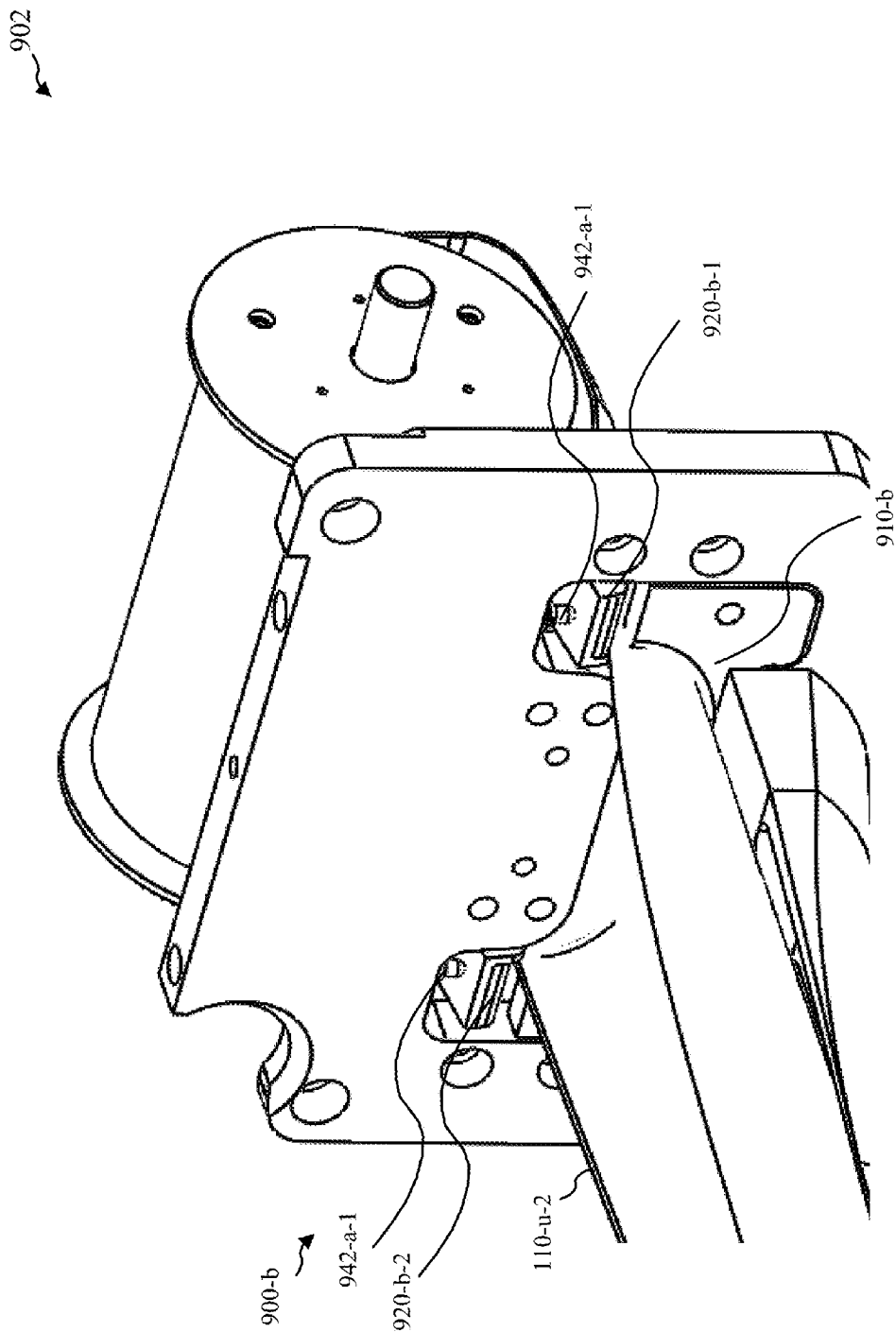

FIG. 9C shows aspects of a deployment system 902 in accordance with various embodiments, which includes a device 900-*b* and a furlable boom 110-*u*-2. Device 900-*b* may be an example of device 900 of FIG. 9A and may include a static contoured support 910-*b*. Device 900-*b* may also include edge supports 920-*b*-1 and 920-*b*-2. Edge supports 920-*b* may supply a down force on boom 110-*u*-2, while the contoured support 910-*b* contours the boom 110-*u*-2. Edge supports 920-*b* may utilize one or more spring components or other components, such as spring-loaded plungers 942-*a*-1 and 942-*a*-2, to apply a preload to one or more edges of boom 110-*u*-2. Edge supports 920-*b* may enable better location of the boom 110-*u*-2 and may provide a specific contact geometry that may not damage an edge of the boom 110-*u*-2. Edge supports 920-*b* may provide for different lateral stiffness aspects. Edge supports 920-*b* may be configured to form one or more grooves in situ in the edge supports 920-*b* from contact with the one or more edges of the furlable boom 110-*u*-2. In some embodiments, edge supports 920-*b* may be referred to as a compliant edge supports.

Figure 9D:
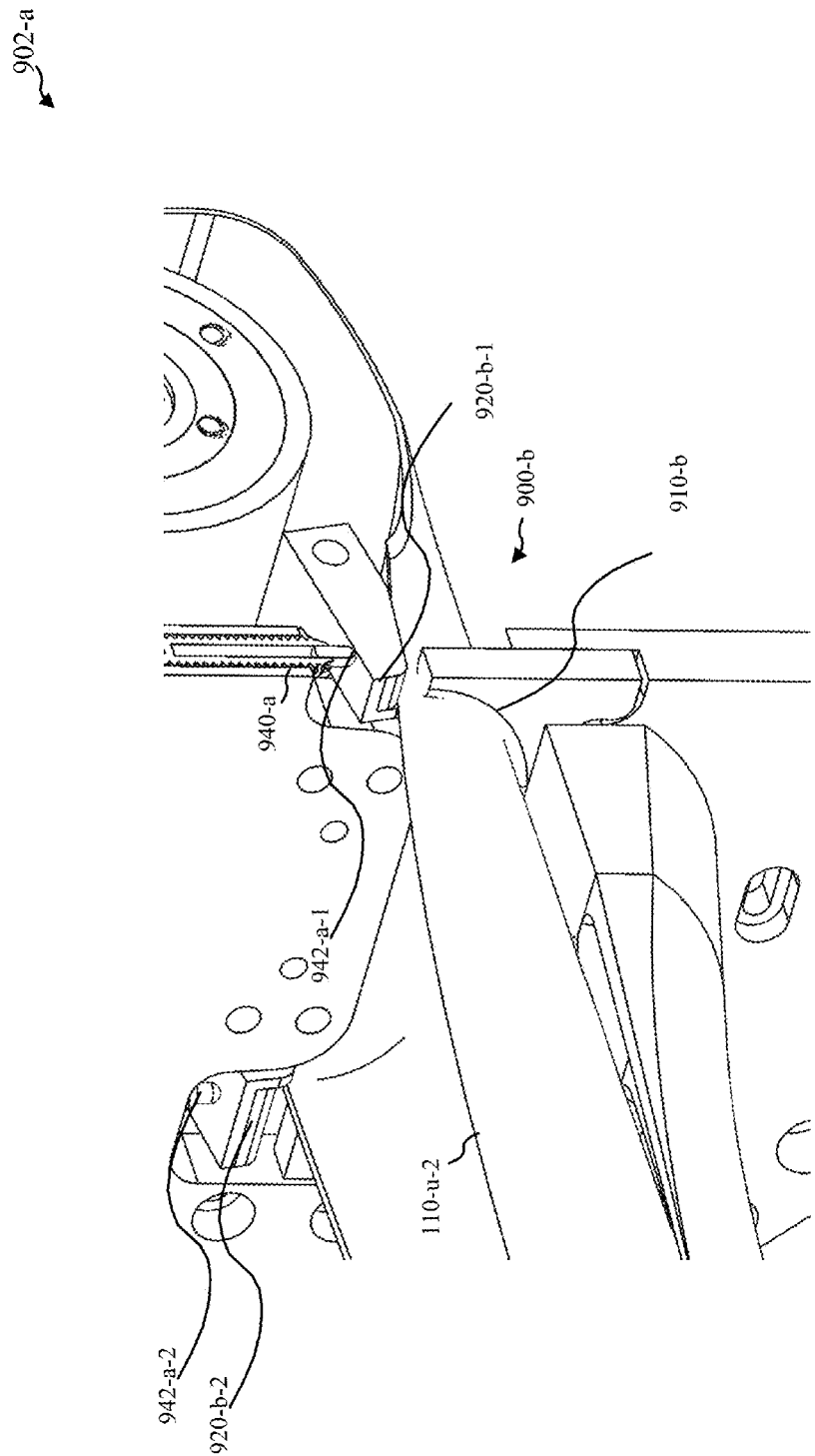
Figure 9E:
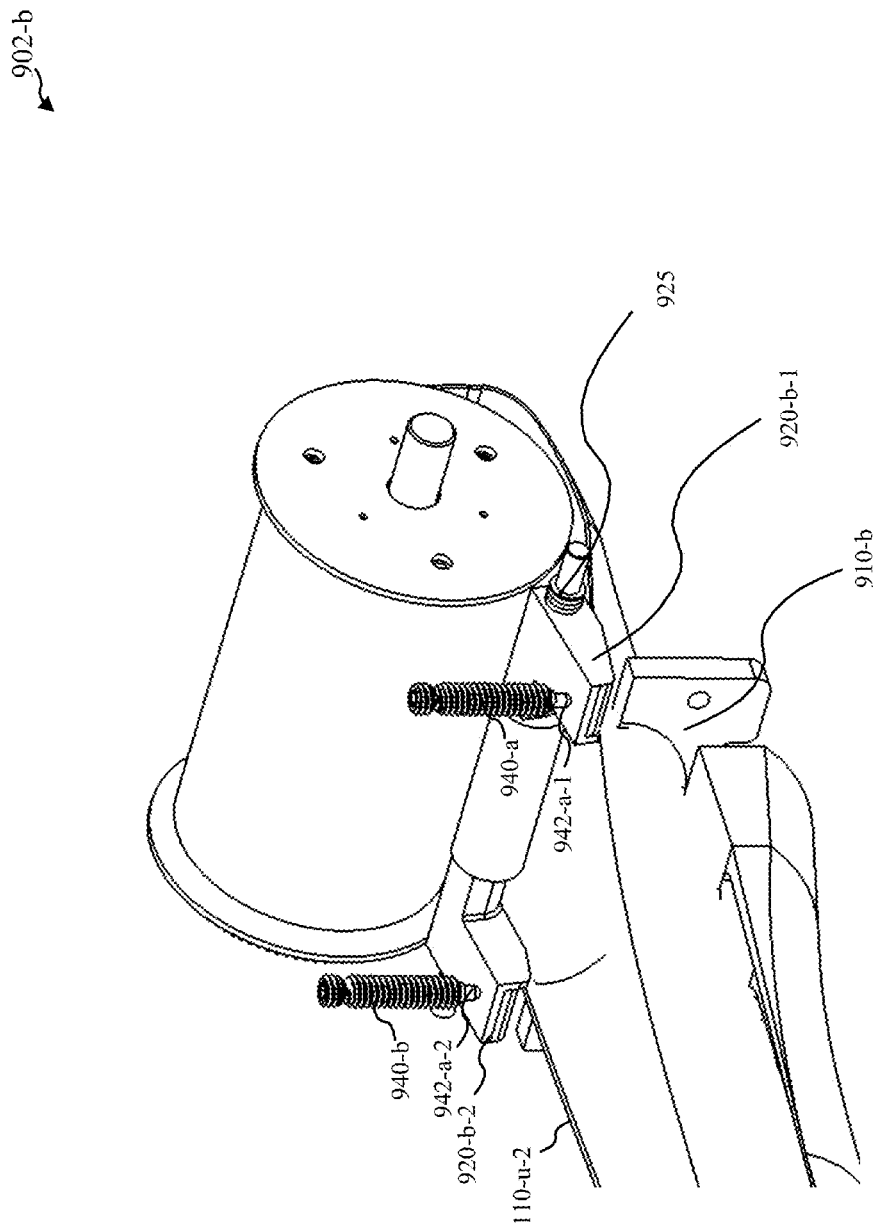

FIG. 9D and FIG. 9E show cut-away views 902-*a* and 902-*b*, respectively, of system 902 of FIG. 9C. In particular, these figures may show preload mechanism adjustment components 940-*a* and 940-*b* for edge supports 920-*b*-2 and 920-*b*-1, respectively. Adjustment components 940-*a* and/or 940-*b* may be configured to apply a constant force to edge supports 920-*b*-2 and 920-*b*-1 over a range of deflections. Adjustment components 940-*a* and/or 940-*b* and/or device 920-*b* may be also configured with static components that may lock the edge of the boom into a specific location regardless of force applied. These static components may be configured to be adjustable to allow for tuning the position of the edge and fitting multiple boom with slightly different manufactured widths. Adjustment components 940-*a* and/or 940-*b* may be considered as part of the edge support device 920-*b*-2 and 920-*b*-1, respectively. Adjustment components 940-*a* and 940-*b* may also include spring components, such as spring-loaded plungers 942-*a*-2 and 942-*a*-1, which may facilitate preloading the one or more edges of boom 110-*u*-2 and/or facilitate the adjustment to allow for tuning the position of the one or more edges of boom 110-*u*-2. Some embodiments may also include one or more other springs 925 that may facilitate the adjustment to allow for tuning the position of the one or more edges of the furlable boom 110-*u*-2 through the adjustment of adjustment components 940-*a* and/or 940-*b*; spring 925 may also facilitate preloading the one or more edges of boom 110-*u*-1.

Figure 9F:
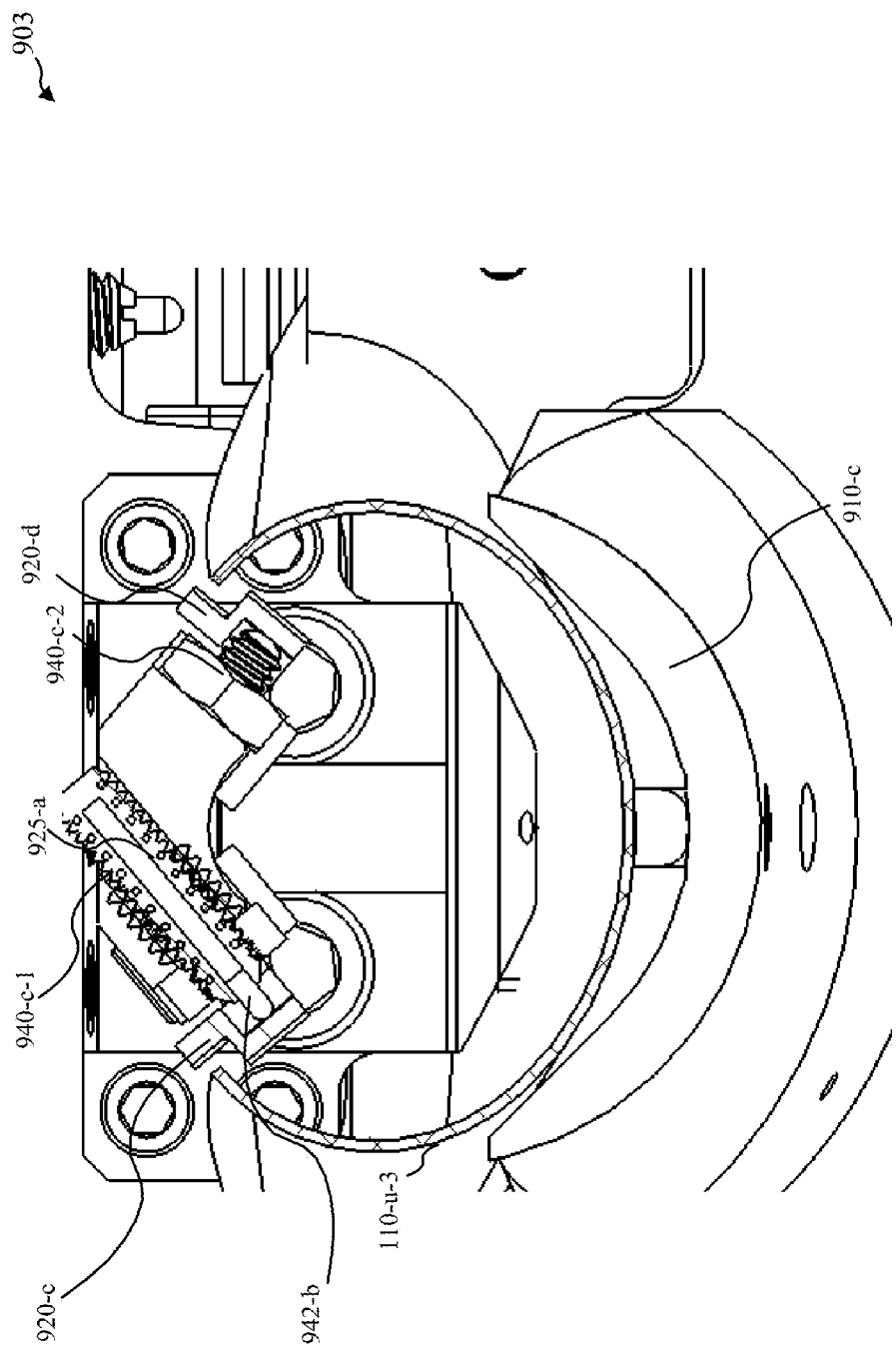

FIG. 9F shows aspects of a deployment system 903 in accordance with various embodiments. System 903 may show, in particular, a furlable boom 110-*u*-3, a static contoured support 910-*c*, and edge supports 920-*c* and 920-*d*. Static contoured support 910-*c* may be configured to match a geometry of furlable boom 110-*u*-3. The components of system 903 may provide support for the furlable boom 110-*u*-3 during deployment such that the boom 110-*u*-3 may maintain or otherwise achieve a certain shape. The components shown in system 903 may be particularly applicable for forward boom support, but also be utilized for aft boom support.

The static contoured support 910-*c* may be configured to match the geometry of the furlable boom 110-*u*-3 during a deployment of the furlable boom 110-*u*-3, such as from a furled geometry to a deployed geometry. The edge supports 920-*c* and/or 920-*d* may be configured to supply a circumferential or downward force on the furlable boom 110-*u*-3. In some embodiments, the edge supports 920 may be configured to provide one or more hard stops for an edge of the furlable boom 110-*u*-3, as may be shown with respect to edge support 920-*d*. Adjustment components 940-*c*-1 and/or 940-*c*-2 may be also configured with static components that may lock the edge of the boom into a specific location regardless of force applied. These static components may be configured to be adjustable to allow for tuning the position of the edge and fitting multiple boom with slightly different manufactured widths. Adjustment components 940-*c*-1 and/or 940-*c*-2 may be considered as part of the edge supports 920-*c* and 920-*d*, respectively.

In some embodiments, the edge support 920-*c* includes one or more spring components, such as spring-loaded plunger 942-*b* with spring 925-*a* (shown as a cross section of the spring), which may be configured to apply a preload to one or more edges of the furlable boom 110-*u*-3. For example, in some embodiments, edge support 920-*c* includes one or more spring components (e.g., spring-loaded plunger 942-*a* and/or spring 925-*a*) configured to apply a preload to a first edge of the furlable boom 110-*u*-3 while the one or more hard stops of edge support 920-*d* make contact with a second edge of the furlable boom 110-*u*-3. In some embodiments, the edge supports 920-*c* and/or 920-*d* may be configured to form one or more grooves, which may be created in situ by sliding contact and/or abrasion with the furlable boom edges, in the portion of the edge supports 920-c and/or 920-d that may make contact with the one or more edges of the furlable boom 110-u-3.

Figure 9G:
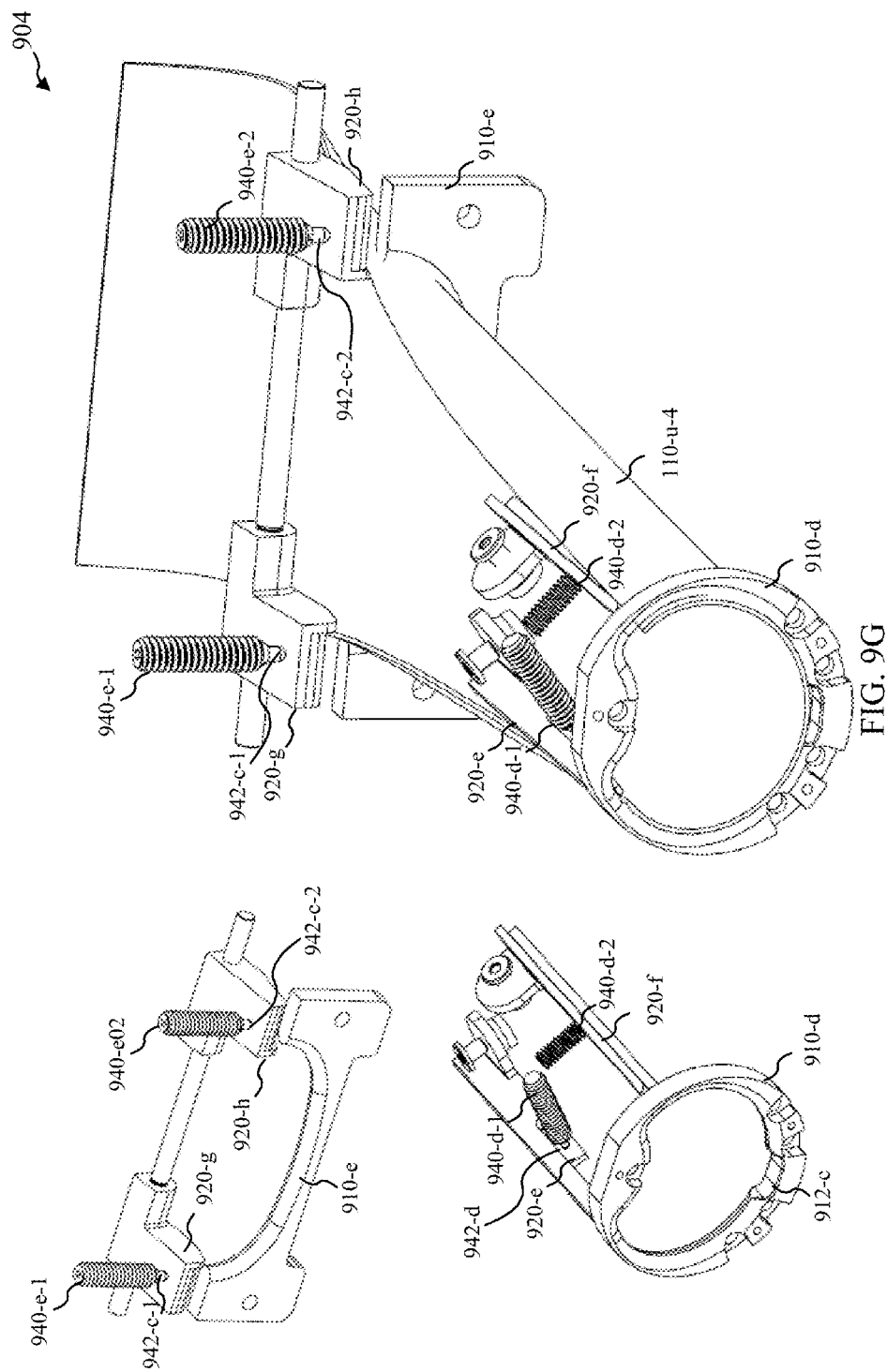
Figure 9H:
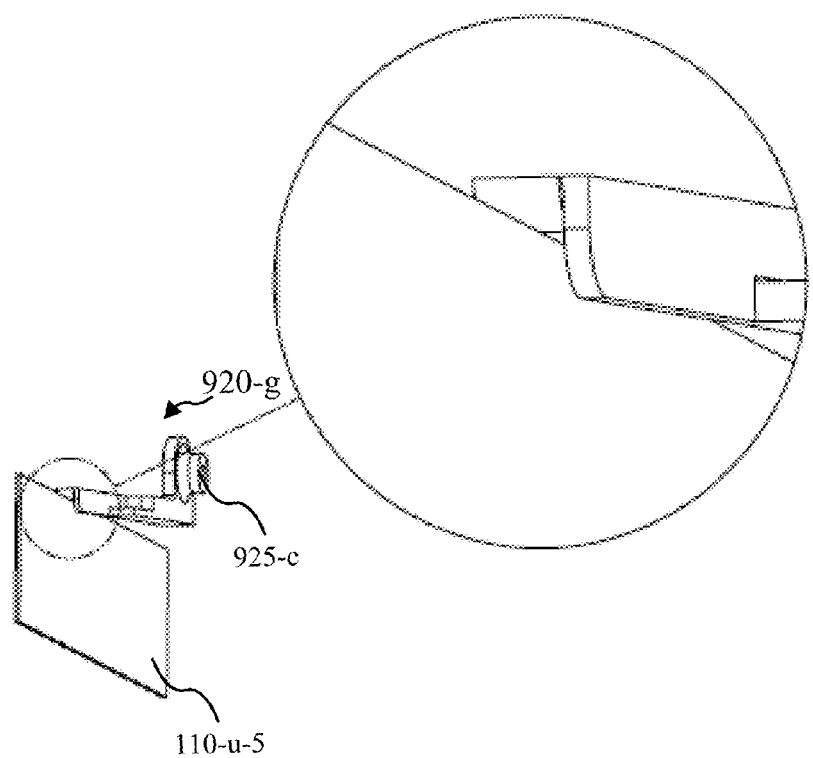

FIG. 9G shows aspects of a deployment system 904 in accordance with various embodiments, which static contoured boom supports 910-d and 910-e. System 904 may also include edge supports 920-e, 920-f, 920-g, and 920-g and furlable boom 110-u-4. FIG. 9G also shows static contoured boom support 910-d, edge support 920-e, and edge support 920-f separately, without boom 110-u-2, which may show aspects of these components obscured by boom 110-u-4 in system 904. Similarly, FIG. 9G shows static contoured support 910-e, edge support 920-g, and edge support 920-h separately, without boom 110-u-4, which may show aspects of these components obscured by boom 110-u-4 in system 904. Deployment system 904 may include devices such as those found with respect to devices 900 of FIG. 9A. Static contoured boom supports 910-d and/or 910-e may be configured to match a geometry of furlable boom 110-u-4. The components of system 904 may provide support for the furlable boom 110-u-4 during deployment such that the boom may maintain or otherwise achieve a certain shape. Static contoured boom support 910-d may be referred to as a forward boom support, while static contoured boom support 910-e may be referred to as an aft boom support. Static contoured boom support 910-d may also include a cutaway portion 912-c, which may accommodate a deformation of boom 110-u-4.

Edge supports 920-g and/or 920-h may supply a down force on boom 110-u-4, while the contoured support 910-e contours the boom 110-u-4. In some embodiments, edge supports 920-g and/or 920-h may utilize one or more spring components, such as spring-loaded plungers 942-c-1 and/or 942-c-2) or other components to apply a preload to one or more edges of boom 110-u-4. Edge supports 920-g and/or 920-h may enable better location of the boom 110-u-4 and may provide a specific contact geometry that may not damage an edge of the boom 110-u-4. Edge supports 920-g and/or 920-h may provide for different lateral stiffness aspects. Edge supports 920-g and/or 920-h may be configured to form one or more grooves in situ in the edge supports 920-g and/or 920-h from contact with the one or more edges of the furlable boom 110-u-4. Edge supports 920-g and 920-h may be coupled with each other in some embodiments as may be shown in FIG. 9G. The edge supports 920-e and/or 920-f may also be configured to supply a circumferential or downward force on the furlable boom 110-u-4. In some embodiments, the edge supports 920-f may be configured to provide one or more hard stops for an edge of the furlable boom 110-u-4, while edge support 920-e may include one or more spring components (such as spring-loaded plunger 942-d, which may be considered as part of adjustment component 940-d-1 in some cases) configured to apply a preload to an edge of the furlable boom 110-u-4 In some embodiments, the edge supports 920-e and/or 920-f are configured to form one or more grooves in situ in the portion of the edge supports 920-e and/or 920-f that may make contact with the one or more edges of the furlable boom 110-u-4.

System 904 also may show adjustment components 940-d-1, 940-d-2, 940-e-1, and/or 940-e-2 for edge supports 920-e, 920-f, 920-g, and/or 920-h. Adjustment components 940-e-1 and/or 940-e-2, for example, may be configured to apply a constant force to edge supports 920-g and 920-h over a range of deflections. Adjustment components 940-e-1 and/or 940-e-2 may be also configured with static components that may lock the edge of the boom into a specific location regardless of force applied. These static components may be configured to be adjustable to allow for tuning the position of the edge and fitting multiple boom with slightly different manufactured widths. Adjustment components 940-d-1 and/or 940-d-2 may also be adjusted to facilitate adjustment with respect to edge supports 920-e and/or 920-f and respective booms. Some embodiments may also include spring components, such as spring-loaded plungers 942-c-1 and/or 942-c-2, which may also facilitate applying a preload to an edge of the furlable boom 110-u-4.

Figure 9I:
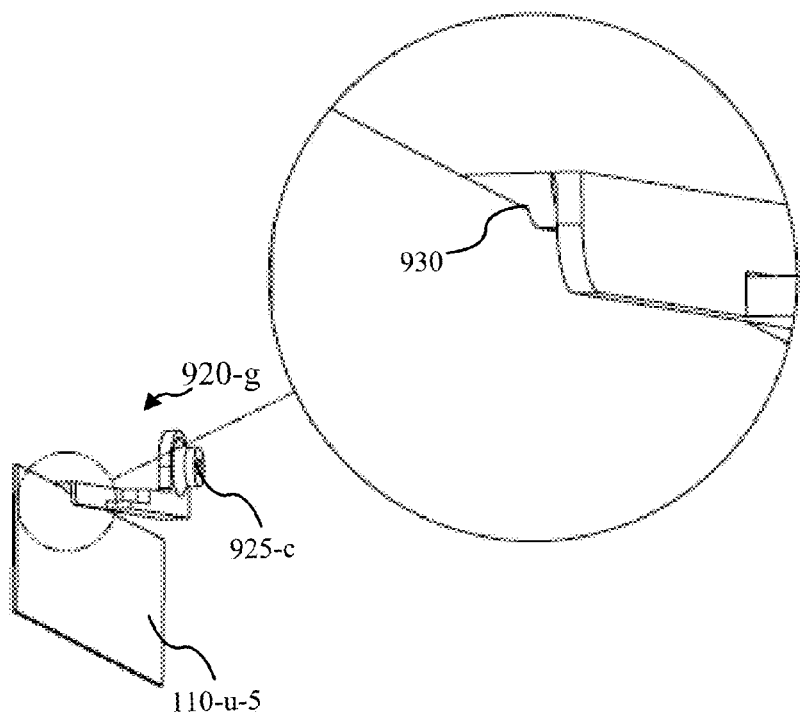
Figure 9J:
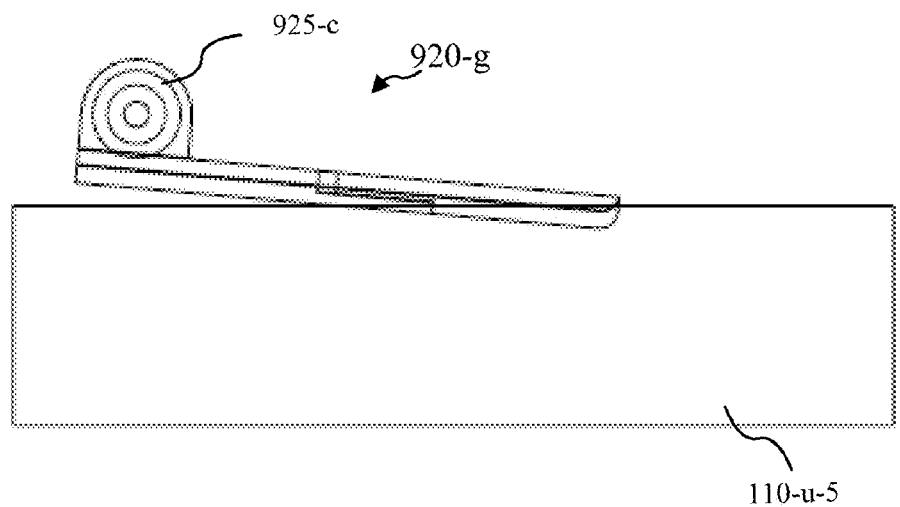
Figure 9K:
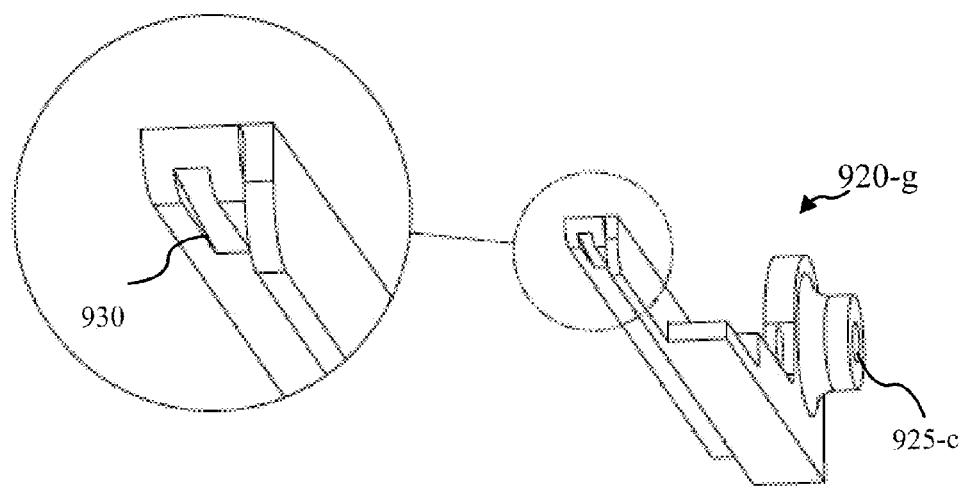

Turning now to FIG. 9H, FIG. 9I, FIG. 9J, and FIG. 9K, examples of an edge support 920-g in accordance with various embodiments are provided. The edge support 920-g may provide an example one or more of the edge supports 920-c and/or 920-d of FIG. 9F and/or edge supports 920-e and/or 920-f of FIG. 9G, where one or more grooves 930 may be formed in situ in the edge support 920-g from contact with an edge of the furlable boom 110-u-5. FIG. 9I and FIG. 9K may show the groove 930 that may be formed in situ in the edge support. Some embodiments may include spring component 925-c, which may also be included as part of edge support 920-g to facilitate providing a preload to an edge of the furlable boom 110-u-5; component 925-c may also provide an axis of rotation for the edge support 920-g. A portion of the edge support 920-g that may make contact with the edge of boom 110-u-5 may be made of a composite material that may be capable of being worn away through contact, such as contact with the edge of the boom 110-u-5. In some embodiments, the composite material may include carbon fibers; in some embodiments, the composite material includes glass. In some embodiments, the edge support 920-g may include other materials that may be worn away to form a groove in the edge support through contact with the edge of the boom 110-u-5.

Figure 9L:
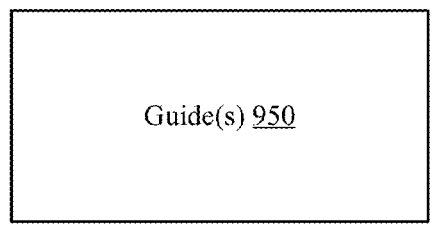
Figure 9L:
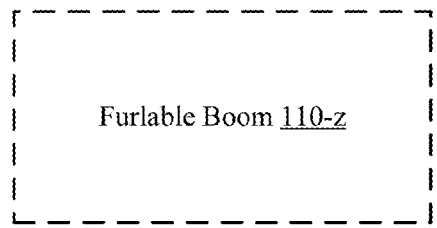
Figure 9L:
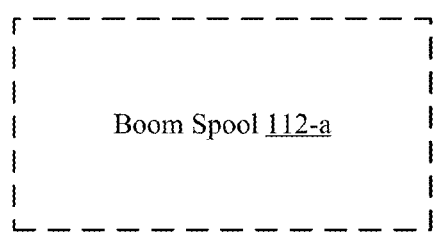

Turning now to FIG. 9L, a deployment device 911 in accordance with various embodiments is provided. Device 911 may include one or more guides 950, which may be examples of guide devices 195 of FIG. 1B, inner guide 121 of FIG. 1C, and/or outer guide 122 of FIG. 1C. FIG. 9L may also show a furlable boom 110-z and a boom spool 112-a.

Some embodiments of the device 911 include an inner guide 950 positioned between a portion of the furlable boom 110-z furled around the boom spool 112-a and a portion of the furlable boom 110-z that is being deployed or retracted from the boom spool 112-a on a concave side of the furlable boom 110-z. Some embodiments of the system 911 include an outer guide 950 positioned opposite to the inner guide 950 on a convex side of the furlable boom 110-z such that the portion of the furlable boom 110-z that is being deployed or retracted boom spool 112-a moves between at least a portion of the inner guide 950 and a portion of the outer guide 950. The guides 950 may facilitate the boom 110-z during retraction and/or deployment such that the boom may not kink or otherwise get bent such that retraction and/or deployment may be hindered.

Figure 9M:
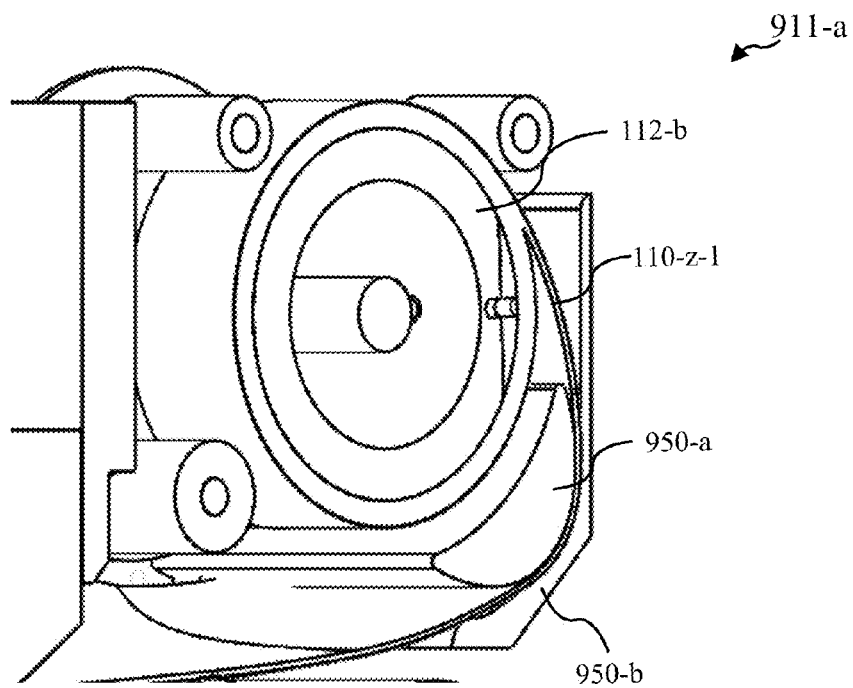
Figure 9N:
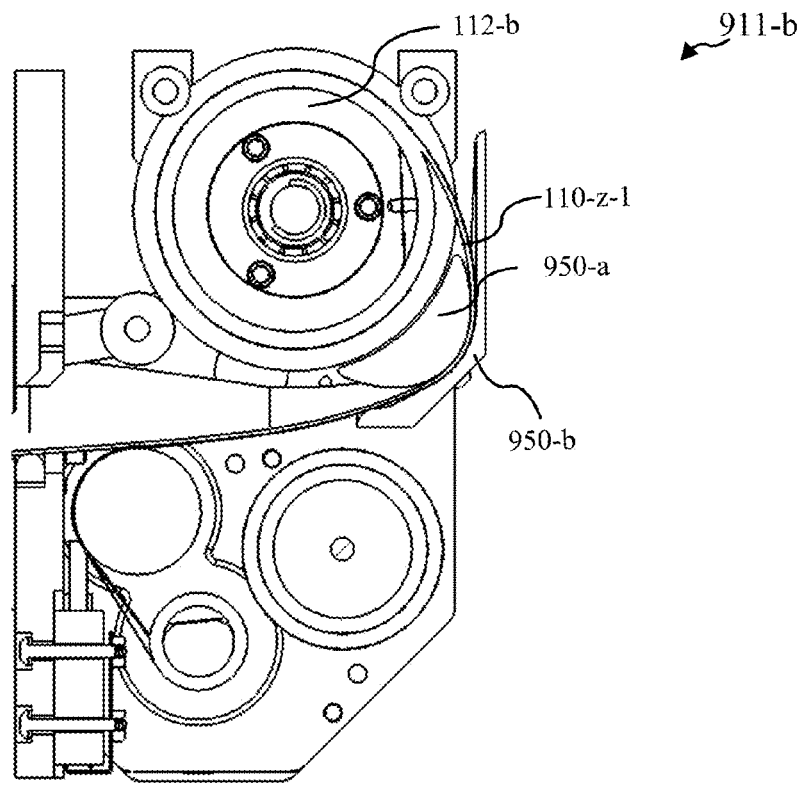

FIG. 9M and FIG. 9N then provide an isometric view 911-a and a cross-sectional view 911-b of aspects of a deployment device in accordance with various embodiments that may include an inner guide 950-a, which may be positioned such that the inner guide 950-a is positioned between a portion of the furlable boom 110-z-1 furled around the boom spool 112-b and a portion of the furlable boom 110-z-1 that is being deployed or retracted from the boom spool 112-b on a concave side of the furlable boom 110-z-1. An outer guide 950-b may be shown positioned opposite the inner guide 950-a on a convex side of the furlable boom 110-z-1 such that the portion of the furlable boom 110-z-1 that is being deployed or retracted boom spool 112-b moves between at least a portion of the inner guide 950-a and a portion of the outer guide 950-b. These guides 950 may facilitate the boom 110-z-1 during retraction and/or deployment such that the boom 110-z-1 may not kink or otherwise get bent such that retraction and/or deployment may be hindered.

Figure 10A:
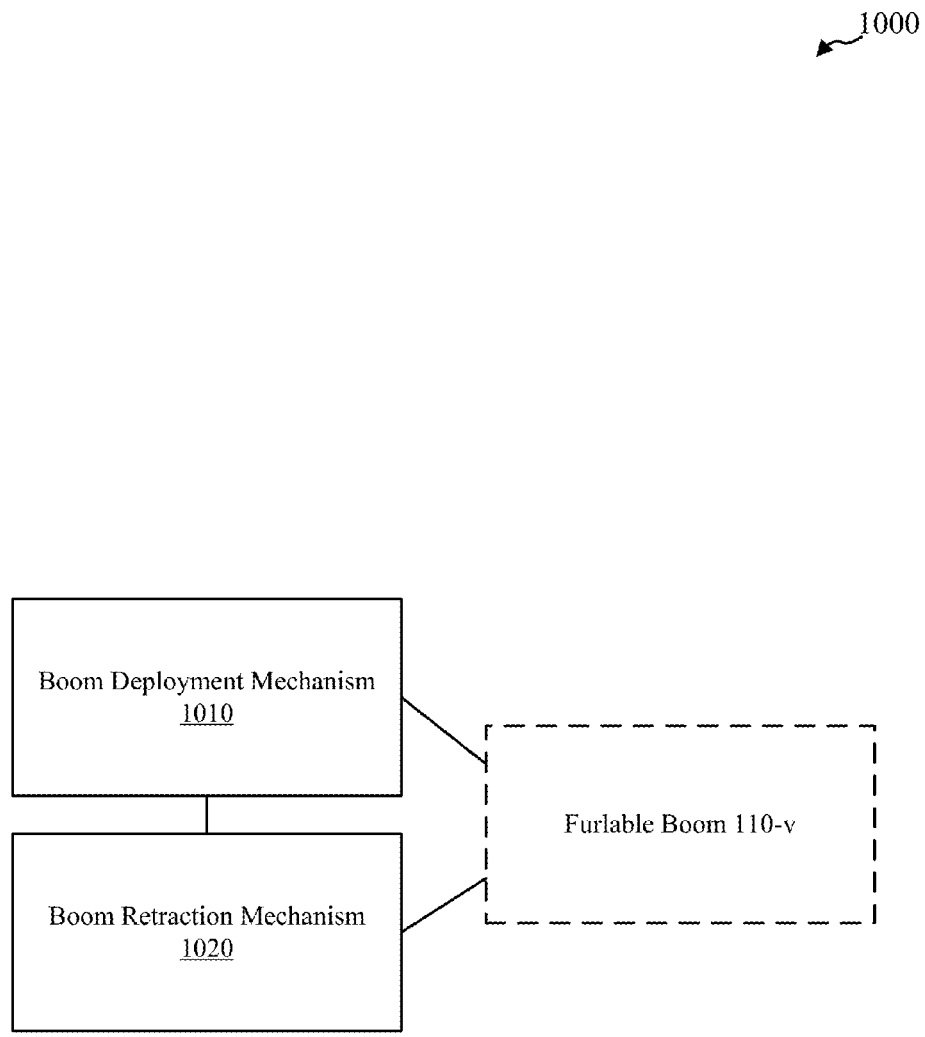
FIG. 10A, FIG. 10B, FIG. 10C, FIG. 10D, FIG. 10E, FIG. 10F, and FIG. 10G show deployment devices and/or aspects of deployment systems in accordance with various embodiments.

Turning now to FIG. 10A, a deployment device 1000 in accordance with various embodiments in provided. Device 1000 may be an example of tension and spool drive device 180 of FIG. 1B, for example. Device 1000 may be an example of aspects of system 100 of FIG. 1A, system 100-a of FIG. 1B, system 100-b of FIG. 1C, system 200 of FIGS. 2A-2C, and/or system 201 of FIG. 2E and/or FIG. 2G. Device 1000 may include a boom deployment mechanism 1010 and a boom retraction mechanism 1020. The boom deployment mechanism 1010 may include a tension drive; the tension drive may include a ribbon drive. The boom retraction mechanism 1020 may include a boom spool drive. Some embodiments of device 1000 include a motor coupled with boom deployment mechanism 1010 and with the boom retraction mechanism 1020; the motor may include a stepper motor, a brusher motor, or a piezo-electric motor, for example. Some embodiments of device 1000 include a clutch mechanism configured to disengage the boom deployment mechanism 1010 when the boom retraction mechanism 1020 is driven. Some embodiments of device 1000 include a ratchet and pawl configured to disengage the boom retraction mechanism 1020 when the boom deployment mechanism 1010 is driven. In some embodiments of device 1000, the ribbon drive includes a steel ribbon; other materials may be utilized such as Kevlar or plastics. Some embodiments of device 1000 include a furlable boom 110-v coupled with the boom deployment mechanism 1010 and with the boom retraction mechanism 1020. The furlable 110-v boom may include a slit-tube boom, for example.

For example, some embodiments of the system 1000 include a tension drive coupled with furlable boom 110-v such that the furlable boom 110-v may be extendible as part of the boom deployment mechanism; the system may also include a boom spool drive coupled with the furlable boom 110-v such that the furlable boom 110-v may be retractable as part of the boom retraction mechanism 1020. In some embodiments, the tension drive includes a ribbon drive with a pull ribbon. In some embodiments, the pull ribbon is fabricated from steel. Some embodiments of the system 1000 include a clutch mechanism configured to disengage the tension drive when the boom spool drive is driven. Some embodiments of the system 1000 include a ratchet and pawl configured to disengage the boom spool drive when the tension drive is driven.

Figure 10B:
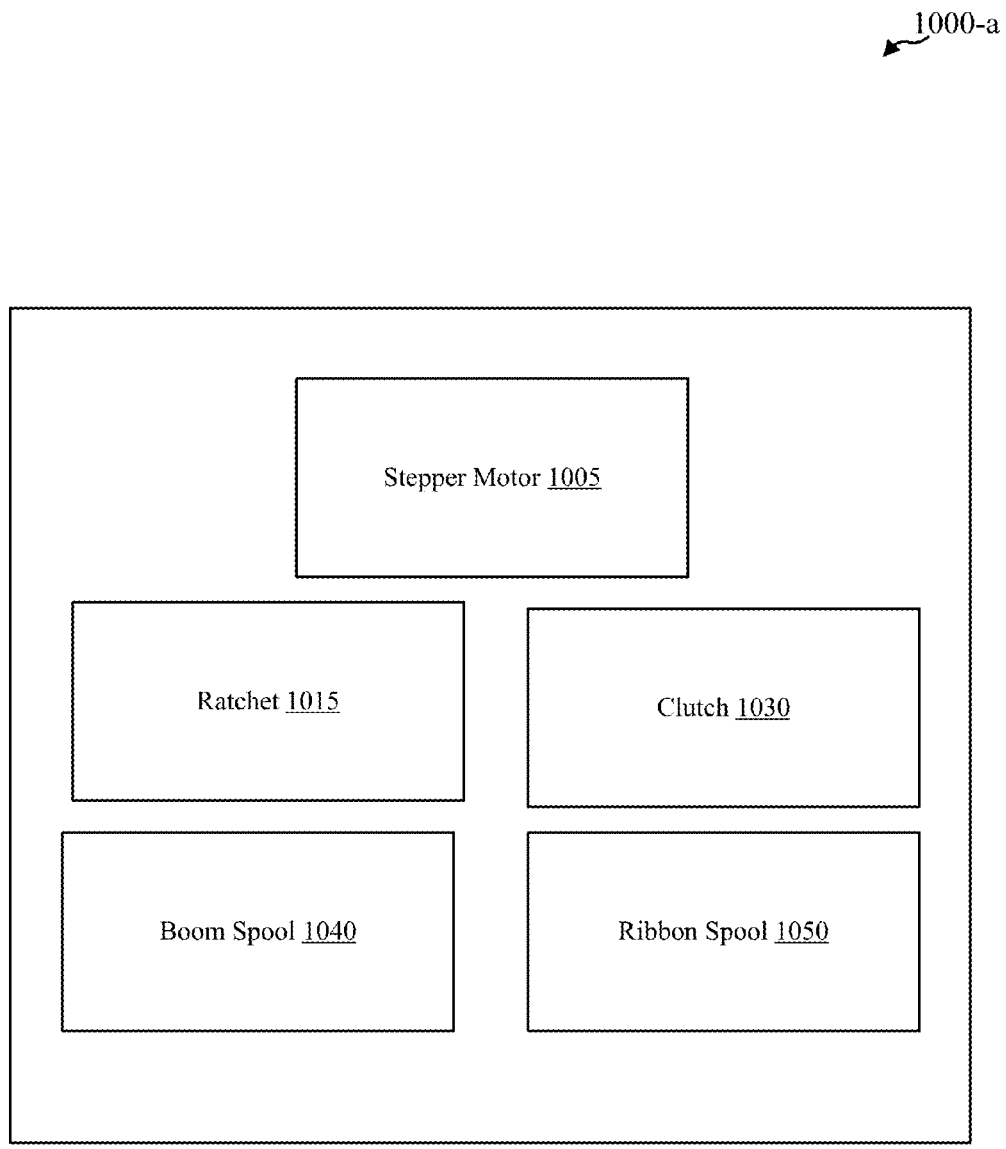

FIG. 10B shows an example of device 1000-a that may be a specific example of a device 1000 of FIG. 10A. Device 1000-a may include a stepper motor 1005, a ratchet 1015, a clutch 1030, a boom spool 1040, and/or ribbon spool 1050. These components may be configured in a variety of ways, some of which are discussed further below; system 200 of FIG. 2A, 2B, and/or 2C may also show aspects of these components.

Figure 10C:
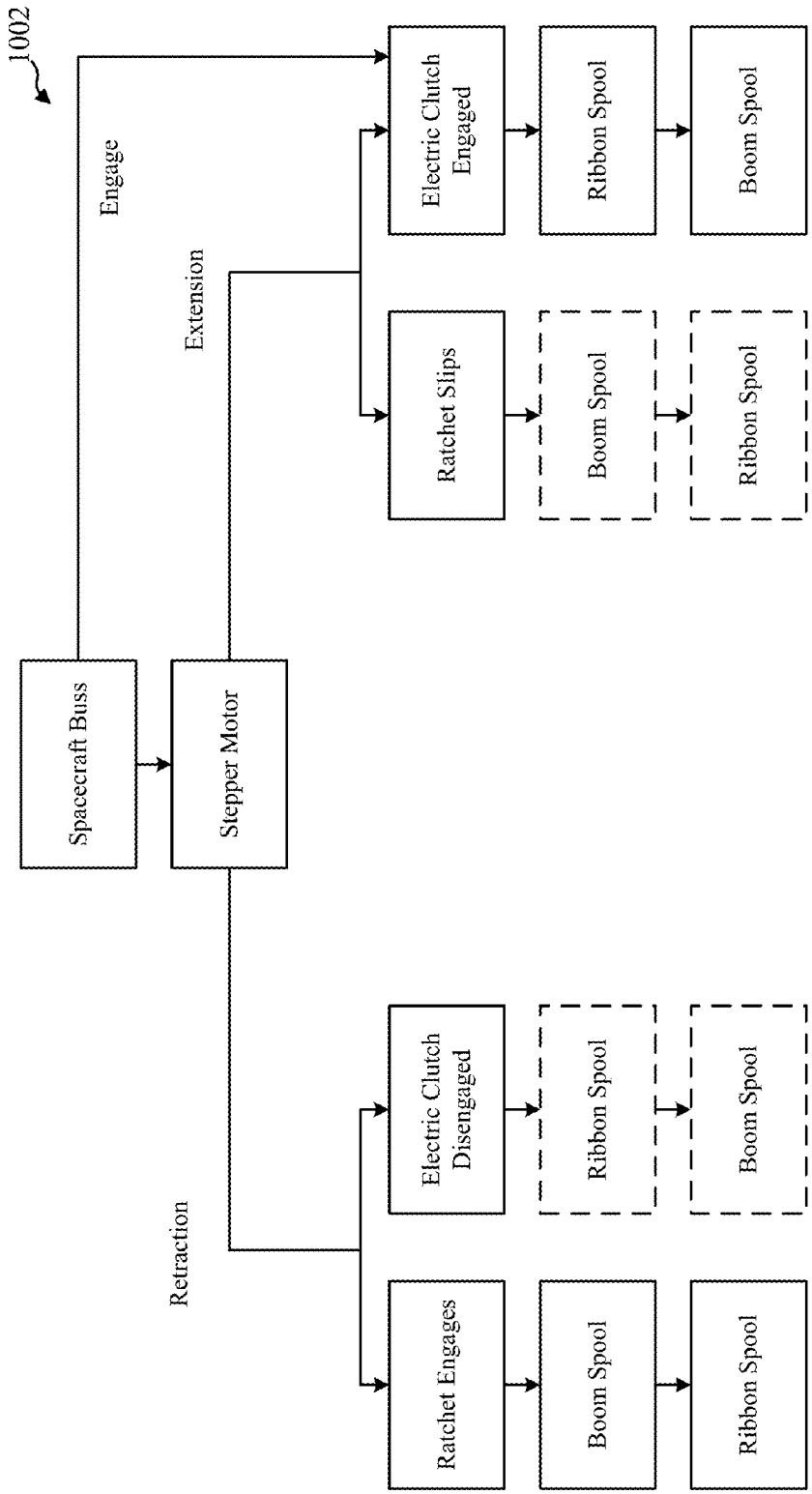

For example, FIG. 10C shows a block diagram 1002 for deployment and retraction operations with respect to components such as those found with respect to device 1000-a in accordance with various embodiments. In some embodiments, a drive train may utilize a single stepper motor (such as stepper motor 1005 of FIG. 10B) for deploy and retract operations and a combination of a crown-tooth electromagnetic clutch (such as clutch 1030 of FIG. 10B) and a ratchet and pawl (such as ratchet 1015 of FIG. 10B) to actuate separate deploy and retract drive mechanisms. The deployment mechanism (an example of boom deployment mechanism 1020 of FIG. 10A) may include a tape-drive (an example of the ribbon spool 1050 of FIG. 10B) while the retraction mechanism (an example of the boom retraction component 1010 of FIG. 10A) may include a boom spool drive (such as boom spool 1040 of FIG. 10B). The two separate drive mechanisms may be utilized to enable improved performance in both drive directions. The boom spool and ribbon drive spool may not be simultaneously coupled directly to the motor; this may be because of their changing gear ratios (diameters) as the spools fill/empty. They may be mismatched for a portion of extension and retraction.

When the boom spool is driven, the tape-drive spool may be allowed to rotate at a unique speed, for example, which may be accomplished by disconnecting the electric crown-tooth clutch. When the tape drive spool is driven (extension), the boom spool may be allowed to rotate at its unique speed, which may be accomplished by choosing gear ratios that ensure that its gear may be turning faster than the spool and coupling them with a passible ratchet and pawl located between the boom spool gear and the boom spool. The motor input gear may be mounted to the front of the clutch and is free when not engaged. The output shaft may exit the back of the clutch and is free when not engaged. When the clutch is engaged, the clutch may mesh two face tooth disks to couple the input gear with the output shaft. This may use the engagement of the face teeth and does not rely on friction. An external spring-loaded ball detent may be positioned against the external gear that holds the gear in position with enough torque to resist ballooning.

Figure 10D:
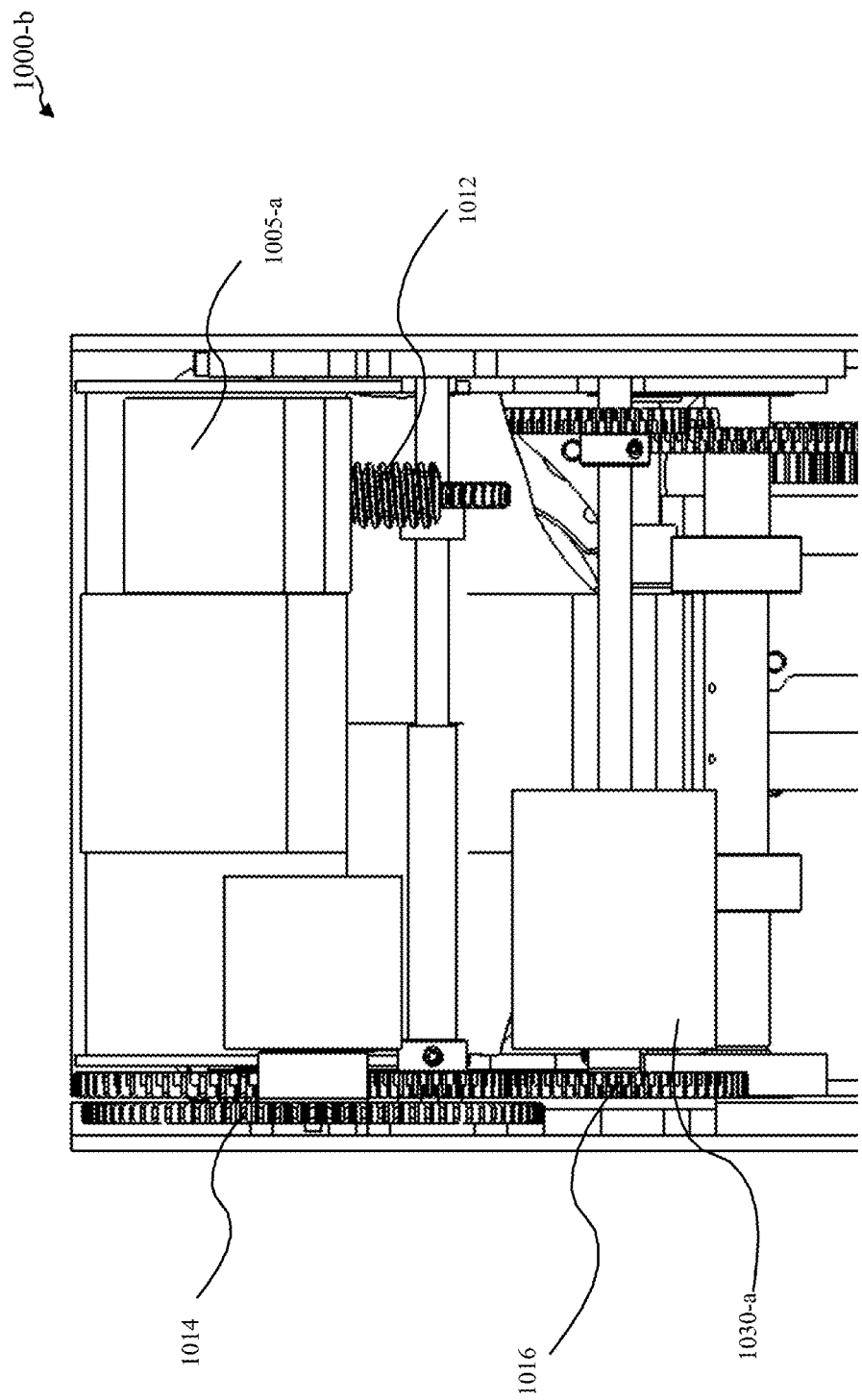

FIG. 10D shows aspects of a device 1000-b in accordance with various embodiments. Device 1000-b may be an example of aspects of device 1000 of FIG. 10A and/or device 1000-a of FIG. 10B. Device 1000-b may highlight motor 1005-a, worm gear 1012, spool drive gears 1014, 1016, and electric clutch 1030-a.

The drive train worm gear 1012 may be self-locking and may serve as the unpowered boom lock. Worm gears may be self-locking when the tangent of the lead angle is less than the coefficient of friction, for example. Typically, a lead angle of less than 5° may be considered self-locking. The worm gear 1012 may have a lead angle of 4.08° in some embodiments, which may result in a tangent of 0.071. In some embodiments, the worm gear is bronze and may act upon a stainless-steel gear. The unlubricated coefficient of friction in vacuum may be nominally 0.16. This may result in margin on locking of 128%. Other embodiments may utilize other configuration parameters.

Figure 10E:
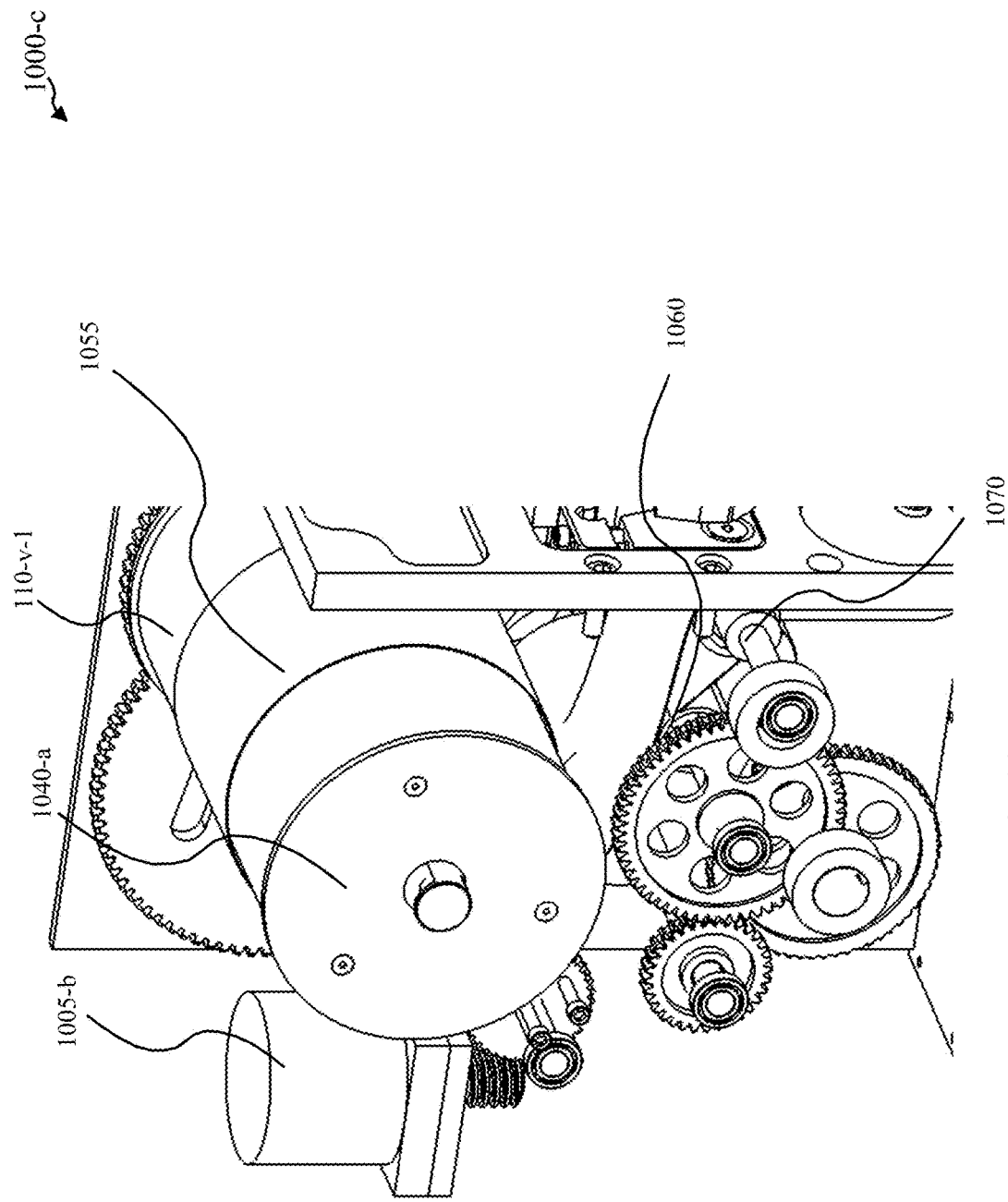

FIG. 10E shows aspects of a device 1000-c in accordance with various embodiments. Device 1000-c may be an example of aspects of device 1000 of FIG. 10A and/or device 1000-a of FIG. 10B. The aspects of device 1000-c may highlight aspects of a boom deployment mechanism, such as deployment mechanism 1010 of FIG. 10A.

Device 1000-c may utilize a thin steel tape or ribbon 1055 co-wound with a furlable boom 110-v-1, such as slit-tube boom, on the boom spool 1040-a to deploy the boom 110-v-1. While steel may be utilized for tape 1055, other materials may be utilized such as Kevlar and/or plastic. The tape or ribbon 1055 may also be referred to as drive tape, drive ribbon, pull tape, and/or pull ribbon. The drive tape 1055 may be pulled off the spool 1040-a as it is wound by the motor 1005-b onto its tape-drive spool 1060, which may also be referred to as a ribbon spool. The drive tape 1055 action on the spool 1040-*a* and boom 110-*v*-1 may result in a favorable boundary condition to forcibly deploy the boom 110-*v*-1 while achieving boom structural performance near its theoretical limit; this may be unlike a spool-drive deployment or a deployment mechanism contacting the slit-tube edges. The tape drive may not depend on friction and is independent of variations in the coefficient of friction. In some embodiments, the system gear ratio is 36:1 driving the ribbon spool 1060, which may have a diameter of 0.8 inches at the end of deployment. In some embodiments, one 30 deg step of the motor 1010-*b* causes the boom to advance 0.006 inches. Other embodiments may utilize other configuration parameters. Device 1000-*c* may also utilize a redirect pulley 1070.

Figure 10F:
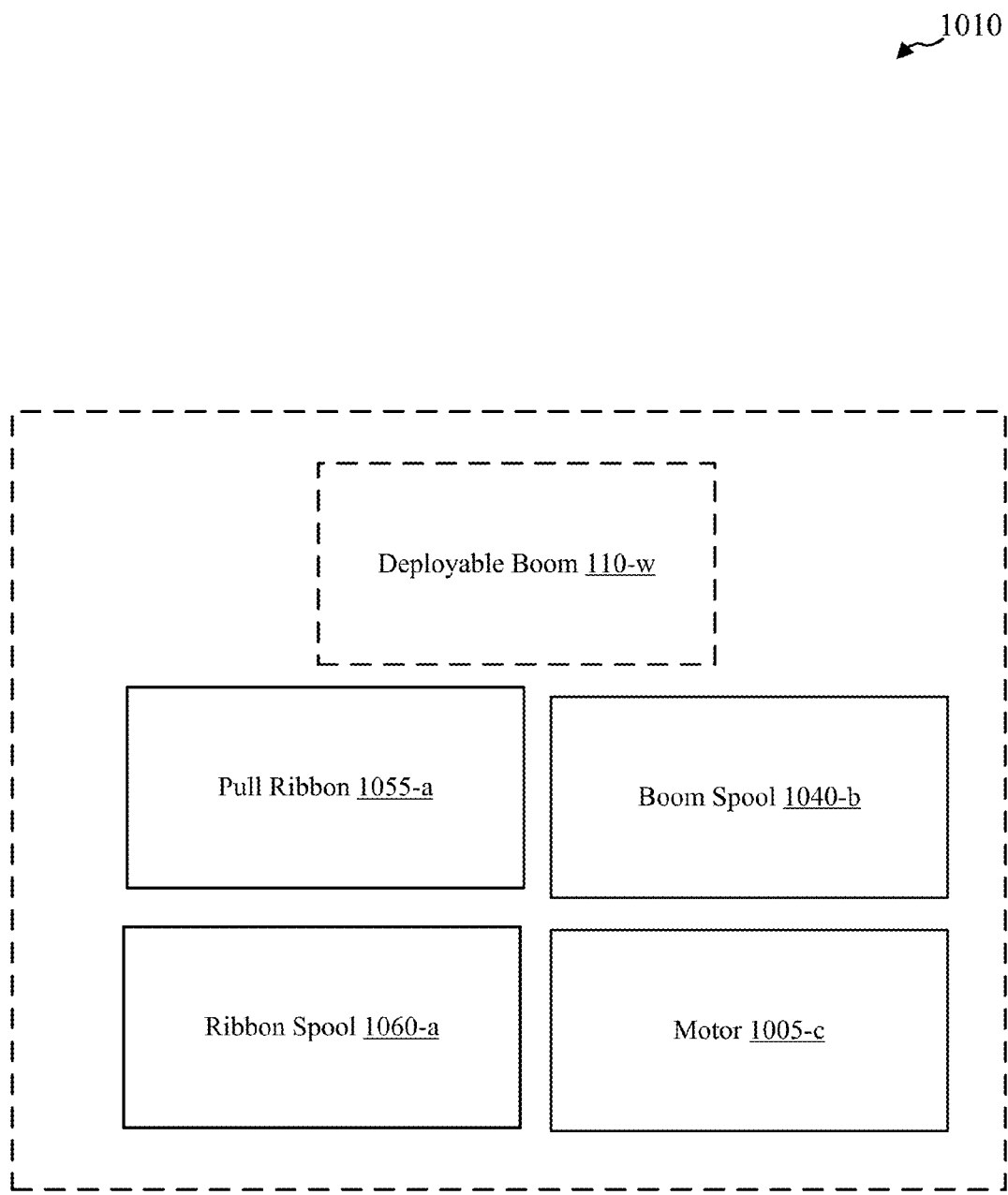

FIG. 10F shows a device 1001 in accordance with various embodiments; device 1001 may be referred to as a tape and/or ribbon drive and may reflect aspects of the devices 1000-*a* of FIG. 10A, for example. Device 1001 may include a boom spool 1040-*b* configured to couple with a furlable boom 110-*w* such that the furlable boom 110-*w* is retractable. Device 1001 may also include a pull ribbon 1055-*a* configured to couple with the furlable boom 110-*w* such that the furlable boom 110-*w* is extendible. Device 1001 may include a ribbon spool 1060-*a* coupled with pull ribbon 1055-*a*. Device 1001 may include a motor 1005-*c* coupled with the ribbon spool 1060-*a*.

In some embodiments of device 1001, furlable boom 110-*w* may be coupled with the boom spool 1040-*b* and/or the pull ribbon 1055-*a*. The furlable boom 110-*w* may include a slit-tube boom. The pull ribbon 1055-*a* may include a stainless-steel ribbon, though other materials such as Kevlar and/or plastics may be utilized in some cases. The pull ribbon 1055-*a* may be configured to limit deployment of the furlable boom and/or to allow for retraction of the furlable boom.

Figure 10G:
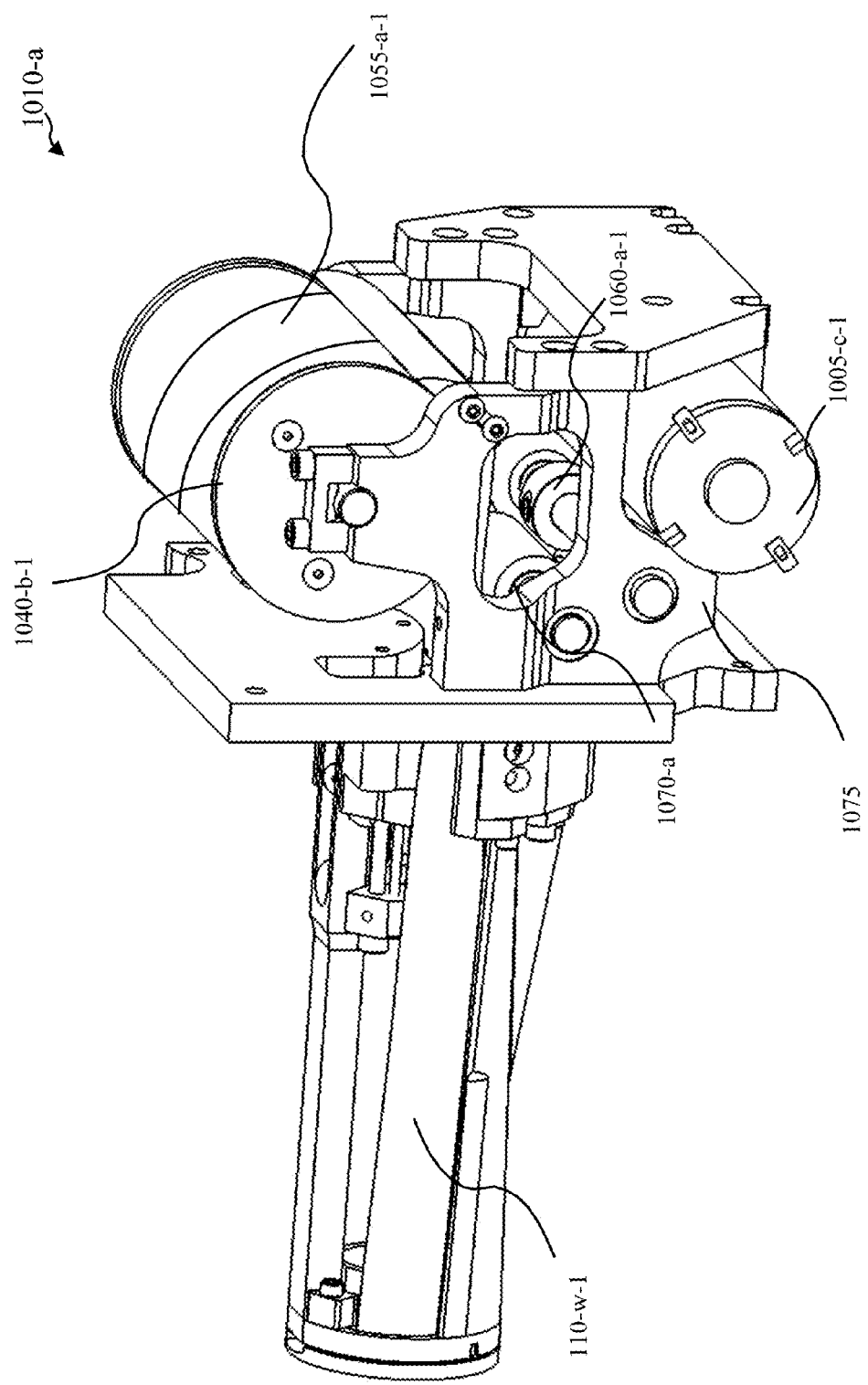

FIG. 10G shows an example of a deployment system 1001-*a* in accordance with various embodiments. Device 1001-*a* may be a specific example of device 1001 of FIG. 10F. Devices 1001-*a* may provide benefits over other deployment devices that may only be configured for deployment and may not allow for retraction. In some embodiments, additional components may be utilized to further facilitate retraction, such as those described with respect to FIG. 10A, FIG. 10B, FIG. 10C, FIG. 10D, FIG. 10E, and/or FIG. 10F.

Device 1010-*a* may include a boom spool 1040-*b*-1 that may be configured to couple with a furlable boom 110-*w*-1 such that the furlable boom 110-*w*-1 may be retractable. Device 1010-*a* may also include a pull ribbon 1055-*a*-1 that may be configured to couple with the furlable boom 110-*w*-1 such that the furlable boom 110-*w*-1 may be extendible. Device 1010-*a* may include a ribbon spool 1060-*a*-1 coupled with pull ribbon 1055-*a*-1. Device 1010-*a* may include a motor 1005-*c*-1 coupled with the ribbon spool 1060-*a*-1. Device 1010-*a* may include other components such as redirect shaft 1070-*a* and one or more support structures 1075.

These embodiments may not capture the full extent of combination and permutations of materials and process equipment. However, they may demonstrate the range of applicability of the method, devices, and/or systems. The different embodiments may utilize more or fewer stages than those described.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, a number of stages may be undertaken before, during, or after the above elements are considered. Accordingly, the above description should not be taken as limiting the scope of the different embodiments.

What is claimed is:

1. A boom deployment system comprising:
   a furlable boom; and
   an end fitting directly coupled with a distal portion of the furlable boom such that the end fitting travels with the distal portion of the furlable boom to a deployed state, wherein one or more portions of the end fitting engages one or more end portions of the furlable boom in the deployed state and releases the one or more end portions of the furlable boom in a stowed state.

2. The boom deployment system of claim 1, wherein the one or more portions of the end fitting includes an end support configured to direct the one or more end portions of the furlable boom from the stowed state of the furlable boom to the deployed state of the furlable boom and support the one or more end portions of the furlable boom in the deployed state.

3. The boom deployment system of claim 2, wherein the end fitting includes an insert configured to support an inner surface of the distal portion of the furlable boom in the deployed state.

4. The boom deployment system of 1, further comprising one or more static contoured supports that matches a geometry of the furlable boom as the furlable boom transitions from a furled geometry to a deployed geometry.

5. The boom deployment system of claim 4, wherein one or more of the static contoured supports includes a cutout portion that accommodates a deformation of a portion of the furlable boom.

6. The boom deployment system of claim 4, further comprising one or more edge supports that supply a circumferential force on the furlable boom.

7. The boom deployment system of claim 6, wherein at least one of the one or more edge supports provides one or more hard stops for one or more edges of the furlable boom.

8. The boom deployment system of claim 6, wherein one or more of the edge supports form one or more grooves in situ from contact with the one or more edges of the furlable boom.

9. The boom deployment system of claim 7, wherein the one or more edge supports include one or more spring components that apply a preload to a first edge from the one or more edges of the furlable boom while the one or more hard stops make contact with a second edge from the one or more edges of the furlable boom.

10. The boom deployment system of 1, further comprising an inner guide positioned on a concave side of the furlable boom between a portion of the furlable boom furled around a boom spool and a portion of the furlable boom that is being deployed or retracted from the boom spool.

11. The boom deployment system of 10, further comprising an outer guide positioned on a convex side of the furlable boom opposite the inner guide such that the portion of the furlable boom that is being deployed or retracted from the boom spool moves between at least a portion of the inner guide and a portion of the outer guide.

12. The boom deployment system of 1, further comprising:
    a tension drive coupled with the furlable boom such that the furlable boom is extendible; and
    a boom spool drive coupled with the furlable boom such that the furlable boom is retractable.

13. The boom deployment system of claim 12, wherein the tension drive includes a ribbon drive with a pull ribbon.

14. The boom deployment system of claim 12, further comprising a clutch mechanism that disengages the tension drive.

15. A boom deployment system comprising:
    a furlable boom;
    an end fitting coupled with a distal portion of the furlable boom such that the end fitting travels with the distal portion of the furlable boom to a deployed state, wherein one or more portions of the end fitting engages one or more end portions of the furlable boom in the deployed state and releases the one or more end portions of the furlable boom in a stowed state;
    a tension drive coupled with the furlable boom such that the furlable boom is extendible;
    a boom spool drive coupled with the furlable boom such that the furlable boom is retractable; and
    a ratchet and pawl that disengages the boom spool drive.

16. The boom deployment system of claim 1, further comprising
    an insertable stop component; and
    a store energy component that presses an end of the insertable stop component into a feature of the furlable boom to control deployment of the furlable boom.

17. The boom deployment system of claim 16, further comprising a shutoff component that stops the deployment of the furlable boom in response to at least a portion of the insertable stop component pressing into or passing over the feature of the furlable boom.

18. The boom deployment system of claim 16, further comprising
    a reinforcement component that locally strengthens a portion of the furlable boom.

19. The boom deployment system of claim 18, wherein the reinforcement component is co-cured with the furlable boom during fabrication.

20. The boom deployment system of claim 18, wherein the reinforcement component engages the insertable stop component.

21. The boom deployment system of 1, wherein the furlable boom is fabricated with a central axis with a curvature along a length of the furlable boom.

22. The boom deployment system of claim 21, wherein the furlable boom exhibits a deployed geometry with the central axis parallel to an axial direction in response to a portion of the furlable boom coupling with a boom spool.

23. The boom deployment system of claim 21, wherein the furlable boom exhibits a deployed geometry with the central axis with a negative curvature in response to a portion of the furlable boom coupling with a boom spool.

24. The boom deployment system of claim 1, further comprising a spiral harness enclosed within the furlable boom as the furlable boom is deployed.

25. The boom deployment system of claim 24, further comprising a coiled spring coupled with the spiral harness to provide a return force for retraction.

26. The boom deployment system of claim 1, further comprising:
    a rotary encoder; and
    a rotatable shaft coupled with a boom spool, wherein the boom spool is coupled with the furlable boom.

27. The boom deployment system of claim 26 further comprising one or more gears that couples the rotary encoder with the rotatable shaft such that the rotary encoder rotates less than 360 degrees when the rotatable shaft rotates 360 degrees or more.

28. The boom deployment system of claim 27, wherein the rotary encoder is calibrated to determine a deployment position of the furlable boom.

29. The boom deployment system of claim 1, wherein the furlable boom includes a slit-tube composite boom.

30. The boom deployment system of claim 2, wherein the end support configured to direct the one or more end portions of the furlable boom from the stowed state of the furlable boom to the deployed state of the furlable boom and support the one or more end portions of the furlable boom in the deployed state includes a groove formed in the end fitting.

* * * * *